(12) United States Patent
Yu et al.

(10) Patent No.: US 12,483,067 B2
(45) Date of Patent: Nov. 25, 2025

(54) WIRELESS POWER TRANSFER

(71) Applicant: Intdevice Limited, Auckland (NZ)

(72) Inventors: Li Jun Yu, Auckland (NZ); Hao Hao, Auckland (NZ); Anton Van Vugt, Auckland (NZ)

(73) Assignee: INTDEVICE LIMITED, Auckland (NZ)

( * ) Notice: Subject to any disclaimer, the term of this patent is extended or adjusted under 35 U.S.C. 154(b) by 0 days.

(21) Appl. No.: 18/251,710

(22) PCT Filed: Nov. 4, 2021

(86) PCT No.: PCT/IB2021/060191
§ 371 (c)(1),
(2) Date: May 3, 2023

(87) PCT Pub. No.: WO2022/097050
PCT Pub. Date: May 12, 2022

(65) Prior Publication Data
US 2023/0420991 A1    Dec. 28, 2023

(30) Foreign Application Priority Data

Nov. 4, 2020  (NZ) ........................ 769644
Dec. 23, 2020  (NZ) ........................ 771520

(51) Int. Cl.
*H02J 50/00*  (2016.01)
*H02J 50/12*  (2016.01)
*H02J 7/02*  (2016.01)

(52) U.S. Cl.
CPC ............ *H02J 50/12* (2016.02); *H02J 50/005* (2020.01); *H02J 7/02* (2013.01)

(58) Field of Classification Search
CPC .. H02J 50/12; H02J 50/005; H02J 7/02; H02J 2207/50; H02J 50/10; H02M 1/4266; H01F 38/14; H01H 2047/046
(Continued)

(56) References Cited

U.S. PATENT DOCUMENTS 7,318,270 B1    1/2008  O'Loughlin
9,754,717 B2    9/2017  Long et al.
(Continued)

FOREIGN PATENT DOCUMENTS

CN    101632141 B    1/2010
CN    104810931 A    7/2015
(Continued)

OTHER PUBLICATIONS

Applicant: Intdevice Limited; "Improvements Relating to Wireless Power Transfer"; International Application No. PCT/IB2021/060191 Filed: Nov. 4, 2021; PCT International Search Report dated Jan. 18, 2022; 6 pgs.
(Continued)

*Primary Examiner* — Elim Ortiz
(74) *Attorney, Agent, or Firm* — Tarolli, Sundheim, Covell & Tummino LLP

(57) ABSTRACT

An inductive power transfer receiver comprising: a receiving coil, a tuned circuit comprising the receiving coil, and a transformer sub-circuit connected to the tuned circuit, the transformer sub-circuit comprising a transformer primary side and a transformer secondary side, wherein in use, the transformer sub-circuit: reduces current in the receiving coil, improves power factor, and/or improves stability in the tuned circuit.

15 Claims, 49 Drawing Sheets

(58) Field of Classification Search
USPC ......... 307/104, 9.1; 320/108, 137, 107, 109, 320/162
See application file for complete search history.

(56) References Cited

U.S. PATENT DOCUMENTS

| | | | |
|---|---|---|---|
| 9,859,755 | B2 | 1/2018 | Beaver et al. |
| 2013/0300373 | A1 | 11/2013 | Vivanco-Sarabia et al. |
| 2014/0015328 | A1* | 1/2014 | Beaver ............. H02J 7/34 |
| | | | 307/104 |
| 2014/0252870 | A1 | 9/2014 | Covic et al. |
| 2015/0229225 | A1* | 8/2015 | Jang ............. H02M 3/285 |
| | | | 363/17 |
| 2019/0097458 | A1 | 3/2019 | Oh et al. |

FOREIGN PATENT DOCUMENTS

| | | |
|---|---|---|
| CN | 103779951 A | 12/2015 |
| CN | 108448693 A | 8/2018 |
| CN | 109687601 A | 4/2019 |
| CN | 109698632 A | 4/2019 |
| JP | 2020018060 A * | 1/2020 |

OTHER PUBLICATIONS

Applicant: Intdevice Limited; "Improvements Relating to Wireless Power Transfer"; European Application No. EP21888792; Extended European Search Report dated Jan. 28, 2025; 11 pgs.

* cited by examiner (a)

(b)

(c)

(d)

WIRELESS POWER TRANSFER

CROSS-REFERENCE TO RELATED APPLICATIONS

This application is a U.S. National Stage Application filed under 35 U.S.C. § 371 of PCT/IB2021/060191, filed Nov. 4, 2021, and entitled "IMPROVEMENTS RELATING TO WIRELESS POWER TRANSFER", which claims priority from New Zealand Patent Application Nos. 769644, filed on Nov. 4, 2020 and 771520, filed on Dec. 23, 2020. The entire contents of each of the above-identified patent applications are incorporated herein by reference.

FIELD OF THE INVENTION

The present inventions relative to improvements in wireless power transfer (either wireless power transfer for charging or real-time wireless power transfer).

BACKGROUND OF THE INVENTION

Wireless power transfer systems are used to wirelessly transfer power to a load of interest. Conventionally the load may be a rechargeable power source that provides power to an electronic device such as mobile devices for example, or provide power to a device with a higher power rating such as an electric vehicle for example.

SUMMARY OF THE INVENTION

It is an object of the present invention to provide alternatives to AC switching which can be implemented in wireless power transfer.

In one aspect the present invention may be said to comprise an inductive power transfer receiver comprising: a receiving coil, a AC circuit with the receiving coil, and a transformer sub-circuit connected to the tuned circuit, the transformer sub-circuit comprising a transformer primary side and a transformer secondary side, and at least one AC switch with a switch reference across the primary side of the transformer, wherein in use, the transformer sub-circuit: isolates the switch reference of the AC switch and/or reduces or eliminates any switch reference current due to the AC switch, reduces current in the receiving coil, improves power factor, and/or improves stability in the tuned circuit.

Optionally the transformer sub-circuit provides a switch reference and control signal for the AC switch.

Optionally the switch reference and control signal for the AC switch both are referenced to the ground of the DC sub-circuit.

In another aspect the present invention may be said to comprise an inductive power transfer receiver comprising: a receiving coil, a AC circuit with the receiving coil, and a transformer sub-circuit connected to the tuned circuit, the transformer sub-circuit comprising a transformer primary side and a transformer secondary side, and an AC switch with a switch reference across the primary side of the transformer, wherein in use, the transformer sub-circuit: isolates the switch reference of the AC switch and/or reduces or eliminates any switch reference current due to the AC switch.

In another aspect the present invention may be said to comprise an inductive power transfer transmitter comprising: a transmitting coil, a AC circuit with the receiving coil, and a transformer sub-circuit connected to the tuned circuit, the transformer sub-circuit comprising a transformer primary side and a transformer secondary side, and an AC switch with a switch reference across the primary side of the transformer, wherein in use, the transformer sub-circuit: isolates the switch reference of the AC switch and/or reduces or eliminates any switch reference current due to the AC switch.

Optionally the transformer sub-circuit provides a switch reference and control signal for the AC switch.

Optionally the switch reference and control signal for the AC switch both are referenced to the ground of the DC sub-circuit.

In another aspect the present invention maybe said to comprise an inverter-inductor sub-circuit forming part of an inductive power transfer system comprising: a plurality of inverters each with an output, an inductive sub-circuit comprising: an output inductor for each inverter, and at least one common inductor, wherein the inductive sub-circuit is configured to synchronise and combine an output voltage/current of the plurality of inverters into a common output.

Optionally the plurality of inverters are adapted to receive a common voltage/current input.

Optionally each output inductor is coupled to an respective inverter output such that the plurality of inverters are parallel to each other.

Optionally the plurality of inverters are coupled to the inductive sub-circuit such that each of the plurality of inverters is in series with one output inductor.

Optionally each output inductor are connected between the respective inverter and the at least one common inductor.

Optionally the at least one common inductor is connected in series with each of the plurality of inverters.

Optionally the at least one common inductor is connected in series with each output inductor.

Optionally the output inductors each have a substantially identical inductance.

Optionally the combined inductance of the inductive sub-circuit is from about 2.5 to about 40 times the inductance of each output inductor.

Optionally the inverter outputs each comprise two branches.

Optionally the inverter-inductor sub-circuit further comprises an additional output inductor for each inverter output such that each branch of each inverter output comprises an output inductor.

Optionally each output inductor has an inductance from about 2 uH to about 8 uH.

Optionally there are two common inductors, each common inductor respectively connected to one of the branches of each inverter output.

Optionally each output inductor has an inductance of $N*L_{pi}/2*a$, and each common inductor has an inductance of $L_{pi}*(1-a)/2$, wherein $L_{pi}$=combined inductance of the output inductors, N=number of parallel inverters, and a is a constant.

Optionally $L_{pi}$ has a value from about 20 uH to about 80 uH.

Optionally the inverter-inductor sub-circuit is further adapted to provide a varying current to a primary coil for wirelessly transferring power.

Optionally the inverter-inductor sub-circuit is connected to the primary coil region via a tuning sub-circuit.

Optionally the tuning sub-circuit comprises one or more capacitors, and optionally one or more inductors.

Optionally the plurality of inverters is one or more of: a half-bridge, a full-bridge, or a combination of both.

In another aspect the present invention may be said to comprise an inductive power transfer receiver comprising: a receiving coil, a tuned circuit comprising the receiving coil, and a transformer sub-circuit connected to the tuned circuit, the transformer sub-circuit comprising a transformer primary side and a transformer secondary side, wherein in use, the transformer sub-circuit: reduces current in the receiving coil, improves power factor, and/or improves stability in the tuned circuit.

Optionally the transformer sub-circuit reduces current in the receiving coil by increasing voltage across the transformer primary side that is in series with the receiving coil above voltage on transformer secondary side.

Optionally the transformer sub-circuit improves stability in the tuned circuit by, when a load is connected to the inductive power transfer receiver, presenting an effective real impedance load to the receiving coil that is higher than an actual real impedance of the load.

Optionally the transformer sub-circuit comprises one transformer, comprising a transformer primary coil and a secondary coil.

Optionally the transformer has a turns ratio of the transformer primary coil to the transformer secondary coil, wherein the turns ratio: affects the voltage across and therefore current through the secondary coil, and provides an effective real impedance load which is multiple of the actual real impedance of the load, the multiple being the turns ratio squared.

Optionally the transformer is centre-tapped.

Optionally the transformer secondary coil of the centre-tapped transformer comprises a first secondary coil portion, and a second secondary coil portion.

Optionally the transformer has a turns ratio of the transformer primary coil to the first or second secondary coil portion, wherein the turns ratio: affects the voltage across and therefore current through the first or second secondary coil portion, and provides an effective real impedance load which is multiple of the actual real impedance of the load, the multiple being the turns ratio squared.

Optionally the first and second secondary coil portions that make up the secondary coil of the centre-tapped transformer are connected in parallel with each other.

Optionally the inductive power transfer receiver is for providing power to a load with a voltage rating of about 100V or less or about 200V or less, and a current rating of about 50 A or less.

Optionally the transformer sub-circuit comprises at least one additional transformer, each of the at least one additional transformer comprising a transformer primary coil and a transformer secondary coil.

Optionally the plurality of transformers has a turns ratio of the plurality of transformer primary coils to the plurality of transformer secondary coils, wherein the turns ratio: affects the voltage across and therefore current through the secondary coils, and provides an effective real impedance load which is multiple of the actual real impedance of the load, the multiple being the turns ratio squared.

Optionally the plurality of transformers are connected such that the transformer secondary coils are connected in series with each other.

Optionally the plurality of transformers are connected such that the transformer secondary coils are connected on separate branches from each other.

Optionally the transformer secondary coils form the transformer secondary side of the transformer sub-circuit.

Optionally the plurality of transformers are connected such that the transformer primary coils are connected in series with each other.

Optionally the transformer primary coils form the transformer primary side of the transformer sub-circuit.

Optionally the inductive power transfer receiver is for providing power to a load with a voltage rating of about 100V or more or about 200V or more.

Optionally the plurality of transformers are centre-tapped.

Optionally the transformer secondary coils of the centre-tapped transformers each comprise a first secondary coil portion, and a second secondary coil portion.

Optionally the plurality of centre-transformers have a turns ratio of the plurality of transformer primary coils to the plurality of the first or second secondary coil portions, wherein the turns ratio: affects the voltage across and therefore current through the secondary coils, and provides an effective real impedance load which is multiple of the actual real impedance of the load, the multiple being the turns ratio squared.

Optionally the plurality of centre-tapped transformers are connected such that the first and second secondary coil portions of that make up the plurality of transformer secondary coils of the plurality of centre-tapped transformers are connected in parallel with each other.

Optionally the transformer secondary coils form the transformer secondary side of the transformer sub-circuit.

Optionally the plurality of centre-tapped transformers are connected such that the primary coils are connected in series with each other.

Optionally the transformer primary coils form the transformer primary side of the transformer sub-circuit.

Optionally the inductive power transfer receiver is for providing power to a load with a voltage rating of about 100V or less or about 200V or less, and a current rating of about 50 A or more.

Optionally the tuned circuit also comprises at least one capacitor.

Optionally in the tuned circuit, the receiving coil and the at least one capacitor are connected such that: they are in series or parallel with each other, or can be remodelled such that they are series or parallel with each other.

Optionally in use the transformer sub-circuit improves stability in the tuned circuit to achieve one or more of: lower pads losses, improved power factor, and reduced sensitivity.

In another aspect the present invention is an inductive power transfer system comprising an inductive power transfer receiver according to any of the previous statements.

Optionally the inductive power transfer system further comprises an inductive power transfer transmitter comprising a transmitting coil.

Optionally the inductive power transfer transmitter further comprises at least one inductor and one capacitor to form an LCL tuned circuit with the transmitting coil.

In this specification, "high power application" means an application (of the inductive power transfer system) with a high power rating. This high power rating could be about 4 kW or about 10 kW or more for example.

In this specification, "low power application" means an application (of the inductive power transfer system) with a low power rating. This low power rating could be about 4 kw or about 10 kW or less for example.

The term "capacitor" is a well understood term in the art. However, in this specification, a "capacitor" may also refer to any component that has a capacitive reactance. A "capacitor" may also refer to any combination of components (which may or may not include any capacitors) arranged such that the net reactance of the combination of components is capacitive, and can therefore be remodelled into a capacitor.

The term "inductor" is a well understood term in the art. However, in this specification, an "inductor" may also refer to any component that has an inductive reactance. An "inductor" may also refer to any combination of components (which may or may not include any inductors) arranged such that the net reactance of the combination of components is inductive, and can therefore be remodelled into a inductor. Brief description of the drawings.

In this specification, the term "LCL tuning" refers to a type of tuning that can be applied on the primary/transmitting coil as well as on the secondary/receiving coil of an inductive power transfer system. FIGS. 2C-2F show different examples of LCL tuning. An example of LCL tuning of the primary/transmitting coil is shown in FIG. 2C, where the first "L" in "LCL" refers to block 1 has a net inductive reactance, the "C" in "LCL" refers to block 2 having a net capacitive reactance, and the second "L" in "LCL" refers to block 3 having a net inductive reactance (which is provided by the inductance of the primary/transmitting coil). An example of LCL tuning of the secondary/receiving coil is shown in FIG. 2D, where the first "L" in "LCL" refers to block 1 has a net inductive reactance, the "C" in "LCL" refers to block 2 having a net capacitive reactance, and the second "L" in "LCL" refers to block 3 having a net inductive reactance (which is provided by the inductance of the primary/transmitting coil). It is desirable for the reactance of each of blocks 1-3 to be same in absolute value. For example, blocks 1 and 3 each have an inductive reactance of +X and block 2 has a capacitive reactance of −X. Blocks 1 and 3 can optionally have series capacitors, but both blocks 1 and 3 should have a net inductive reactance despite of them having capacitors. Some further examples of LCL tuning is given in FIGS. 2C-2E where the first and second inductors are split into two identical inductors each with half of the original inductance and series capacitors are added. Splitting the first inductor into two identical ones improves EMI performance.

In this specification, the term "LC tuning"/"LC parallel tuning" refers to a type of tuning that can be applied on the primary/transmitting coil as well as on the secondary/receiving coil of an inductive power transfer system. An example of LC parallel tuning of the secondary/receiving coil is shown in FIG. 2F, where the first "L" in "LCL" refers to block 1 has a net inductive reactance (which is provided by the inductance of the secondary/receiving coil), and the "C" in "LCL" refers to block 2 having a net capacitive reactance. It is desirable for the reactance of each of blocks 1-2 to be same in absolute value. For example, blocks 1 and has an inductive reactance of +X and block 2 has a capacitive reactance of −X. Block 1 can optionally have series capacitors, but block 1 should have a net inductive reactance despite having capacitors. With LC tuning, a DC inductor (Ldc) is provided between the rectifier output and DC capacitor as shown in the example of FIG. 2X—the DC inductor (Ldc) is in a standard circuit at the output stage for a LC parallel tuning.

In this specification, the term "series tuning"/"LC series tuning" refers to a type of tuning that can be applied on the primary/transmitting coil as well as on the secondary/receiving coil of an inductive power transfer system. An example of series tuning of the secondary/receiving coil is shown in FIG. 2F, where block 1 has a net inductive reactance (which is provided by the inductance of the secondary/receiving coil), and block 2 has a net capacitive reactance. It is desirable for the reactance of each of blocks 1-2 to be same in absolute value. For example, blocks 1 and has an inductive reactance of +X and block 2 has a capacitive reactance of −X.

In this specification the variable "w" refers to angular frequency ω.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner. Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

BRIEF DESCRIPTION OF THE DRAWINGS

Embodiments will be described with reference to the following Figures, of which.

DETAILED DESCRIPTION

1. Overview of the Inductive Power Transfer System

An overview of an inductive power transfer system will first be provided to provide background information to the present invention described herein. The inductive power transfer system described below can be used in a variety of applications, for charging and/or real-time powering via inductive power transfer.

The embodiments described herein could be used in any suitable inductive power transfer system for any suitable end use. For example, the embodiments could be used in a system that implements inductive power transfer charging of a charge storage device (such as a battery, super capacitor or similar), for example for a vehicle or other electrical equipment. Alternatively, for example, the embodiments could be used in a system that implements real-time powering via inductive power transfer. Non-limiting examples of the sorts of end uses that require wireless power transfer charging or real-time powering where the embodiments might be used comprise: electric vehicles, electric scooters, electric bikes, robots, manufacturing equipment, charge storage devices (e.g. batteries or supercapacitors), or any other suitable electrical systems/devices ("electrical equipment"). The embodiments described can be used in industrial, commercial and/or domestic situations without limitation. The embodiments described are not restricted to just high-power/high current end-use applications.

Figure 1A:
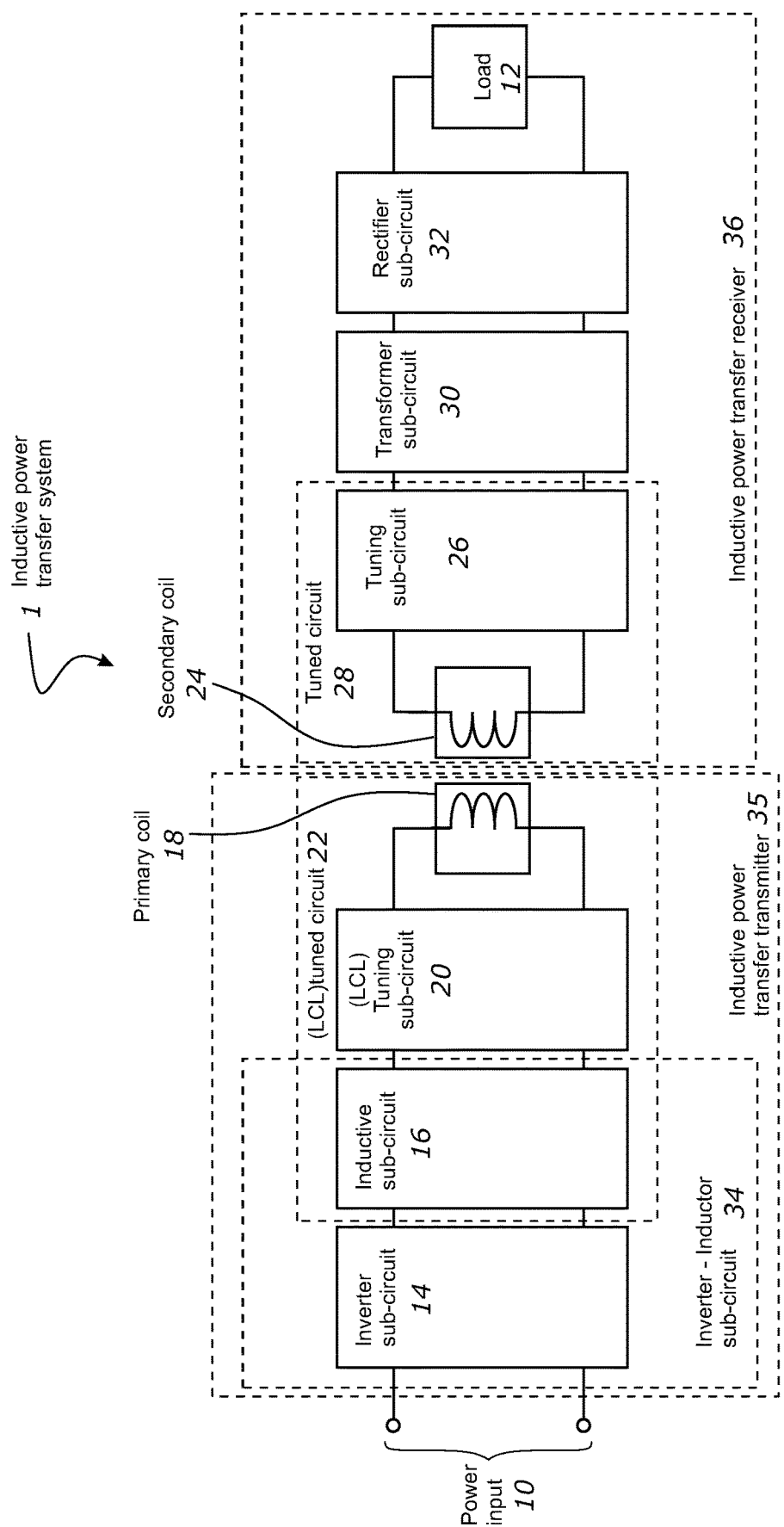
FIGS. 1A-B show overviews of an inductive power transfer system.
Figure 1B:
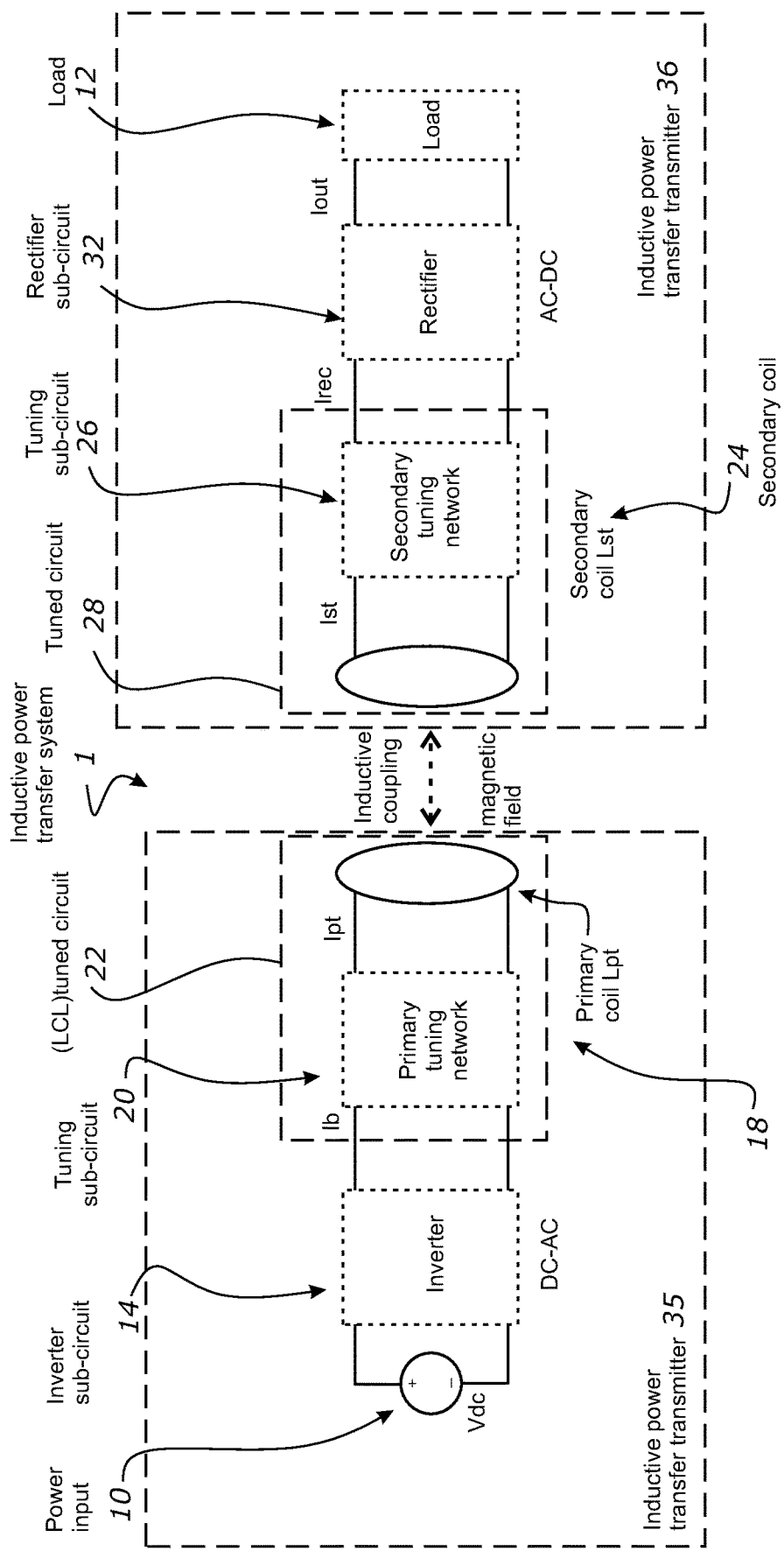

FIG. 1B shows an overview of an inductive power transfer system 1 that wirelessly transfers power from a power input 10 to power a load 12. This is example implements an LCL tuned circuit but that is by way of example only and is not limiting—other tuned circuits could be used. The inductive power transfer system comprises an inductive power transfer transmitter 35 (also termed "transmitter circuit", "transmitter side", "transmitter module") and an inductive power transfer receiver 36 (also termed "receiver circuit", "receiver side", "receiver module"). The inductive power transfer transmitter 35 is the portion of the inductive power transfer system 1 that wirelessly transfers power. The inductive power transfer receiver 36 is the portion of the inductive power transfer system 1 that wirelessly receives power.

Figure 2A:
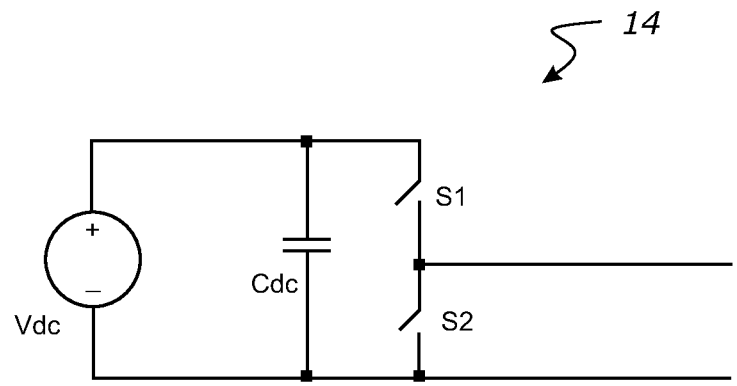
FIGS. 2A-B show different types of inverters.
Figure 2B:
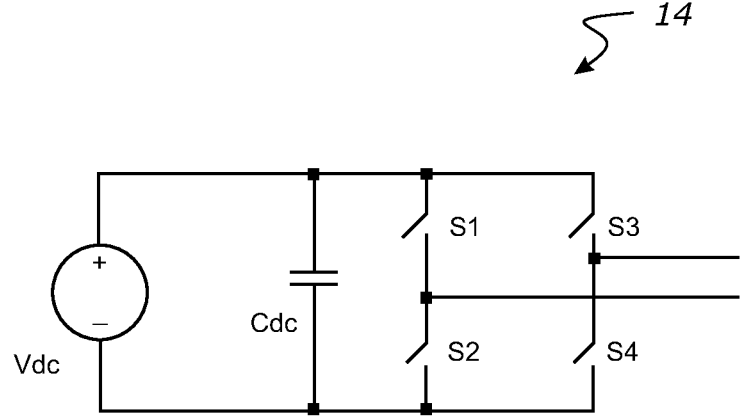
Figure 2C:
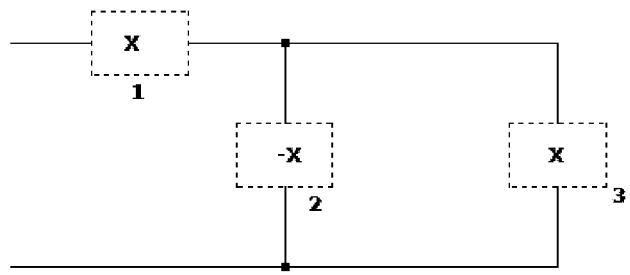
FIGS. 2C-E show different types of LCL tuning.
Figure 2C:
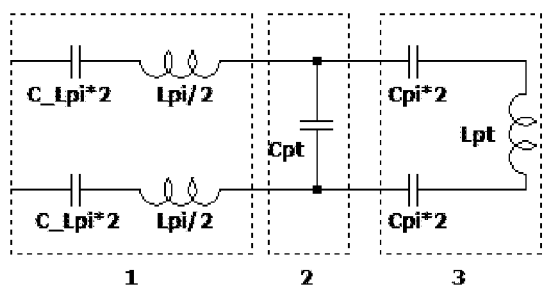
Figure 2C:
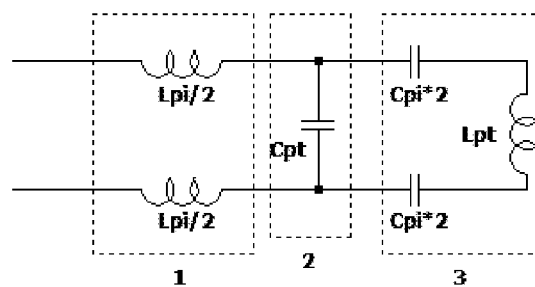
Figure 2C:
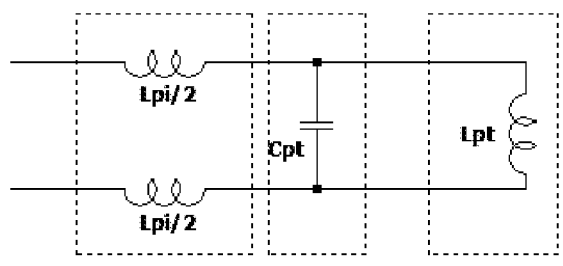
Figure 3A:
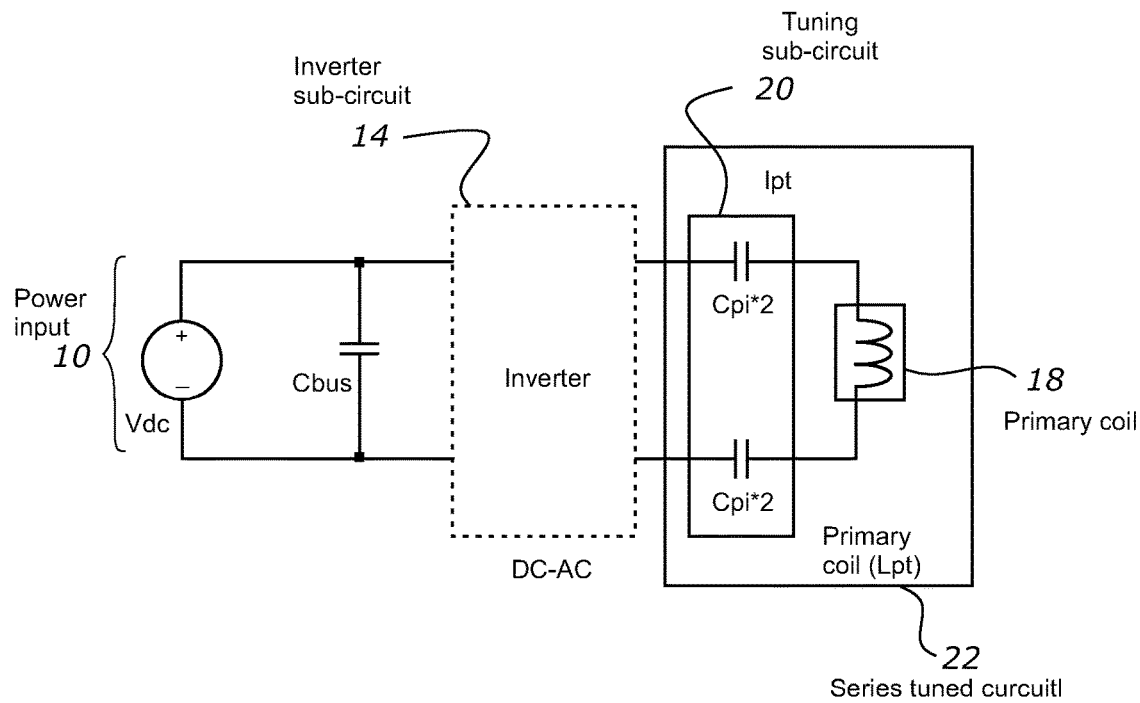
FIGS. 3A-B show different types of tuned circuits on the inductive power transfer transmitter side.
Figure 3B:
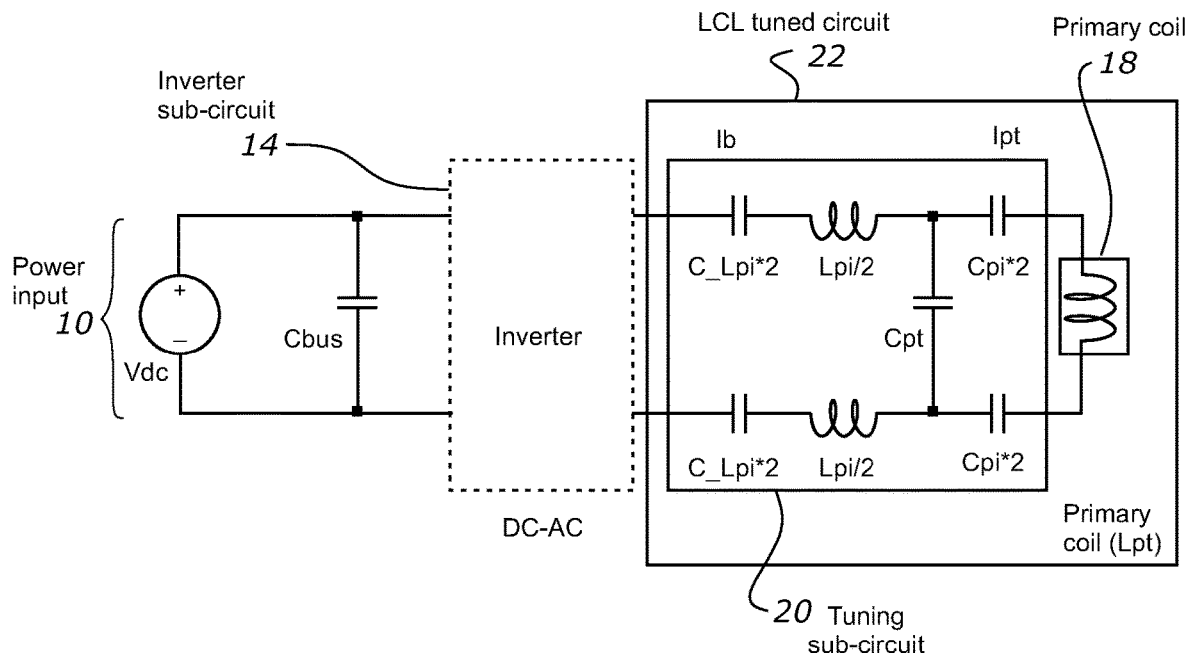

Referring first to the inductive power transfer transmitter 35. The inductive power transfer system 1 in the inductive power transfer transmitter 35 comprises a power input 10. The power input 10 could be a voltage and/or current input. For example, the power input 10 could provide a DC voltage that may be generated from a power factor correction (PFC) unit, a DC-DC converter, a battery, or other types of DC sources. The inductive power transfer system 1 in the inductive power transfer transmitter 35 also comprises an inverter sub-circuit 14, used for converting the direct current of the power input into an alternating current output. The inverter sub-circuit 14 comprises at least one inverter, but preferably two or more. The inverter/s making up the inverter sub-circuit 14 could be a half-bridge (FIG. 2A), a full-bridge (FIG. 2B), another switching mechanism, or a combination of the above. The inverter sub-circuit 14 can be considered a modular standalone component. A skilled person would understand that an inverter sub-circuit 14 is not necessary if the power input already has an alternating current. The inductive power transfer system 1 in the inductive power transfer transmitter 35 also comprises a primary coil 18 used to wirelessly transmit power. The primary coil 18 may have multiple coils combined in series or in parallel but may be collectively referred to as "primary coil 18". The primary coil 18 is tuned by a tuning sub-circuit 20 to such that the primary coil 18 and the tuning sub-circuit 20 form a tuned circuit 22. The tuned circuit 22 can be considered to be modular. The tuned circuit 22 may be series tuned circuit (FIG. 3A for example) in which the tuning sub-circuit 20 has capacitors to tune the primary coil 18. Alternatively the tuned circuit 22 may be a (parallel) LC tuned circuit in which the tuning sub-circuit 20 has capacitors to provide tuning. However it is preferable that the tuned circuit 22 is an LCL tuned circuit (FIG. 3B for example). In an LCL tuned circuit 22, the tuning sub-circuit 20 provides the capacitors and inductors for the primary coil 18 to be LCL tuned circuit. The capacitors used for the LCL tuned circuit 22 are provided by the tuning sub-circuit 20. In addition to the primary coil 18, the inductors used for the LCL tuning 22 can be provided by the tuning sub-circuit 20. Alternatively, the sub-circuit 20 could be other inductor and capacitor combinational tuning forms.

Figure 4A:
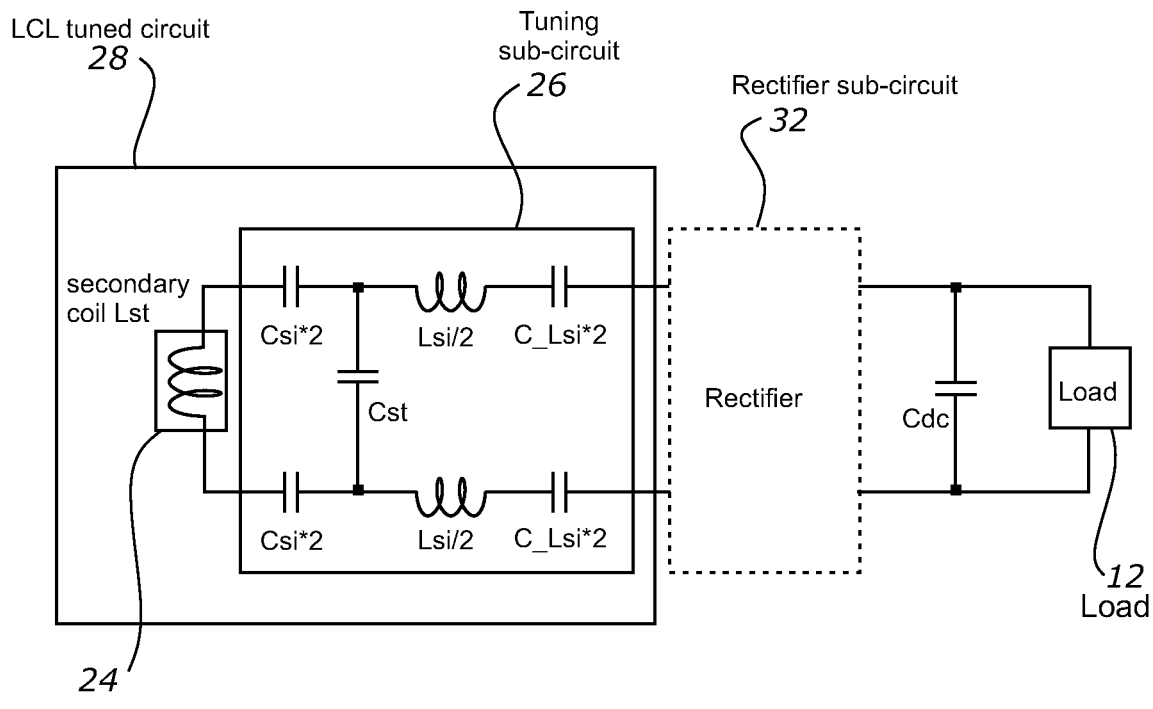
FIGS. 4A-B show different types of tuned circuits on the inductive power transfer receiver side.
Figure 4B:
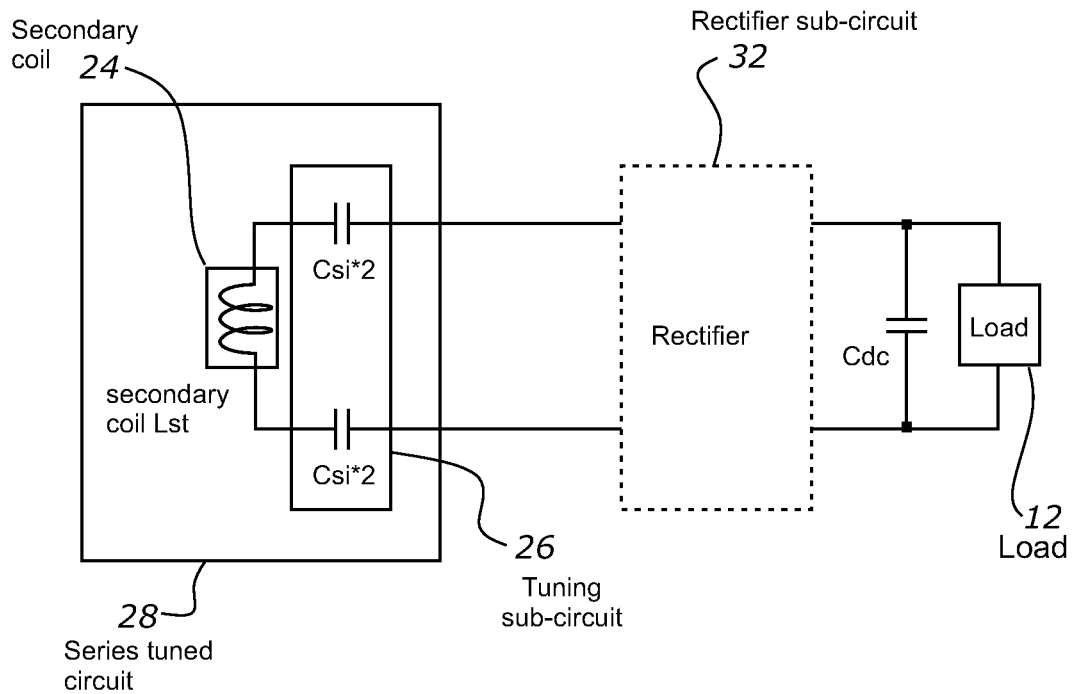

Now referring to the inductive power transfer receiver 36. The inductive power transfer system 1 in the inductive power transfer receiver 36 also comprises a secondary coil 24 for receiving power that has been wirelessly transmitted from the primary coil 18. The secondary coil 24 may have multiple coils combined in series or in parallel but may be collectively referred to as "secondary coil 24". Similar to the primary coil 18, the secondary coil 24 is tuned by a tuning sub-circuit 26 to form a tuned circuit 28. The tuned circuit 28 can be considered to be modular. The tuned circuit 28 may be an LCL tuned circuit (FIG. 4A for example) in which the tuning sub-circuit 26 has inductors and capacitors to provide tuning. Alternatively the tuned circuit 28 may be a (parallel) LC tuned circuit in which the tuning sub-circuit 26 has capacitors to provide tuning. However it is preferable that the tuned circuit 28 is a series tuned circuit (FIG. 4B for example). In a series tuned circuit 28, it is the tuning sub-circuit 26 that provide the capacitors for the secondary coil 24 to be series tuned. The inductive power transfer system 1 also comprises in the inductive power transfer receiver 36 a rectifier sub-circuit 32 for converting alternating current input into a direct current output. The rectifier sub-circuit 32 can be considered to be modular. The inductive power transfer system 1 also comprises a in the inductive power transfer receiver 36 a load 12. A skilled person would understand that having a rectifier sub-circuit 32 is desirable in situations when providing direct current to the load 12 is desirable. In such a situation it is also desirable to connect a capacitor 68 in parallel with the load 12 to filter large alternating current ripples flowing out of the rectifier sub-circuit 32 so that a smoother current (preferably a direct current) can be supplied to the load 12.

FIG. 1A shows an improved inductive power transfer system 1, which has all the features described in the inductive power transfer system 1 shown in FIG. 1B, but has additional features that contribute to an improved inductive power transfer system 1.

The inductive power transfer system 1 of FIG. 1A additionally comprises in the inductive power transfer transmitter 35 an inductive sub-circuit 16, which is designed to operate together with the inverter sub-circuit 14 as an inverter-inductor sub-circuit 34. The purpose of having an inductive sub-circuit 16 to form an inverter-inductor sub-circuit 34 will be discussed later. The inductive sub-circuit 36 can be considered to form part of the LCL tuned circuit 22 if the inductors in the inductive sub-circuit 36 are used to provide LCL tuning to the primary coil 18. That is, in the LCL tuned circuit 22 shown in FIG. 1A, it is the tuning sub-circuit 20 and optionally the inductive sub-circuit 16 that provide the capacitors and inductors for the primary coil 18 to be an LCL tuned circuit. In particular, the capacitors used for the LCL tuned circuit 22 are provided by the tuning sub-circuit 20, and the inductors used for tuning the primary coil 18 can be provided by the inductive sub-circuit 16 and/or the tuning sub-circuit 20.

The inductive power transfer system 1 of FIG. 1A in the inductive power transfer receiver 36 also comprises a transformer sub-circuit 30 comprising one or more transformers. The purpose of having the transformer sub-circuit 30 will also be discussed later.

The remainder of the detailed description will cover in detail the inductive power transfer transmitter 35 and will also cover in detail later the inductive power transfer receiver 36, that each form a part of the inductive power transfer system 1 of FIG. 1A:

Section 2 covers the inductive power transfer transmitter 35, which is formed from the power input 10, the inverter-inductor sub-circuit 34 (which is formed from the inverter sub-circuit 14 and the inductive sub-circuit 16), the tuning sub-circuit 20, and the primary coil 18. The power transfer transmitter 35 also has a tuned circuit 22 which comprises the primary coil 18, the tuning sub-circuit 20, and optionally the inductive sub-circuit 16.

Section 3 covers the inductive power transfer receiver 36, which is formed from tuned circuit 22 (formed by the secondary coil 24 and the tuning sub-circuit 26) and the transformer sub-circuit 30. The inductive power transfer receiver 36 may also optionally include rectifier sub-circuit 32, the load 12 and/or a capacitor 68 connected in parallel with the load 12.

2. Inductive Power Transfer Transmitter

Discussion now turns to the inductive power transfer transmitter 35. The power inductive power transfer transmitter is separate to the inductive power transfer receiver 36, which will be discussed later once the inductive power transfer transmitter 35 is described. The inductive power transfer transmitter 35 and the inductive power transfer receiver 36 together form the inductive power transfer system 1 as shown in FIG. 1A.

The inductive power transfer transmitter embodiments described relate to those where multiple inverters are used. Multiple inverters are typically used where a single inverter cannot provide sufficient current and/or power for the end application. In that case, multiple inverters are used to provide the sufficient current and/or power. Typically, although without limitation, such end applications which require multiple inverters will be those where higher power and/or higher current are required. As an example, this might be applications where the required current and power are greater than or equal to about 10 A and/or greater than or equal to about 4 kW respectively. However, that is by way of example only, and is no way limiting, and the embodiments could be used in end applications with any current/power requirements including in low current/low-power situations where multiple inverters might still for some reason be used.

As can be seen in FIG. 1A, the inductive power transfer transmitter 35 forms one portion of the overall inductive power transfer system 1. The inductive power transfer transmitter 35 is the portion of the inductive power transfer system 1 that wirelessly transfers power accepting a power input 10 to wirelessly transfer power using the primary coil 18. The inductive power transfer transmitter 35 also has an inverter sub-circuit 14, inductive sub-circuit 16 and a tuning sub-circuit 20. The inductive power transmitter 35 may be considered to have a tuned circuit 22 formed from the primary coil 18, the tuning sub-circuit 20, and optionally the inductive sub-circuit.

The inverter sub-circuit 14 is designed to operate together with the inductive sub-circuit 16 to form an inverter-inductor sub-circuit 34, which provides an improved inductive power transfer transmitter 35 as shown in FIG. 1A. The inverter-inductor sub-circuit 34 that forms part of the inductive power transfer transmitter 35 will now be described with reference to FIG. 5. The Inverter-inductor sub-circuit 34 is used to energise and de-energise the primary coil 18 of the inductive power transfer system 1 As discussed previously, sub-circuit 34 comprises an inverter sub-circuit 14, and the inductive sub-circuit 16.

2.1 Circuit Description of Inverter-Inductor Sub-Circuit

In the inverter sub-circuit 14 there are a plurality of inverters 38a-c. Each inverter 38a-c receives a voltage/current input 40a-c and produces a voltage/current output 42a-c with an alternating current. The inverters 38a-c can each receive a separate input with a separate voltage and/or current rating. Alternatively, each inverter 38a-c can receive a common input so that the same voltage and current input is fed into each inverter 38a-c. The sub-circuit 34 also has an inductive sub-circuit 16 that is located at the outputs 42a-c of the inverters 38a-c.

Figure 5:
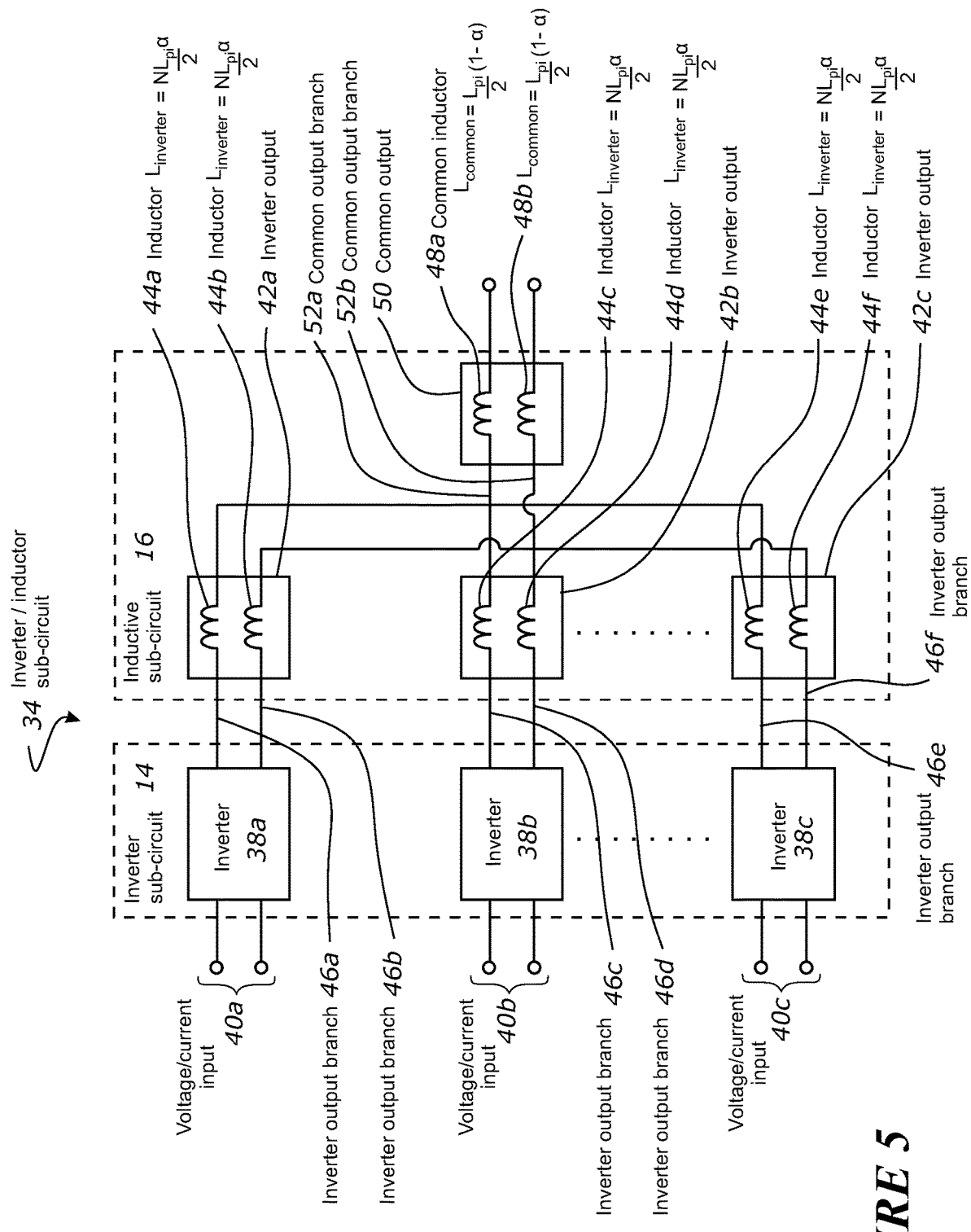
FIG. 5 shows a general embodiment of an inverter-inductor sub-circuit.

In the inductive sub-circuit 16, there is at least one inductor 44a-f located at the output 42a-c of each inverter 38a-c. The inductors 44a-f may be referred to as output inductors to differentiate from the common inductor/s, which will be described later. Each output inductor is coupled to a respective inverter. Preferably each inductor 44a-f is exclusively located at the output of one inverter only, and not located at the output to any other inverter in the inverter sub-circuit 16. That is, the inductor 44a-f is located at a single inverter output 42a-c. By way of example, FIG. 5 shows inductors 44a, 44b placed at inverter output 42a and not at inverter outputs 42b, 42c; inductors 44c, 44d placed at inverter output 42b and not at inverter outputs 42a, 42c; and inductors 44e, 44f placed at inverter output 42c and not at inverter outputs 42a, 42b. Preferably there are two inductors placed at the inverter output, and specifically one inductor placed at each of the two inverter output branches that make up the inverter output. By way of example with reference to FIG. 5: at inverter output 42a, inductor 44a is located on inverter output branch 46a and inductor 44b is located on inverter output branch 46b; at inverter output 42b, inductor 44c is located on inverter output branch 46c and inductor 44d is located on inverter output branch 46d; and at inverter output 42c, inductor 44e is located on inverter output branch 46e and inductor 44f is located on inverter output branch 46f. The inductance of each of the two inductors that are placed at an inverter output 42a-c should preferably be the same. The example shown in FIG. 5 shows inductance of inductors 44a-f to be the same.

The inductive sub-circuit 16 also has at least one common inductor 48a-b. The common inductor 48a-b is located at a common output 50 that is common to two or more inverters 38a-c. Preferably the common inductor is located at an output 50 that is common to all of the inverters 38a-c as can be seen in FIG. 5. Preferably there are two inductors 48a-b placed at the common output 50. In particular, it is preferable the two inductors 48a,b across the two common output branches 52a, b that make up the common output 50. By way of example, FIG. 5 shows common inductor 48a placed on common output branch 52a of the common output 50, and common inductor 48b placed on the common output branch 52b of the common output 50. The inductance of each of the two inductors 48a-b should preferably be the same, as can be seen in FIG. 5.

In use, the inductive sub-circuit 16 is configured to synchronise and combine an output voltage/current of the inverters 42a-c into a common output 50.

As mentioned earlier, some embodiments have the inverters 38a-c may be powered by a common voltage/current input. In such a configuration, the inverters 38a-c are connected in parallel with each other. The plurality of inductors 44a-f that are connected at the outputs 42a-c of the parallel inverters 38a-c are also parallel to each other. The inductors 44a-c can also be considered to be connected in series with each of their respective inverter 38a-c. Referring to FIG. 5 for example, inductors 44a, 44b are connected in series with inverter 38a; inductors 44c, 44d are connected in series with inverter 38b; and inductors 44e, 44f are connected in series with inverter 38c. As the common inductors 48a, 48b are located at the common output 50, the common inductors 48a, 48b can also be considered to be connected in series with each inverter 38a-c and each inductor 44a-f located at the outputs 42a-c of the inverters 38a-c.

The rationale behind the sub-circuit layout as described in FIG. 5A will now be described.

2.2 Operation of Inductor-Inverter Sub-Circuit

It is desirable that there are two or more inverters 38a-c in the inverter sub-circuit 14 so that the current supplied to and from the primary coil is shared between the inverters 38a-c. This reduces power switching losses within the inverters 38a-c. In particular, the sharing of current between the inverters 38a-c reduces both inverter switching currents and inverter conduction losses (which are due to on-state resistance of inverter switches). For current to be shared between the inverters 38a-c, the outputs of the inverters 40 are synchronised. In practice, good synchronisation of the inverter outputs can be difficult to achieve due to slight propagation delays caused by electronic components within the inverters 38a-c. This may result in unequal sharing of current between the inverters 38a-c, which is highly undesirable as the inverters that have a disproportionate amount of current passing through them get overloaded and overheated which eventually leads to failure in these inverters.

The problem of achieving synchronisation between the outputs of the inverters 38a-c can be solved by providing an inductive sub-circuit 16. The inductive sub-circuit 16 comprises a plurality of inductors. Inductors assist with synchronisation as the rate of current change through inductors are finite, therefore preventing sudden changes in current. There is at least one inductor 44a-f that is connected at the output for each inverter to assist with improving the synchronisation of the output voltage/current of the inverters 38a-c. However in addition, at least one common inductor 48a-b is also provided in the inductive sub-circuit 16. One benefit of having a common inductor connected as part of the inductive sub-circuit 16 as opposed to merely having inductors 44a-f located at the outputs 42a-c of the inverters 38a-c is to ensure sufficient inductance is provided across the overall inductive sub-circuit 16 to improve the synchronisation of the output voltage/current of the inverters 38a-c without needing to place large sized inductors at each inverter output 42a-c. Without the common inductor 48a-b, the inductance of the inductors 44a-f placed at the output 42a-c of each inverter 38a-c would need to be significantly increased to provide a sufficiently large inductance needed to improve the synchronisation of the output voltage/current of the inverters 38a-c, which undesirably increases the overall physical size of the sub-circuit 34. The benefit provided by the addition of a common inductor 48*a-b* as part of the inductive sub-circuit 16 therefore allows for a more compact design as it is not essential to use large sized inductors to improve the synchronisation of the output voltage/current of the inverters 38*a-c*, and this benefit becomes even more apparent if more inverters are used in the inverter sub-circuit 14 for reasons that will be provided later.

The addition of one or more common inductors 48*a-b* allows a redistribution of inductance across the entire inductive sub-circuit 16 such that a large portion of the inductance across the entire inductive sub-circuit 16 can be concentrated in the common inductors 48*a-b*. This is so that the inductors 44*a-f* placed at the outputs 42*a-c* of the inverters 38*a-c* can be downsized which results in a more compact inductive sub-circuit 16. To better explain how the inductance is distributed across the entire inductance sub-circuit 16, discussion will now turn to design considerations of the inductance sub-circuit, with reference to FIG. 5.

It should be noted that the tuning circuits described are exemplary and are not limiting. For example, the embodiments extend to variations beyond LC series, parallel, LCL, and can also comprise other LC combinational tuning forms.

2.3 Design of Inductors in Inverter-Inductor Sub-Circuit

Some exemplary guidelines for designing the inductors in the inverter-inductor sub-circuit will now be discussed.

2.3.1 Exemplary Inductance Values

The inductance values of inductors 44 a-f could vary from about 2 uH to about 8 uH for example, based on the following assumptions:

Worst-case delay between inverters may be estimated to be about 20 ns. It is estimated by including delay variations between MOSFET gate driver chips (up to 10 ns) and variations in MOSFET turn-on and turn-off speed (assume up to 10 ns). Assuming an input DC voltage of 400V and an allowable switching current difference of 2 A, we arrive at an inductance of 4 uH. Practically, delays between inverters may not be as large as 20 ns, so if we assume a 10 ns delay, inductance can be reduced to 2 uH. This sets the lower limit for the inductor.

For higher power applications, the input voltage may be 800V, assuming the delay is still 20 ns and 2 A current difference, we arrive at an inductance of 8 uH. This can be considered the max inductance value.

The value of Lpi could vary from about 20 uH to about 80 uH for example. Lpi refers to the combined inductance of the inductive sub-circuit. In the case of FIG. 5 Lpi would be the combined inductance of inductors 44*a-f* and 48*a-b*.

Based on the values provided, we can see that the combined inductance to output inductance ratio can range from 2.5 (based on an inductance calculation of 20 uH/8 uH) to 40 (based on an inductance calculation of 80 uH/2 uH).

Although some absolute values of inductance are provided above, other inductance values may be used if the output inductors each have a substantially identical inductance. Other inductance values can be used instead as long as combined inductance of the inductive sub-circuit 16 is from about 2.5 to about 40 times the inductance of each output inductor. For example, combined inductance of the inductive sub-circuit 16 is from 2.5 to 40 times the inductance of each output inductor.

2.3.2 Exemplary Design Equation

In some embodiments, the inductance of the inductors in the inductive sub-circuit may be calculated according to two equations.

The formula that can be used to calculate the inductance of each inductor located at the inverter outputs can be expressed as:

$$Linverter = N \times \frac{Lpi}{2} \times \alpha$$

Where:
N=number of inverters
Lpi=combined inductance of the inductive sub-circuit
α=constant between 0 and 1

The formula that can be used to calculate the inductance of each inductor located at the common output can be expressed as:

$$Lcommon = \frac{Lpi}{2} \times (1 - \alpha)$$

Where:
Lpi=combined inductance of the inductive sub-circuit
α=constant between 0 and 1

From these two equations, it is desirable to keep the value of α closer to 0 so that inductors placed at the inverter outputs can be kept to a small inductance value (therefore keeping the physical size of these inductors small, and keeping total core losses of the inductors low), while ensuring the overall inductance of the inductive sub-circuit remains sufficiently large enough to be able to synchronise the voltage/current outputs of the inverters. The equations described is simply an example of how to calculate inductance values, however it is possible to use other methodologies to select other inductance values.

Two examples of designing the inductors using the two equations above will be discussed.

In a first design example, we assume a desired Lpi of 30 uH, α=1/15, and we assume there are two parallel inverters such that N=2. In this example the inductors 44*a-d* at the inverter outputs 42*a-b* would each have an inductance of 2 uH, and the common inductors 48*a-b* would each have an inductance of 14 uH.

In a second design example, if the desired Lpi remains at 30 uH, two parallel inverters are still being used such that N=2, but α is set to 1 instead of 1/15, there would be no common inductors 48*a,b* present as the equation for calculating the inductance for the common inductor would result in a zero output. The inductors 44*a-d* at the inverter outputs 42*a-b* would each have an inductor of 30 uH so that the combined inductance Lpi comes to 30 uH.

From these two examples, we can see that the addition of the common inductors 48*a-b* enables the inductors 44*a-d* at the inverter outputs 42*a-b* to be designed with a relatively small inductance. Based on the relatively small inductance of inductors 44*a-d* being 2 uH each, we can infer that use of the common inductors 48*a-b* means the inductors 44*a-d* can be kept relatively small in size. This will be explained next.

This is because the physical size of inductors depends on inductance and the maximum inductor current. In particular, The cross section area of an inductor is proportional to I*L (i.e. the product of the inductor current and inductance). A larger inductance and/or larger peak inductor current leads to a larger inductor or more specifically a larger cross section area, which generally implies a larger sized inductor.

Returning back to our two design examples, if we assume a maximum current of C amps passing into the inductive sub-circuit 16:

In the first design example the inverter output inductors 44a-d would each have a maximum current of C/2 A, and the common inductors 48a-b would each have a maximum current of C A. From this, we can see in the first design example the cross section area of inverter output inductors 44a-d is 2 uH*C/2=CuH*A, and the cross section area of the common inductors 48a-b is 14 uH*C=14 uH*A.

In the second design example the inverter output inductors 44a-d would each have a maximum current of C/2 A. From this, we can see in the second design example the cross section area of the inverter output inductors 44a-d is 30 uH*C/2=15 uH*A.

From the calculations of these two design examples, we can see here that the four inverter output inductors 44a-d being used in the second design example (which has no common inductor) would be 15 times larger in physical size than the four inverter output inductors 44a-d being used in the first design example (which has common inductors 48a-b). Although the two common inductors 44a-d used in the first design example is similar in physical size (14 uH*A each) to the four inverter output inductors 44a-d being used in the second design example (15 uH*A) we can conclude that the addition of the common inductors 44a-d in the first design example has resulted in an overall design that is physically smaller than the second design example, which has no common inductors.

2.3.4 Capacitors

It is desirable to avoid placing capacitors in the inductive sub-circuit 16 since in theory a capacitive reactance counters an inductive reactance, which therefore (at least partially) counters the improved synchronisation of the inverter outputs that the inductors provide. If it is necessary to place capacitors in or near the inductive sub-circuit, these capacitors should preferably have a small capacitive reactance as possible and should be arranged such that the overall reactance at both the inverter outputs and the overall reactance at the common output remain inductive.

Discussion now turns to example embodiments of the sub-circuit 34. Discussion will also turn to derivation of the equations used to design the inductors in the inductive sub-circuit.

2.4 Example Embodiments and Derivation of Final Equation

Higher power levels lead to higher inverter currents and higher operating temperatures for inverter switches on the primary. Connecting outputs of multiple inverter modules directly in parallel and drive them synchronously in theory can force the high current to be shared. However, in practise it may be difficult to guarantee perfect synchronization due to slight difference in propagation delays of electronic components. This may result in unequal load/loss sharing or even short-circuits between the parallel inverter modules depending on the delay.

For example, unequal load sharing occurs if the delay between parallel H-bridge inverters is smaller than the dead time of a half-bridge. Under this condition, one bridge can switch the entire (instead of half) load current, leading to more switching losses on that bridge. Such conditions may eventually cause switch failure due to over-current and over-temperature. Short-circuit conditions can occur if the delay between H-bridge inverters is larger than the dead time of the half bridges. In this case, there will be some time when the outputs of two parallel bridges are at different voltage levels (one at a positive DC voltage, and the other at ground level). This can cause a huge current to flow between parallel H-bridges and easily lead to destruction of electronic switches.

Figure 6A:
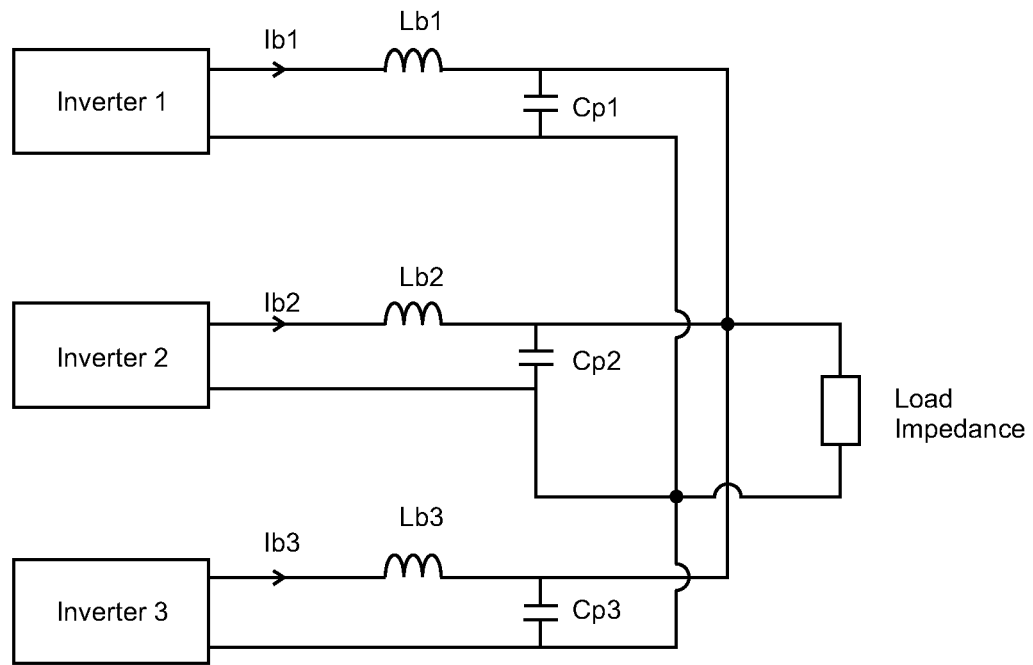
FIGS. 6A-B shows three inverters connected in parallel.
Figure 6B:
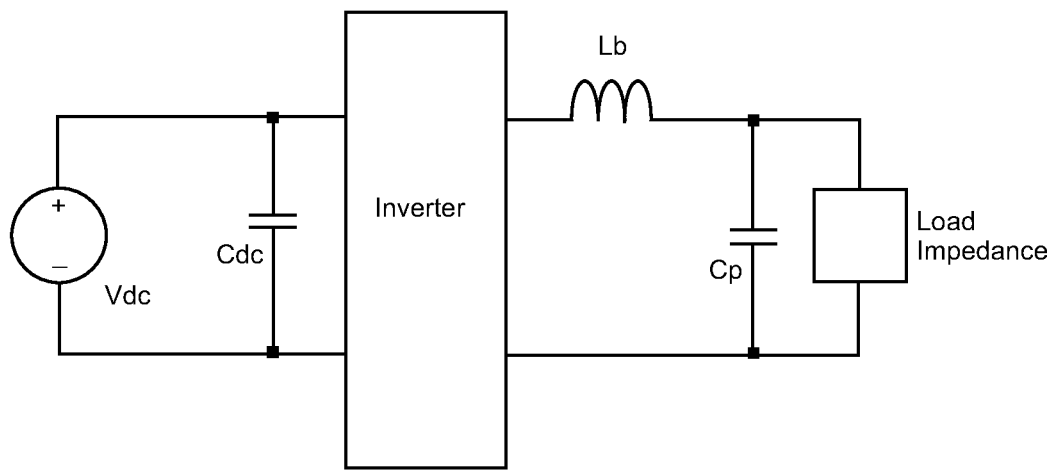

One solution is to place output inductors at the output of each of the parallel inverters, as shown in FIGS. 6A and 6B. However this implementation in itself (without having a common inductor) is impractical.

In FIG. 6A, three inverters are connected in parallel for an LCL tuned primary.

As can be seen from FIG. 6A, the inverter current is shared amongst three parallel modules. An inductor $L_{Bn}$ is connected at one output of each inverter to ensure even current sharing. Parallel capacitors $C_{p1}$, $C_{p2}$ and $C_{p3}$ are effectively connected in parallel. Load impedance represents the reflected impedance of secondary circuits.

Its equivalent circuit is shown in FIG. 6B, where $L_b$ represents the parallel equivalent inductance of $L_{B1}$, $L_{B2}$ and $L_{B3}$, $C_p$ represents the parallel equivalent capacitance of $C_{p1}$, $C_{p2}$ and $C_{p3}$.

It should be pointed out when converting from a single inverter topology of FIG. 6B to the parallel inverter topology in FIG. 6A, the inductance of $L_{B1}$, $L_{B2}$ and $L_{B3}$ is made three times larger than the original inductance $L_b$, assuming $L_{B1}$, $L_{B2}$ and $L_{B3}$ are equal in value. This ensures the original inductance $L_b$ remains unchanged after changing to the parallel topology. If N parallel inverters are used, inductance of $L_{Bn}$ needs to be made N times larger. Clearly, as the number of parallel modules increases, the value of $L_{Bn}$ can becomes quite large. In fact, they can easily become too large for the purpose of controlling current imbalance between inverters caused by slight delays between parallel modules.

Adding inductors to the outputs of parallel inverters (without adding common inductor/s) reduces the unbalanced current issues by limiting the rate of change for the inverter output current such that a large current imbalance cannot develop. This can be further explained by a fundamental equation for inductors:

$$L = \frac{V \times dt}{di}, \quad \text{Equation 1}$$

where V represents the voltage difference between inverter outputs, di is the difference between inverter output currents due to V, dt is the delay between the inverters and L is the inductance connected at the output of inverters.

For example, if a parallel H-bridge inverter is driven by a common input voltage of 450V and the maximum allowable current difference between inverters is 3 A, an output inductor of only 3 uH is required to compensate for a delay of 20 nanoseconds, which is probably more than the typical delay.

For high power LCL tuned primary, value of Lpi (FIG. 3B) or Lb (FIG. 6B) is typically much larger than 3 uH. For example, value of Lpi may be 20 uH, 30 uH or larger. This demonstrates it is not always necessary to make the output inductance of each parallel H-bridge N times larger. In fact, for most applications where a slight current imbalance is acceptable, the required parallel inductance for compensating delay is much smaller than N times the original Lpi value.

Based on this finding, we propose a solution, where only a small portion of Lpi (denoted La) is made N times larger and connected at the output of each H-bridge to make sure the current imbalance due to propagation delays is controlled within specification. This leads to the addition of the common inductor, of which a specific embodiment of the inverter-inductor sub-circuit is shown in FIG. 7.

Figure 7:
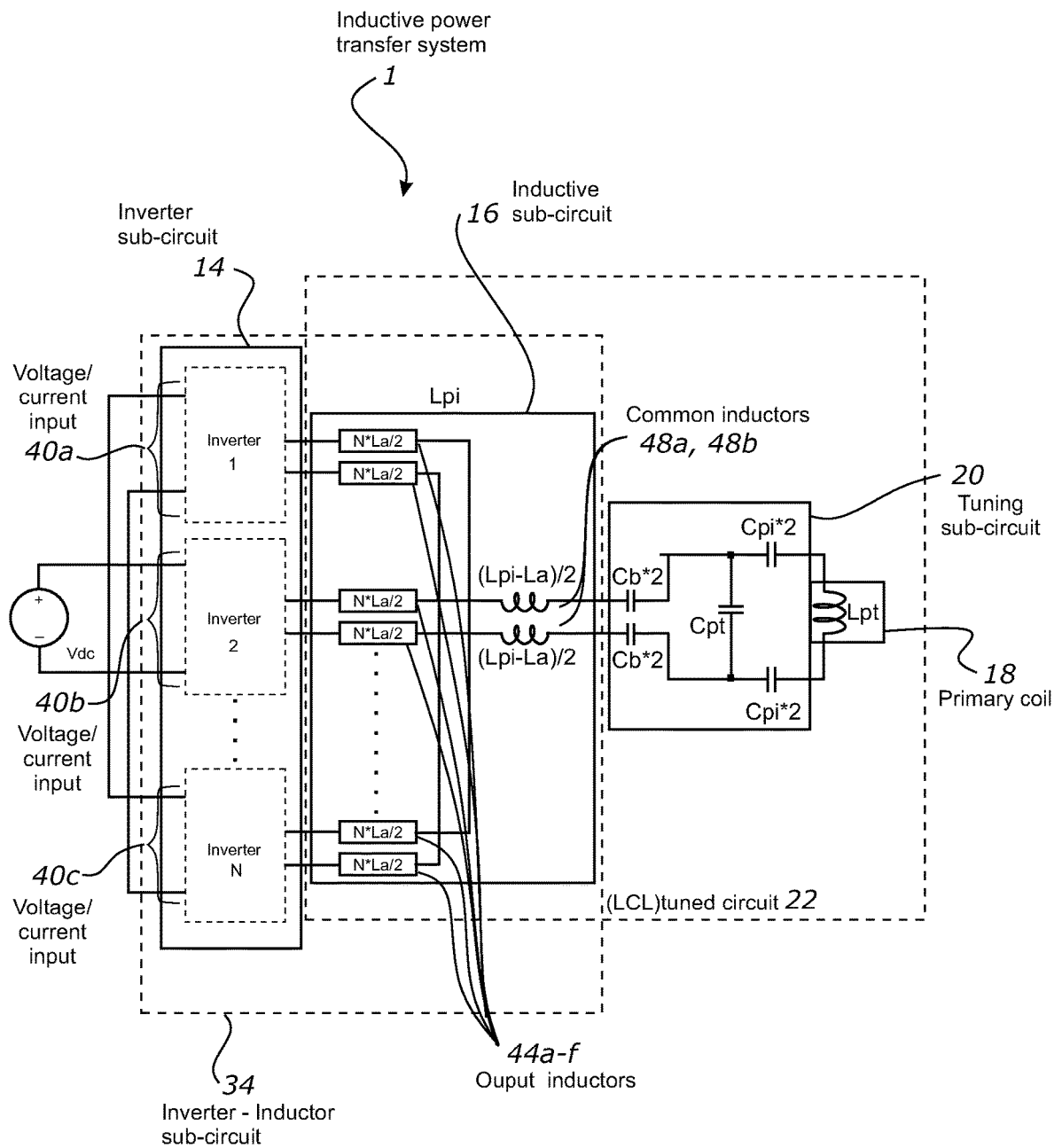
FIG. 7 shows an exemplary embodiment of an inverter-inductor sub-circuit as part of an inductive power transfer system.

It should be noted that in FIG. 7 the combined inductance of all the inductors enclosed in a dashed box is still Lpi so this topology does not alter the original design. Lpi can be split into two identical inductors as shown for electromagnetic interference (EMI) suppression purposes. Another benefit of split Lpi is it ensures both half-bridges of an H-bridge (if used) are protected against delay induced current imbalance.

Figure 8:
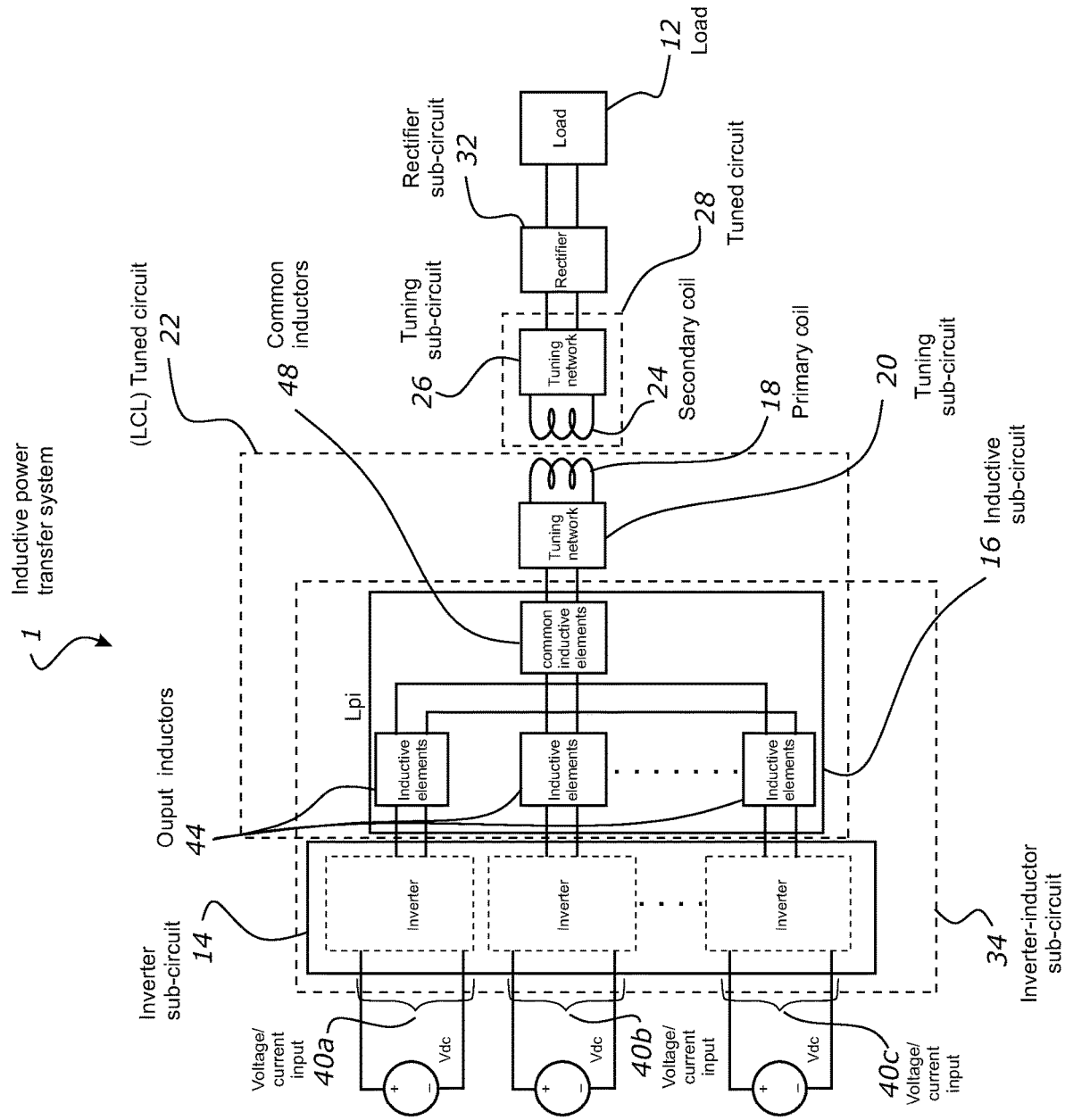
FIG. 8 shows an exemplary embodiment of an inverter-inductor sub-circuit as part of an inductive power transfer system.
Figure 9:
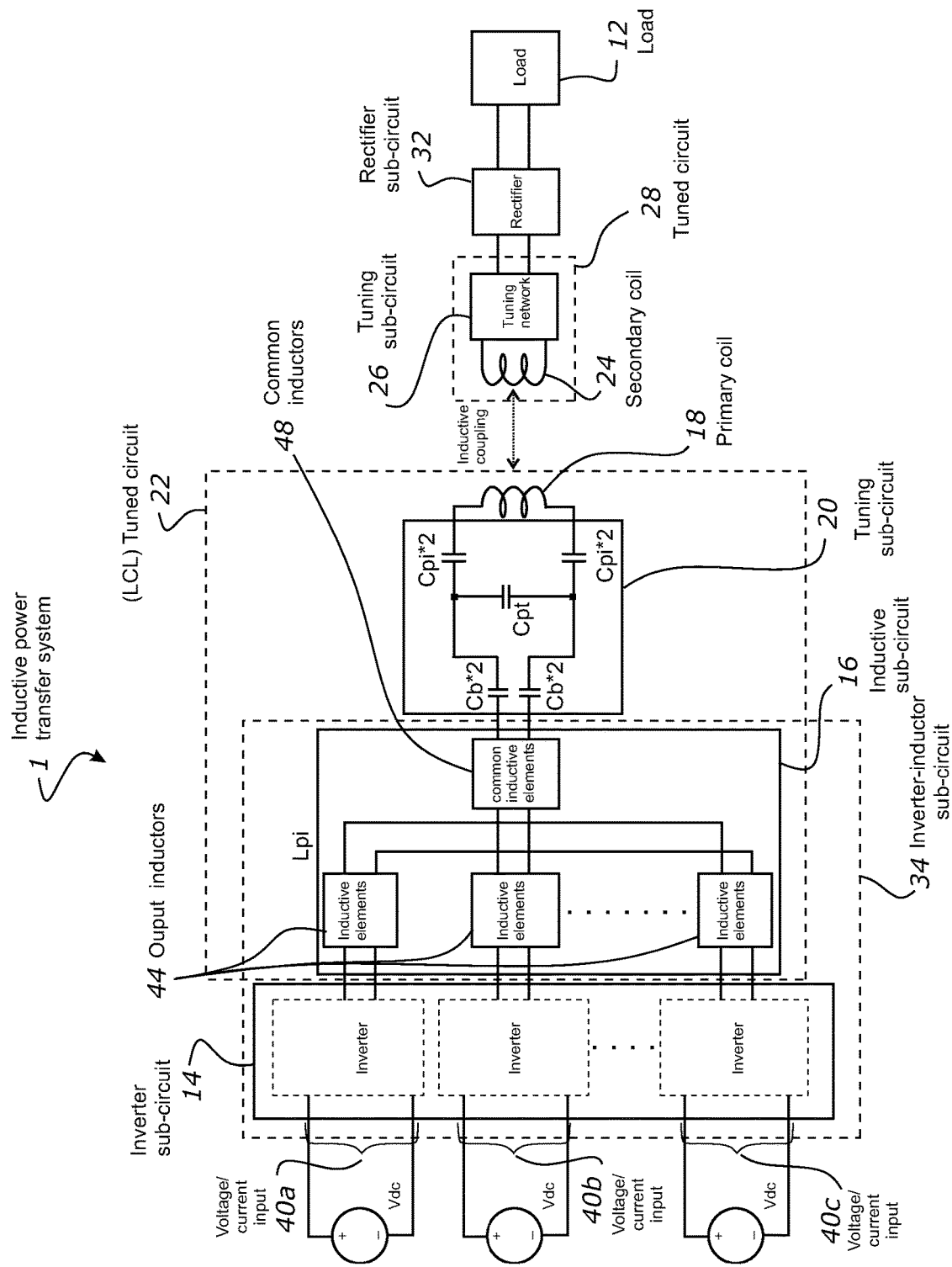
FIG. 9 shows an exemplary embodiment of an inverter-inductor sub-circuit as part of an inductive power transfer system.

Another embodiment of the inverter-inductor sub-circuit as part of an inductive power transfer system 1 is shown in FIG. 8. Another embodiment of the inverter-inductor sub-circuit as part of an inductive power transfer system 1 is also shown in FIG. 9. Each inverter could be driven by a separate DC source or share a common DC source. The inverter output inductive element could be distributed evenly or randomly between two inverter outputs. Inductive elements for each inverter can be different. The common inductive element could also be evenly or randomly distributed. Tuning topologies on both sides can be either LCL, LC parallel, series or other LC combinational forms.

An advantage of this solution is it can reduce the cost and size the parallel inductors compared to the solution in FIGS. 6A and 6B. The advantage becomes more apparent as the number of parallel modules increases.

The following analysis will demonstrate this point by presenting fundamental inductor design equations and comparing the prior art with the proposed topology using these equations.

Inductor design follows Equation 2 and Equation 3:

$$nI_{max} = B_{max} \frac{l_g}{\mu_0} \quad \text{Equation 2}$$

$$L = \frac{\mu_0 A n^2}{l_g} \quad \text{Equation 3}$$

where:
n is the number of turns of the inductor
$I_{max}$ is the maximum inductor current
$B_{max}$ is the maximum ferrite flux density. This value directly determines ferrite core losses.
$I_g$ is inductor air gap length
$\mu_0$ is a constant
A is cross section area of ferrite
L is inductance.

Rearranging Equation 2 and Equation 3 in terms of air gap $I_g$ and eliminate $I_g$ leads to Equation 4.

$$nI_{max} = B_{max} \frac{1}{\mu_0} \frac{\mu_0 A n^2}{L} = B_{max} \frac{A n^2}{L} \quad \text{Equation 4}$$

Rearranging Equation 4 by cancelling n leads to Equation 5:

$$I_{max} = B_{max} \frac{An}{L} \text{ or } I_{max} L = B_{max} An \quad \text{Equation 5}$$

Equation 5 states If two inductor designs can be realized using the same ferrite core (with the same cross section area A) if 1) they have identical products of $I_{max}$ and L, 2) are assumed to have the same number of turns n and 3) are designed to have identical $B_{max}$ values for thermal reasons. The two designs will have different air gaps.

Specifications of the solution of FIGS. 6A and 6B and the inverter-inductor sub-circuit 34 are listed and compared below:

The topology of FIGS. 6A and 6B uses
1. 2*N inductors
2. Each has a peak current of $I_{total}$/N, where $I_{total}$ is the combined currents of all parallel modules
3. Each inductor has an inductance of N*Lpi/2.

In the example of FIG. 7, the inverter-inductor sub-circuit 34 uses:
1. 2*N smaller inductors for N parallel inverters (which may be H-bridges) and (two) larger inductors that are common to all parallel inverters (which may be H-bridges for example).
2. Each smaller inductor has a peak current of $I_{total}$/N. the two larger common inductors has a peak current of $I_{total}$.
3. Each smaller inductor has an inductance of N*Lpi/2*α, where α is always smaller than 1 and close to 0 (because the required inductance for each parallel H-bridge is typically small compared to N*Lpi/2). The two larger common inductors each has an inductance of Lpi*(1−α)/2.

The following observations can be made based on the facts presented above.
1. The topology of FIGS. 6A and 6B needs 2*N number of inductors that each has an $I_{max}$*L product of $I_{total}$/N*N*Lpi/2=$I_{total}$*Lpi/2.
2. In contrast, only the two larger common inductors of the inverter-inductor sub-circuit 34 have an $I_{max}$*L product of Lpi*(1−α)/2*$I_{total}$=Lpi*$I_{total}$/2*(1−α), where (1−α) is close to and less than 1. This means the two larger common inductors of the inverter-inductor sub-circuit 34 is identical to all the inductors in the topology of FIGS. 6A and 6B.
3. However, the rest of inductors of the inverter-inductor sub-circuit 34 (i.e. the output inductors) have a much smaller $I_{max}$*L product of $I_{total}$*Lpi/2*α (because α is small), which means they can be realized using much smaller ferrite cores. This advantage more than compensates the fact that the inverter-inductor sub-circuit 34 requires (two) more inductors.
4. Lastly, the advantage of the inverter-inductor sub-circuit 34 becomes more apparent when 1) more inverters (e.g. H-bridges modules) are connected in parallel, 2) the inverter current gets larger and 3) Lpi gets larger. The first two conditions are directly associated with higher power levels.

Simulation results are presented below to demonstrate the effectiveness of the proposed topology at controlling current imbalance due to delays.

Figure 10:
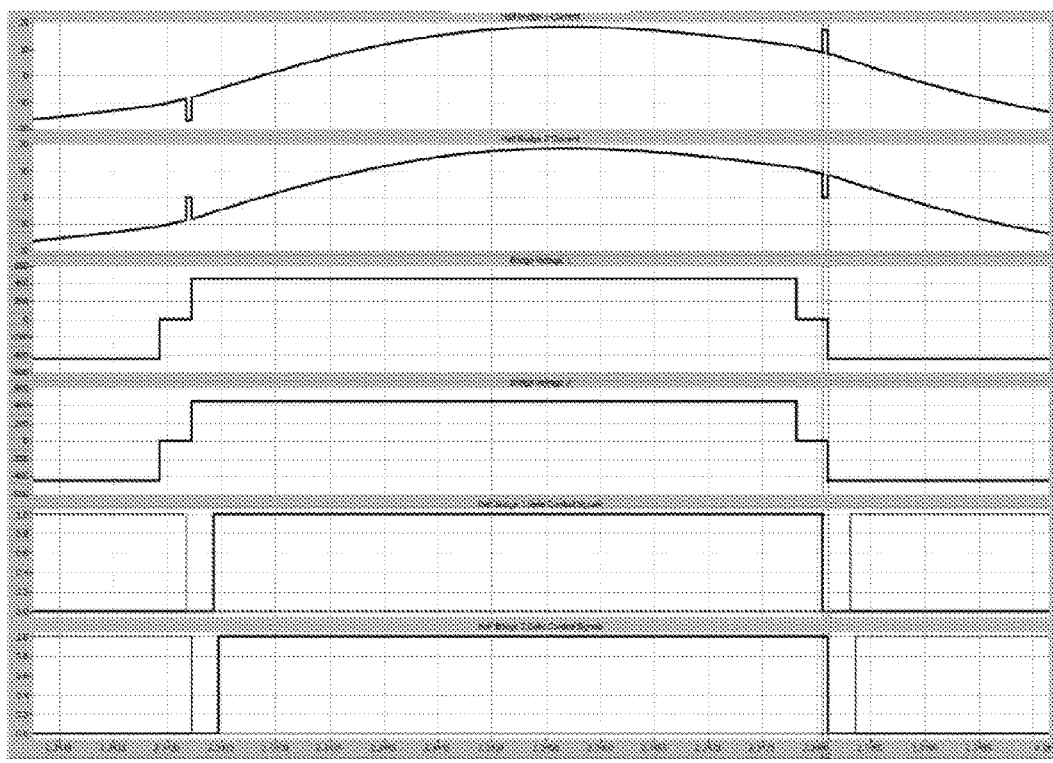
FIG. 10 shows simulation results modelling parallel inverter behaviour when no output inductors are used.

FIG. 10 shows a delay of 50 ns causes one inverter to take all the inverter current during switching when no output inductors are used.

Figure 11:
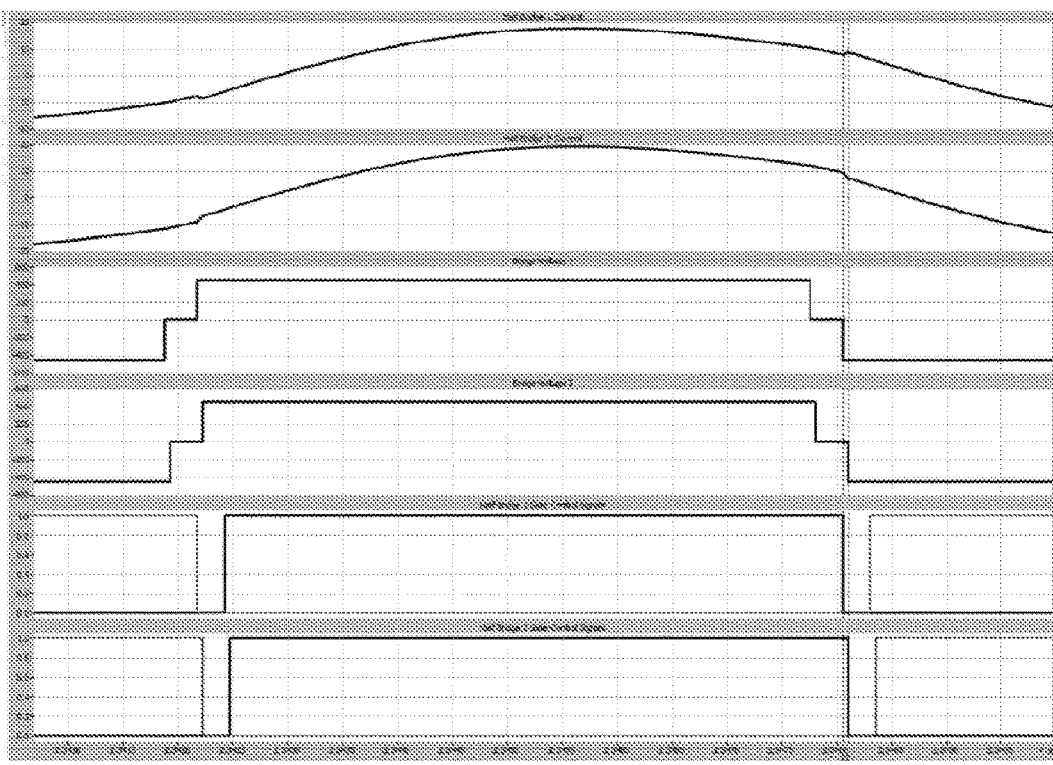
FIG. 11 simulation results modelling parallel inverter behaviour when inductors are placed at the outputs of the inverters.

FIG. 11 shows that adding an inductance of 7.5 uH is sufficient for reducing inverter output current difference to 3 A for the same delay.

In conclusion, the inverter-inductor sub-circuit 34 connects the parallel inductors to a common inductive element, and all the parallel inductors add to the common inductor. The inverter-inductor sub-circuit 34 is desirable for tuning topologies with an existing shared inductor when the objectives are to 1) maintain the value of shared inductor and 2) compensate for delay induced current imbalance between multiple parallel inverters. In other words, the inverter-inductor sub-circuit 34 can achieve these two requirements with reduced cost, weight, and size.

This concludes discussion of the inductive power transfer transmitter 35, which comprises an inverter-inductor sub-circuit 34 that provides an improved inductive power transfer transmitter 35.

3. Inductive Power Transfer Receiver

Discussion now turns to the inductive power transfer receiver 36. The power inductive power transfer receiver is separate to the inductive power transfer transmitter 35 discussed above. The inductive power transfer transmitter 35 and the inductive power transfer receiver 36 together form the inductive power transfer system 1 as shown in FIG. 1B.

3.1 Background to the Inductive Power Transfer Receiver

A background will first be provided to explain the problems that the inductive power transfer receiver 36 solves.

The inductive power transfer receiver embodiments described can be used for any current/power requirements, although the use of a transformer means they might be more likely used (without limitation) in higher current situations, such as greater than or equal to about 10 A and/or greater than or equal to about 4 kW. However, that is by way of example only, and is no way limiting, and the embodiments could be used in end applications with any current/power requirements including in low current/low-power situations where transformers might still be used.

Figure 12:
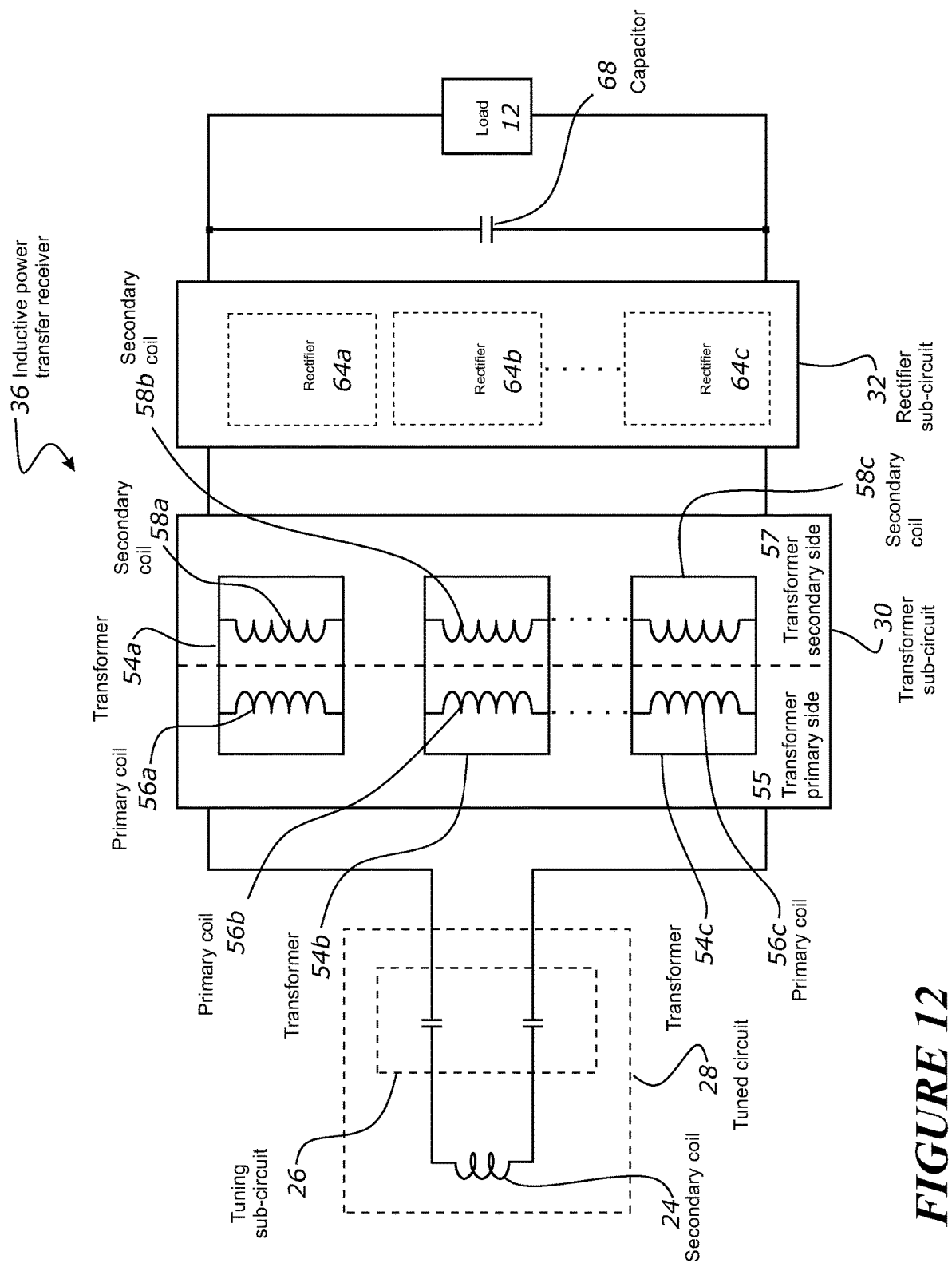
FIG. 12 shows a general embodiment of an inductive power transfer receiver.

In many situations the primary coil 18 and the secondary coil 24 are shielded with ferrite plates and thin aluminium sheets to boost coupling factor and shield magnetic field (induced by the primary and secondary coils) from electronic circuits, as shown in FIG. 12. However, the coil currents generate (eddy current) losses in the wire wound for the coil, the ferrite and/or the aluminium sheet, and these losses are positively correlated to the coil currents. The losses in the ferrite plates and aluminium sheets can be reduced by reducing the current through the primary and the secondary coil. The thermal design for the secondary coil can be particularly challenging in situations where the primary coil is larger than the secondary coil and placed on the ground whereas the secondary coil could be elevated above ground (for example installed upside down in an electric vehicle). In this context, dissipating heat from the secondary coil is especially challenging, which means it is highly desirable to reduce the secondary coil current to reduce heat, so less heat has to be dissipated. It is therefore desirable to have an inductive power transfer receiver (as part of an inductive power transfer system) that can provide a reduced current through the secondary coil 24, so that the in loses the wires wound for the coil, the ferrite and/or losses in the aluminium sheet and ferrite plate are reduced, leading to a cooler secondary pad.

In an inductive power transfer system 1 as shown in FIG. 1B, it is also highly desirable having the ability to control the current being supplied to the load 12. As an example, if the inductive power transfer system 1 has a wireless charging application and the load 12 is a lithium ion battery, it is highly desirable being able to control the current through the lithium ion battery, which may change from 41 A to 2 A for a charging cycle for example. When tuning the secondary coil 24 to improve power factor, having the secondary coil series tuned provides better control of the current supplied to the load 12 than having the secondary coil LCL tuned or LC parallel tuned. However, a drawback of the having a secondary coil series tuned (particularly when the inductive power transfer system has a high power application, for example to provide high output current and low output voltage to a load with ratings of 20V, 1 kW for example) is that there are issues with circuit stability—that is, the inductive power transfer system is sensitive to variations in operating frequency, component values and control inputs, which causes the inductive power transfer system to be unstable or very difficult to be controlled. The circuit instability is caused by a high Q factor i.e. a high secondary coil reactance to load resistance ratio. One solution for fixing circuit stability is to de-tune the secondary coil but this is undesirable as the series tuning of the secondary coil assists with improving power factor, so de-tuning the secondary coil comes at the expense of the power factor. Another solution for fixing circuit stability is to reduce the inductance of the secondary coil 24, however this solution is undesirable because the current through the primary and secondary coils would need to be increased to deliver the same amount of power to the load 12, which leads to additional heat being generated, and could potentially cause problems with overheating. It is therefore desirable to have an inductive power transfer receiver 36 (as part of an inductive power transfer system) that can have a high power application, has an appropriate level of circuit stability and provides an appropriate power factor. Such a sub-circuit should desirably avoid compromising on any of the total power being delivered, the circuit stability, or power factor.

3.2 Main Embodiment of Inductive Power Transfer Receiver

3.2.1 Overview

Description now turns to FIG. 12, which shows the inductive power transfer receiver 36. The inductive power transfer receiver 36 is considered to be a part of an inductive power transfer system 1 that wirelessly receives power so that power can be provided to the load 12 of the inductive power transfer system 12. The inductive power transfer receiver 36 comprises the secondary coil 24 (may be referred to as a "receiving coil" herein), a tuning sub-circuit 26, which comprises at least one capacitor, and the transformer sub-circuit 30, which comprises at least one transformer. In some embodiments the inductive power transfer receiver 36 also comprises the rectifier sub-circuit 32 but this is not essential. The load 12 can be part of the inductive power receiver 36 or can be separate to the inductive power transfer receiver 36. The inductive power transfer receiver 36 may also have a capacitor 68 connected in parallel with the load 12 to provide a smoother voltage input for the load 12, which is desirable in situations where it is desirable to provide a direct current to the load 12.

The secondary coil 24 is for wirelessly receiving power as part of the inductive power transfer system 1. The secondary coil 24 may have multiple coils combined in series or in parallel but may be collectively referred to as "secondary coil 24". The secondary coil 24 is tuned by the tuning sub-circuit 26 to form a tuned circuit 28. It is preferable that the tuned circuit 28 is a series tuned circuit, although this is not essential, and the tuned circuit could be tuned in any other way including for example: an LCL tuned circuit or LC parallel tuned circuit. To form a series tuned circuit, the tuning sub-circuit 26 comprises at least one capacitor. The tuning sub-circuit 26 may have additional components as long as the net reactance of the tuning sub-circuit 26 is capacitive, and the tuning sub-circuit 26 can be remodelled as a capacitor placed in series with the secondary coil 24. This is so that the net capacitive reactance provided by the tuning sub-circuit 26 counters the inductive reactance of the secondary coil 24 to bring power factor closer to unity, hence improving power factor.

In some embodiments, the order of the tuning sub-circuit 26 and the transformer sub-circuit 30 may be reversed such that the transformer sub-circuit 30 is located between the secondary coil 24 and the tuning sub-circuit 26. When the transformer sub-circuit 30 is placed between the secondary coil 24 and the tuning sub-circuit 26, the transformer sub-circuit 30 can be considered to be within the tuned circuit 28. Although the tuning sub-circuit 26 is not in series with the secondary coil 24 (since the current passing through the tuning sub-circuit 26 is different to the current through the secondary coil 24), it is possible to remodel the inductive power transfer receiver 36 (without the transformer sub-circuit 30) to have the secondary coil 24 in series with the tuning sub-circuit 26. For this reason, the secondary coil 24 can still be considered to be tuned by the tuning sub-circuit 26 to form a tuned circuit 28 (and more specifically a series tuned circuit), even when there is a transformer sub-circuit 30 between the secondary coil 24 and the tuning sub-circuit 26.

The transformer sub-circuit 30 comprises one or more transformers 54a-c that steps-down voltage (from the transformer primary side (facing the secondary coil) 55 to the transformer secondary side (facing the load) 57) and steps-up current (from the transformer primary side 55 to the transformer secondary side 57). For this to happen, the transformer sub-circuit 30 should have more coil turns on the transformer primary side 55 than on the transformer secondary side 57. This can be achieved by configuring the transformers 54a-c such that there are more coil turns on the primary coils 56a-c than on the secondary coils 58a-c. Increasing the primary coil turn to secondary coil turn ratio decreases the current through the secondary coil 24, which becomes increasingly desirable as the desired power to be delivered to the load 12 increases. Standard transformers are depicted in the transformer sub-circuit 30, however in some embodiments, one or more centre-tapped transformers can be used in the transformer sub-circuit 30 instead of standard transformers. Centre-trapped transformers will be discussed in greater detail later on.

The inclusion of the transformer sub-circuit 30 improves the performance of the inductive power transfer receiver 36 by achieving one or more of: 1) lowering secondary coil current, 2) improving stability of the inductive power transfer receiver, and 3) improving power factor of the inductive power factor, regardless of how the secondary coil is tuned:

First, as explained in the background, the current through the secondary coil 24 can be problematic as the secondary coil current induces eddy currents in the nearby ferrite plate and aluminium sheets used to shield the magnetic field of the secondary coil current from interfering with electronics nearby. This can lead to overheating issues if not addressed. Adding a transformer sub-circuit 30 into the inductive power transfer receiver 36 decreases the current through the secondary coil 24 when the transformer sub-circuit 30 has one or more transformers having more coil turns on the primary side of the transformer sub-circuit 30 (the side that faces the secondary coil 24) than on the secondary side (the side that faces the load 12). By configuring the transformers in this way, the current through the secondary coil is set to a lower value than the current through the load 12, thus resulting in a reduced secondary coil current. The secondary coil current can be reduced even further if the one or more transformers in the transformer sub-circuit 30 are configured to have a higher transformer primary to transformer secondary coil turn ratio. For example, if there are twice as many transformer primary coil turns as transformer secondary coil turns, then the secondary coil current can be decreased to be 50% of the desired load current; and if there are four times as many transformer primary coil turns as transformer secondary coil turns, then the secondary coil current can be further decreased to be 25% of the desired load current. If the desired load current increases, the transformer primary to transformer secondary coil turn ratio should increase also to ensure the secondary coil current is reduced to an acceptable level.

For example, consider an inductive power transfer receiver having a series tuned secondary coil designed to deliver 1.2 kW into a Lithium ion battery with a nominal voltage of 29V. From these specifications, we can work out the max DC output current is 41 A (1.2 kW/29V). If no transformer is used, the secondary coil current is 45.5 A, which is calculated as $41*pi/sqrt(8)$ (with $pi/(sqrt(8))$ being a DC to AC conversion ratio). This secondary coil current is undesirably high. A centre tapped transformer has one primary core and a secondary coil comprising two identical coil portions. The two secondary coil portions are connected in series at a centre tap position. Adding a centre-tapped transformer with a turns ratio of 4:1:1 (primary turns: secondary turns: secondary turns) reduces the secondary coil current by a factor of 4 (from 45.5 A to 11.3 A). This corresponds to approximately a 16 times reduction in secondary coil losses.

Second, as explained in the background, tuning the secondary coil contributes to circuit instability. The addition of a transformer sub-circuit addresses this problem For example, providing series tuning to the secondary coil to form a series tuned circuit contributes to circuit instability, which is undesirable. The circuit instability is caused by a high Q factor, which in the case of a series tuned secondary coil is caused by a high secondary coil inductance to load resistance ratio. The addition of the transformer sub-circuit 30 effectively increases the perceived load resistance (from perspective of the secondary coil). The perceived load resistance is greater than the actual load resistance by the square of the factor corresponding to the turns ratio in the transformer sub-circuit 30. For instance, if there are four times as many coil turns on the primary side of the transformer sub-circuit 30 (the side that faces the secondary coil 24) than the secondary side (the side that faces the load 12), then the load resistance perceived from the perspective of the secondary coil would be sixteen times the actual load resistance. By having a perceived load resistance that is greater than the actual load resistance, the secondary coil inductance to load resistance ratio decreases, leading to a lower Q factor, thus adding more stability to the circuit, without needing to compromise on power factor or compromise on the power delivered to the load 12. A more detailed explanation is provided later.

Third, the addition of the transformer sub-circuit improves power factor of the inductive power transfer receiver. In an inductive power transfer receiver there can be issues around component tolerance issue as it can be hard to achieve good power factor as the tolerance can result in large variations in reactance in the tuning sub-circuit, and combined with the low load resistance it makes it hard to achieve power factor in practice. Although in theory good power factor is achieved by putting in a capacitive reactance in the tuning sub-circuit to counteract the inductive reactance from the secondary coil, in practice the tolerance of the reactance of the tuning components means you might not be anywhere near your design value. Adding a transformer sub-circuit restricts the effects of component tolerance such that power factor does not vary as wildly, therefore improving power factor of the inductive power transfer receiver. A more detailed explanation is provided later.

Hence, as explained above, the addition of the transformer sub-circuit 30 provides an improved inductive power transfer receiver 36. As will be explained in more detail later, the addition of the transformer sub-circuit 30 provides an improved inductive power transfer receiver 36, irrespective of how the secondary coil is tuned (e.g. addition of the transformer sub-circuit 30 provides one or more benefits mentioned in the points above regardless of whether the secondary coil is series tuned, LC parallel tuned, LCL tuned or other LC combinational tuning forms).

3.2.2 Transformer Sub-Circuit Design

Discussion now turns to the design of transformer sub-circuit 30 with reference to FIGS. 12-15.

Referring to FIG. 12, the transformer sub-circuit 30 is a part of the inductive power transfer receiver 36 that provides an improved inductive power transfer receiver 36. FIG. 12 shows a generic form of a transformer sub-circuit 30 that can be split into two half-portions: the transformer primary side 55 and the transformer secondary side 57. In this specification, the transformer primary side 55 refers to the side of the transformer sub-circuit 30 that is closest to the secondary coil 24, and the transformer secondary side 57 refers to the side of the transformer sub-circuit 30 that is closest to the load 12. The transformer primary side 55 and transformer secondary side 57 should be configured such that the transformer sub-circuit 30 reduces current in the secondary coil 24 and increase the perceived load resistance (from perspective of the secondary coil) to improve circuit stability. This can be achieved by having more turns on the transformer primary side 55 than on the transformer secondary side 57.

The transformer sub-circuit 30 shown in FIG. 12 may have a single transformer 54a or multiple transformers 54a-c. Each transformer 54a-c in the transformer sub-circuit 30 is considered to have a (transformer) primary coil 56a-c that forms (a part of, or all of) the transformer primary side 55, and a (transformer) secondary coil 58a-c that forms (a part of, or all of) the transformer secondary side 57. In some embodiments, the transformer sub-circuit 30 may have one or more centre-tapped transformer. Each centre-tapped transformer in the transformer sub-circuit 30 is considered to have a primary coil that forms (a part of, or all of) the transformer primary side 55, and a secondary coil that forms (a part of, or all of) the transformer secondary side 57. The secondary coil of each centre-tapped transformer is also considered to have a first secondary coil portion and a second secondary coil portion such that the transformer tap separates the first and second secondary coil portions.

Exemplary embodiments of the transformer sub-circuit 30 will now be discussed with reference to FIGS. 13-15. These embodiments are described simply to show several examples, and should not be taken to be limiting the scope of what the transformer sub-circuit 30 could look like.

3.2.2.1 First Transformer Sub-Circuit Embodiment

Figure 13:
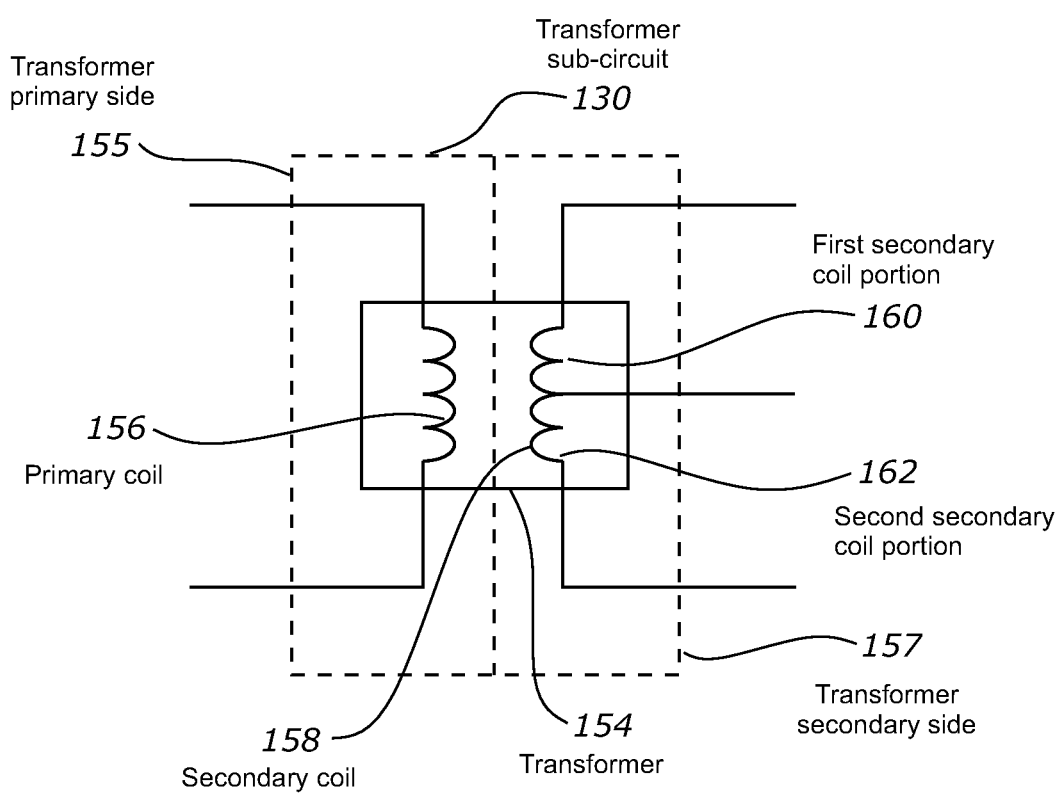
FIG. 13 shows one exemplary embodiment of a transformer sub-circuit.

FIG. 13 shows one embodiment of a transformer sub-circuit 130 comprising a single transformer 154 that is centre-tapped. The transformer 154 has a primary coil 156 and a secondary coil 158. In this embodiment, the primary coil 156 can be considered to form the transformer primary side 155, and the secondary coil 158 can be considered to form the transformer secondary side 157. The secondary coil 158 is centre-tapped such that the secondary coil 158 can be considered to be split into a first secondary coil portion 160, and a second secondary coil portion 162. The first second secondary coil portion 160 and the second secondary coil portions 162 are connected in parallel with each other. Both the first and second secondary coil portions 160, 162 should have the same (or similar) number of coils. The turns ratio of the primary coil 156a to the first and/or second secondary coil portion 160, 162 determines the current through the secondary coil 24. The primary coil 156 should have more turns than the first secondary coil portion 160 to reduce current through the secondary coil 24. The primary coil 156 should also have more turns than the second secondary coil portion 162 to reduce current through the secondary coil 24. The primary coil 156 should also have more turns than on the secondary coil 158 to reduce current through the secondary coil 24.

Use of this transformer sub-circuit 130 embodiment is suitable when the desired voltage across the load 12 is sufficiently low as this means a single transformer 54 with small single ferrite core is sufficient. This rationale is governed by this equation:

$$V*t = N*B*A$$

where V is the transformer winding voltage (of the first and/or second secondary coil portions 160, 162), N is winding turns count (of the first and/or second secondary coil portions 160, 162), B is magnetic flux density of the ferrite core and A is the cross section area of the transformer. Since the transformer winding voltage is determined by the load voltage, a lower transformer winding voltage means the cross section are of the transformer ferrite can be smaller, which means a compact single transformer is sufficient to meet the needs voltage needs of the load 12.

Using the transformer sub-circuit 130 embodiment is therefore preferred when desired voltage across the load 12 is low (e.g. less than about 100V or less than about 200V for example), and the desired current through the load 12 is low (e.g. less than about 30 A or less than about 20 A for example), as using a single centre-tapped transformer 154 is sufficient to meet the current and voltage needs of the load 13, while providing a compact transformer sub-circuit design.

3.2.2.2 Second Transformer Sub-Circuit Embodiment

Figure 14:
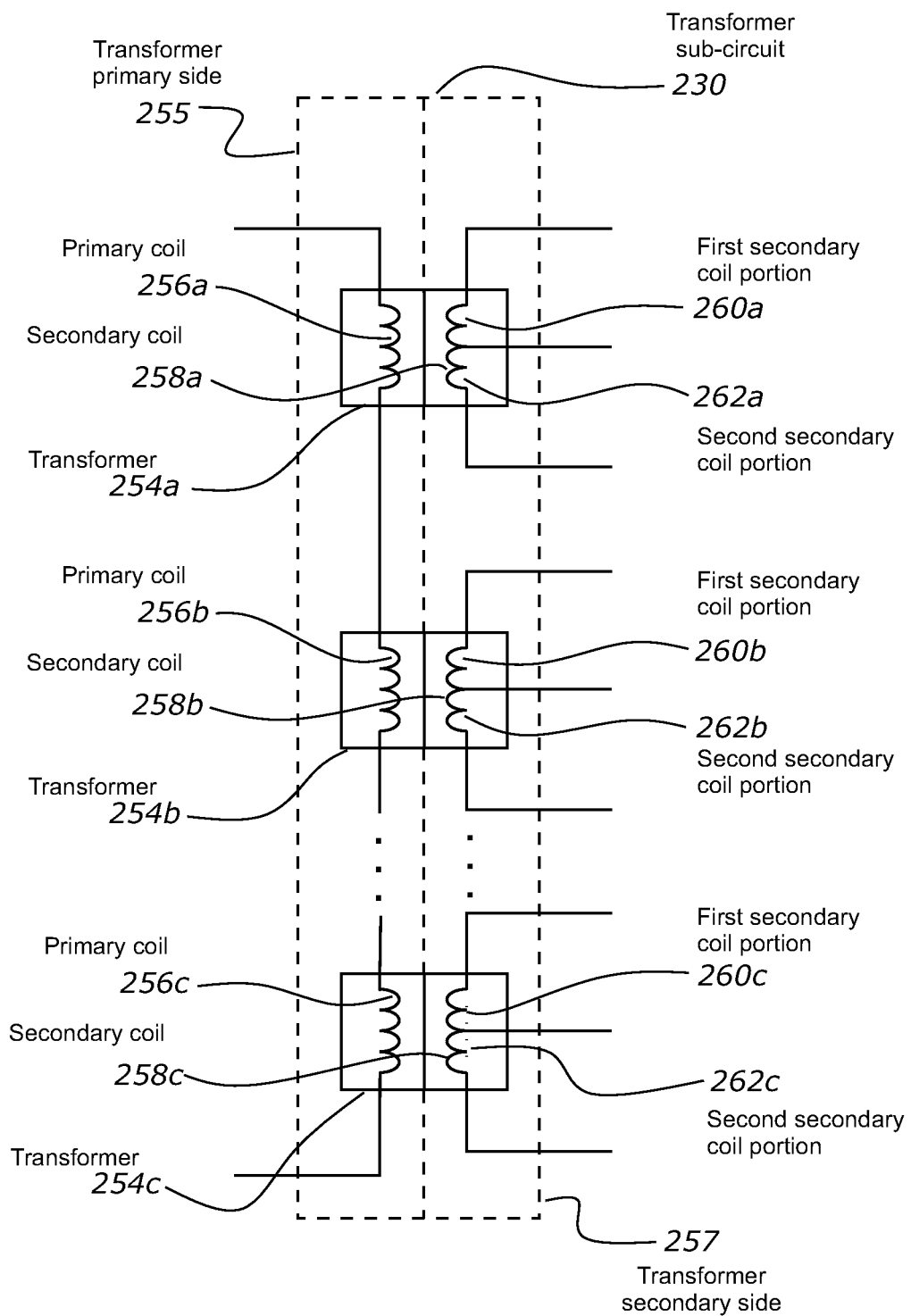
FIG. 14 shows another exemplary embodiment of a transformer sub-circuit.

FIG. 14 shows another embodiment of a transformer sub-circuit 230 comprising multiple transformers 254a-c that are centre-tapped. The transformers 254a-c respectively have a primary coil 256a-c and a secondary coil 258a-c. In this embodiment, the primary coils 256a-c can be considered to form the transformer primary side 255, and the secondary coils 258a-c can be considered to form the transformer secondary side 257. The primary coils 256a-c are connected in series with each other. The secondary coils 258a-c are centre-tapped such that the secondary coils 258a-c can be considered to be split into a first secondary coil portion 260a-c, and a second secondary coil portion 262a-c. The first second secondary coil portions 260a-c should all be connected in parallel with each other to share the load current. Similarly, the second secondary coil portions 262a-c should all be connected in parallel with each other to share the load current. Both the first secondary coil portions 260a-c should have the same (or similar) number of coils as the respective second secondary coil portions 262a-c. For each transformer 254a-c, the turns ratio of the primary coil 256a-c to the first and/or second secondary coil portion 260a-c, 262a-c determines the current through the secondary coil 24. For each transformer 254a-c, the primary coil 256a-c can optionally have more turns than the respective first secondary coil portion 260a-c to reduce current through the secondary coil 24. For each transformer 254a-c, the primary coil 256a-c can also optionally have more turns than the respective second secondary coil portion 262a-c reduce current through the secondary coil 24. For each transformer 254a-c, the primary coil 56a-c should also have more turns than on the secondary coil 258a-c to reduce current through the secondary coil 24.

Transformer sub-circuit 230 differs from transformer sub-circuit 130 in that multiple centre-tapped transformers are used. Using multiple centre-tapped transformers as opposed to a single centre-tapped transformer is advantageous when the desired current through the load 12 is sufficiently high that a higher coil turns ratio is required to sufficiently decrease the current through the secondary coil 24 to an acceptable level. It is more practical setting a high coil turns ratio when multiple centre-tapped transformers are used as opposed to a single centre-tapped transformer, since the primary coils 256a-c are connected in series with each other, which helps increase the overall number of coils on the transformer primary side 255. Usage of the transformer sub-circuit 230 is therefore preferred when desired voltage across the load 12 is low (e.g. less than about 100V or less than about 200V for example). and desired current through the load 12 is high (e.g. greater than about 30 A or greater than 20 A for example).

Another advantage of transformer sub-circuit 230 is that the series connected primary coils 256a-c forces current to be shared equally across secondary coils 258a-c, whilst being insensitive to variations in transformer parameters, leading to a stable design.

3.2.2.3 Third Transformer Sub-Circuit Embodiment

Figure 15:
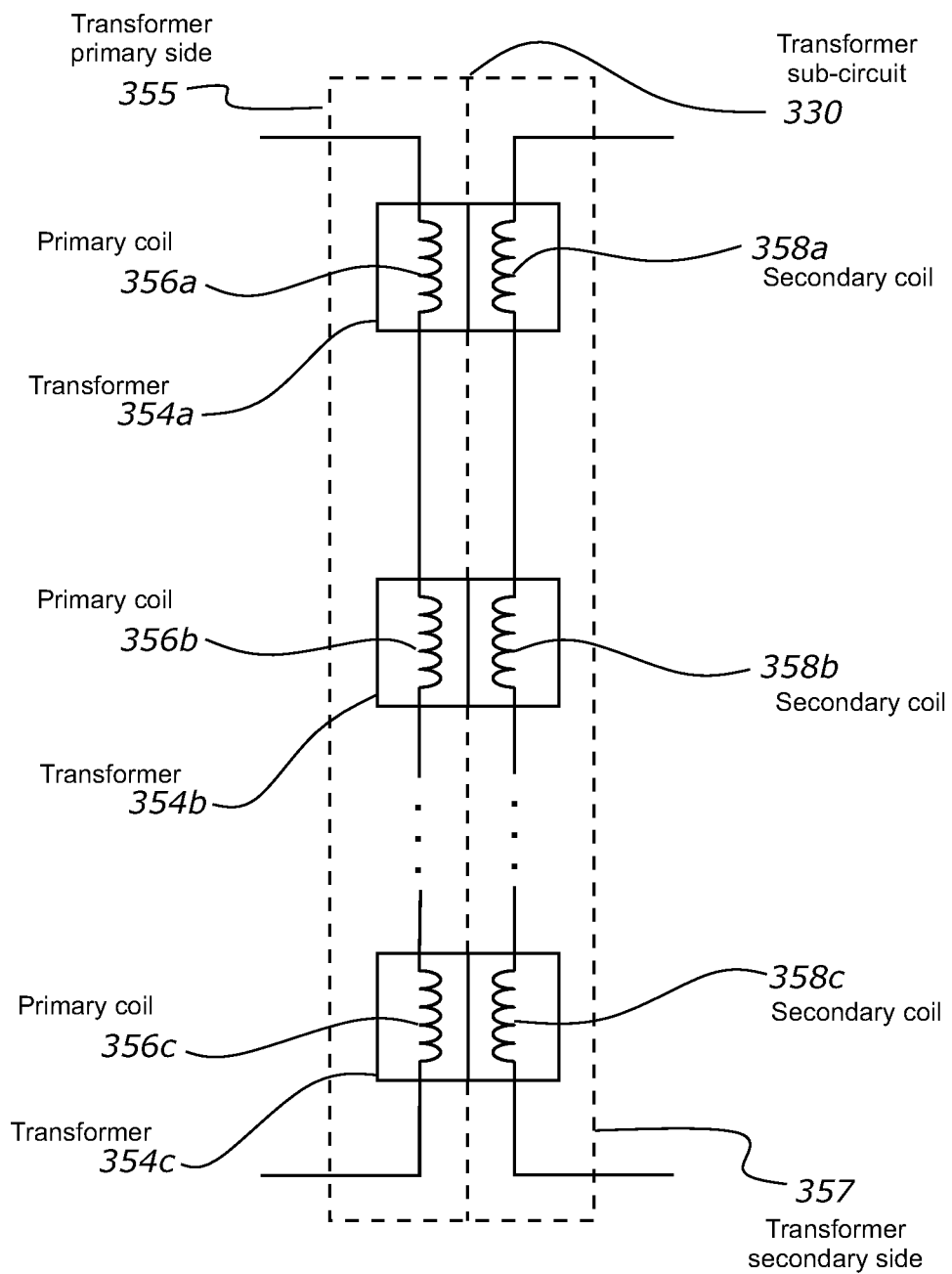
FIG. 15 shows another exemplary embodiment of a transformer sub-circuit.

FIG. 15 shows another embodiment of a transformer sub-circuit 330 comprising multiple transformers 354a-c. The transformers 354a-c respectively have a primary coil 356a-c and a secondary coil 358a-c. In this embodiment, the primary coils 356a-c can be considered to form the transformer primary side 355, and the secondary coils 358a-c can be considered to form the transformer secondary side 357. The primary coils 354a-c are all connected in series with each other. The secondary coils 358a-c are all connected in series with each other. The turns ratio of the transformer primary side 355 to the transformer secondary side 357 determines the current through the secondary coil 24. The transformer primary side 355 should have more turns than the transformer secondary side 357 to reduce current through the secondary coil 24. In each transformer 354a-c, the primary coil 356a-c should have more turns than the respective secondary coil 358a-c. The transformers 354a-c can be merged into a single transformer. The transformers 354a-c can be identical or different, but the polarity of each primary coil 354a-c and secondary coil 358a-c should be identical.

Use of this transformer sub-circuit 330 embodiment is suitable when the desired voltage across the load 12 is sufficiently high as governed by this equation:

$$V*t=N*B*A$$

where V is the transformer winding voltage (of the transformer secondary side 357), N is winding turns count (of the transformer secondary side 357), B is magnetic flux density of the ferrite core and A is the cross section area of the transformer. From this equation, it can be deduced that a higher voltage across the load 12 leads to higher transformer winding voltage, a transformer with larger core cross section area is required for high load voltage applications. Although it may be possible to use the core with the largest cross section, these cores are typically very expensive, so it may be more economical to connect a plurality of transformers in series, such as transformers 354a-c in FIG. 15. Usage of the transformer sub-circuit 330 is therefore preferred when desired voltage across the load 12 is high (e.g. greater than about 100 Vdc or greater than about 200 Vdc for example).

3.2.2.4 Fourth Transformer Sub-Circuit Embodiment

Figure 15A:
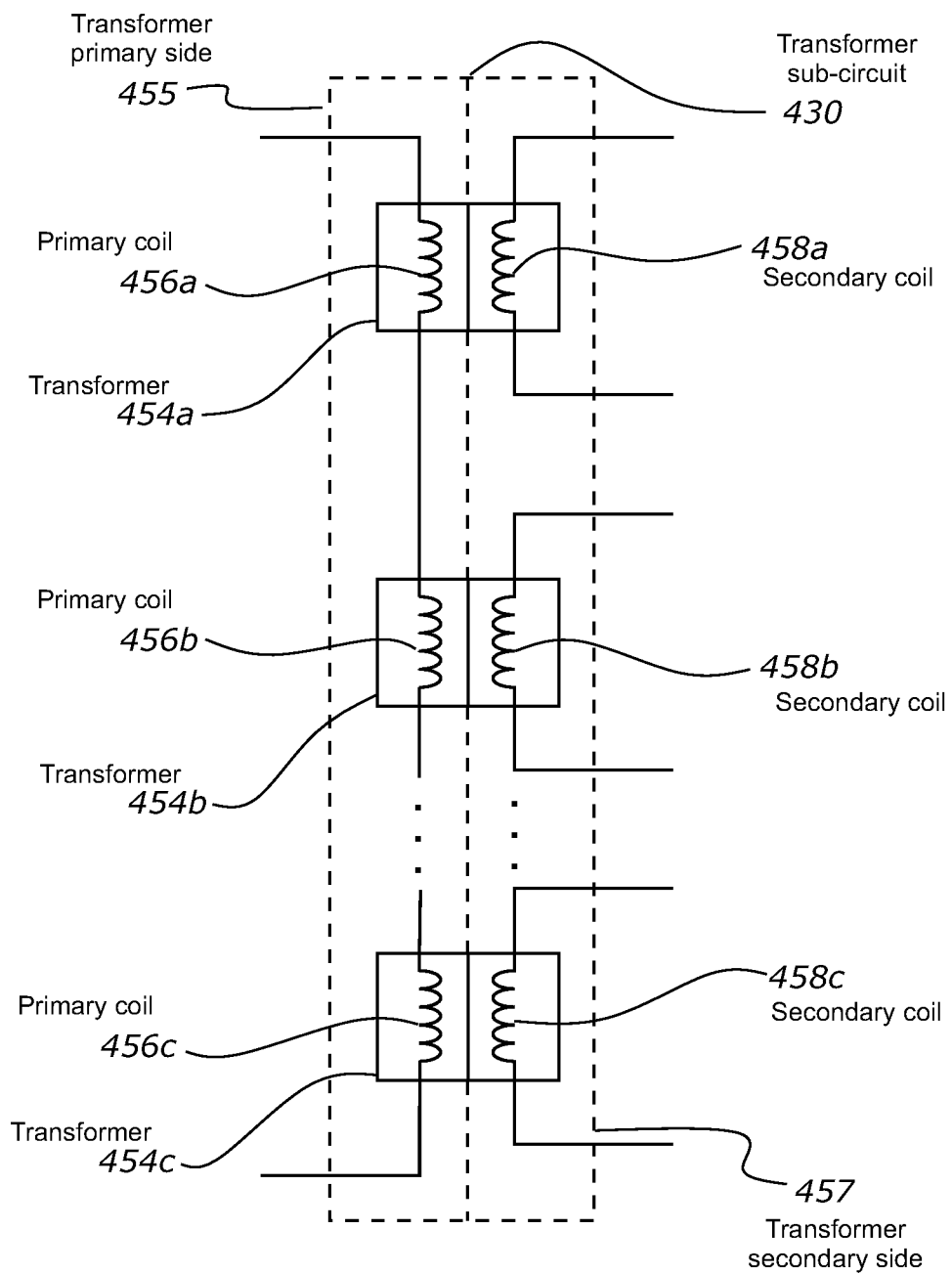
FIG. 15A shows another exemplary embodiment of a transformer sub-circuit.

FIG. 15A shows another embodiment of a transformer sub-circuit 430 comprising multiple transformers 454a-c. The transformers 454a-c respectively have a primary coil 456a-c and a secondary coil 458a-c. In this embodiment, the primary coils 456a-c can be considered to form the transformer primary side 455, and the secondary coils 458a-c can be considered to form the transformer secondary side 457. The primary coils 454a-c are all connected in series with each other. Each secondary coil 458a-c are placed on different branches each other. The transformer primary side 455 should have more turns than the transformer secondary side 457 to reduce current through the secondary coil 24. In each transformer 454a-c, the primary coil 456a-c should have more turns than the respective secondary coil 458a-c.

The transformers 454a-c can be identical or different, but the polarity of each primary coil 454a-c and secondary coil 458a-c should be identical.

The embodiment shown in transformer sub-circuit 430 allows for a higher transformer turns ratio to be achieved by combining multiple transformers 454a-c. It is particularly suitable for higher load current applications as it can distribute the higher load current amongst secondary coils 458a-c while effectively reducing transformer primary current and secondary coil current. Usage of the transformer sub-circuit 430 is therefore preferred when a high current through the load 12 is desired (such as a current greater than 30 A for example).

3.2.2.5 Transformer Sub-Circuit Turns Ratio

The transformer turns ratio (of the transformer primary side 55 to transformer secondary side 57) should be sufficiently high to realise the advantages the inclusion of the transformer sub-circuit 30 brings in (in particular, the stability the transformer sub-circuit provides to the tuned circuit 28 can result in one or more of: lower pads losses, good power factor, reduced sensitivity for example). However, the turns ratio should not be set too high for two reasons:

- If the transformer turns ratio is set too high, a larger transformer ferrite core would be required to fit the higher number of coil turns on the transformer primary side 55, which contributes to a bulky transformer sub-circuit design.
- Increasing the turns ratio results in an increased voltage across the transformer primary side 55 which desirably lowers the coil losses. However increasing the turns ratio offers diminishing returns in coil losses beyond a certain point. Further, an increased voltage across the transformer primary side 55 requires more insulation, adding cost and volume to the transformer sub-circuit design.

The transformer sub-circuit 30 should desirably have a turns ratio (of the transformer primary side 55 to transformer secondary side 57) in the range of a ratio of about 2:1 to a ratio of about 4:1 or in the range of a ratio of about 2:1 to a ratio of about 6:1.

3.2.2.6 Transformer Sub-Circuit Embodiment Selection

A higher winding voltage (across the transformer secondary coil 58) leads to a higher loss, so when load 12 voltage is high, multiple transformers can be connected in series (such as transformers 254a-c and 354a-c for example) up to share the voltage and thus to reduce the loss on each transformer. This means if the load 12 voltage is sufficiently high, it can become desirable to incorporate multiple transformers in the transformer sub-circuit design, such as transformer sub-circuits 230, 330 for example. On the other hand, if the load 12 voltage is low enough then fewer transformers are required, and in some cases a transformer sub-circuit comprising a single transformer, such as transformer sub-circuit 130 for example, can be sufficient.

Some transformer design examples will be provided according to the principles described above:

Design example 1: Consider a situation where the desired load voltage (Vload) is 50V, desired load current is (Iload) is 25 A, and operating frequency of the inductive power transfer system is 85 kHz. In this situation a single centre tapped transformer (such as transformer 154 on FIG. 13 for example) can be used. The single centre tapped transformer can have a turns ratio of 12:3:3 and ferrite core PQ 50-50, which has a physical dimension of 50 mm by 50 mm by 32 mm. By selecting the secondary turns to be 3, we can achieve an adequate core loss. The ferrite core also provides sufficient winding window to fit all the turns assuming primary winding uses 3 mm Litz wire and secondary uses 4 mm Litz wire.

Design example 2: Consider a situation where the desired load voltage (Vload) is 120V, desired load current is (Iload) is 25 A, and operating frequency of the inductive power transfer system is 85 kHz. In this situation a single conventional transformer can be used. The single conventional transformer can have a turns ratio of 16:4 (assuming we maintain a turns ratio of 4:1 like in design example 1) and with ferrite core PM 62-49, which has a dimension of 62 mm*50 mm*50 mm. This design has a similar core loss. The winding window is also sufficiently large to fit all the turns assuming primary winding uses 3 mm Litz wire and secondary uses 4 mm Litz wire.

Design example 3: Consider a situation where the desired load voltage (Vload) is 240V, desired load current is (Iload) is 25 A, and operating frequency of the inductive power transfer system is 85 kHz. In order to maintain a similar core loss, we will need a turns ratio of 32:8, which cannot be fitted to the winding window of a single ferrite core PM 64-49. Here we can connect two conventional in series to realize the design (such as transformers 254a-c in FIGS. 14 and 354a-c in FIG. 15 for example). Alternatively, we can find a single larger core that can fit more turns. One possible core is PM 74-59, which has a larger core cross section area than that of PM 62-49. By selecting the turns ratio to be 24:6, we can achieve an adequate core loss. The winding window is approximately 13.5 mm by 40 mm, which will fit all the turns assuming primary winding uses 3 mm Litz wire and secondary uses 4 mm Litz wire. Selecting a single core with a larger cross section area can be a more expensive option is due to the fact the larger cores are generally harder to manufacture and do not sell as well as smaller cores. However a larger volume would help to distribute and therefore lower the manufacturing cost. Apart from the cost reason, designs with many smaller cores would also have better thermal performance as heat can radiate over a larger combined surface, which would also enable active cooling system to better extract heat. Therefore, for higher load voltages such as what has been described in design example 3, it may be more economical to use multiple transformers in series as shown in FIG. 15.

3.2.3 Rectifier Sub-Circuit Design

Discussion now turns to the design of rectifier sub-circuit 32 with reference to FIGS. 12, 16-19.

Referring to FIG. 12, the rectifier sub-circuit 32 is an optional feature of the inductive power transfer receiver 36, and is for use with the transformer sub-circuit 30. The purpose of the rectifier sub-circuit 32 is to provide the load 12 with a direct current input. This is done by taking an alternating current input provided by the transformer secondary side and converting the alternating current input into a direct current output to provide to the load 12. As can be seen in FIG. 12, the rectifier sub-circuit 32 comprises one or more rectifiers 64a-c. The rectifiers 64a-c may be and/or may comprise one or more diodes, MOSFETs, or other switch components. The rectifiers 64a-c may be a diode bridge rectifier, which comprises four diodes. If the rectifiers 64a-c are used with centre-tapped transformers 154, 254a-c, then the rectifiers 64a-c may be a diode pair rectifier, which comprises two diodes.

Exemplary embodiments of the rectifier sub-circuit 32 will now be discussed with reference to FIGS. 16-19. These embodiments are described simply to show several examples, and should not be taken to be limiting the scope of what the transformer sub-circuit 32 could look like.

3.2.3.1 First Rectifier Sub-Circuit Embodiment

Figure 16:
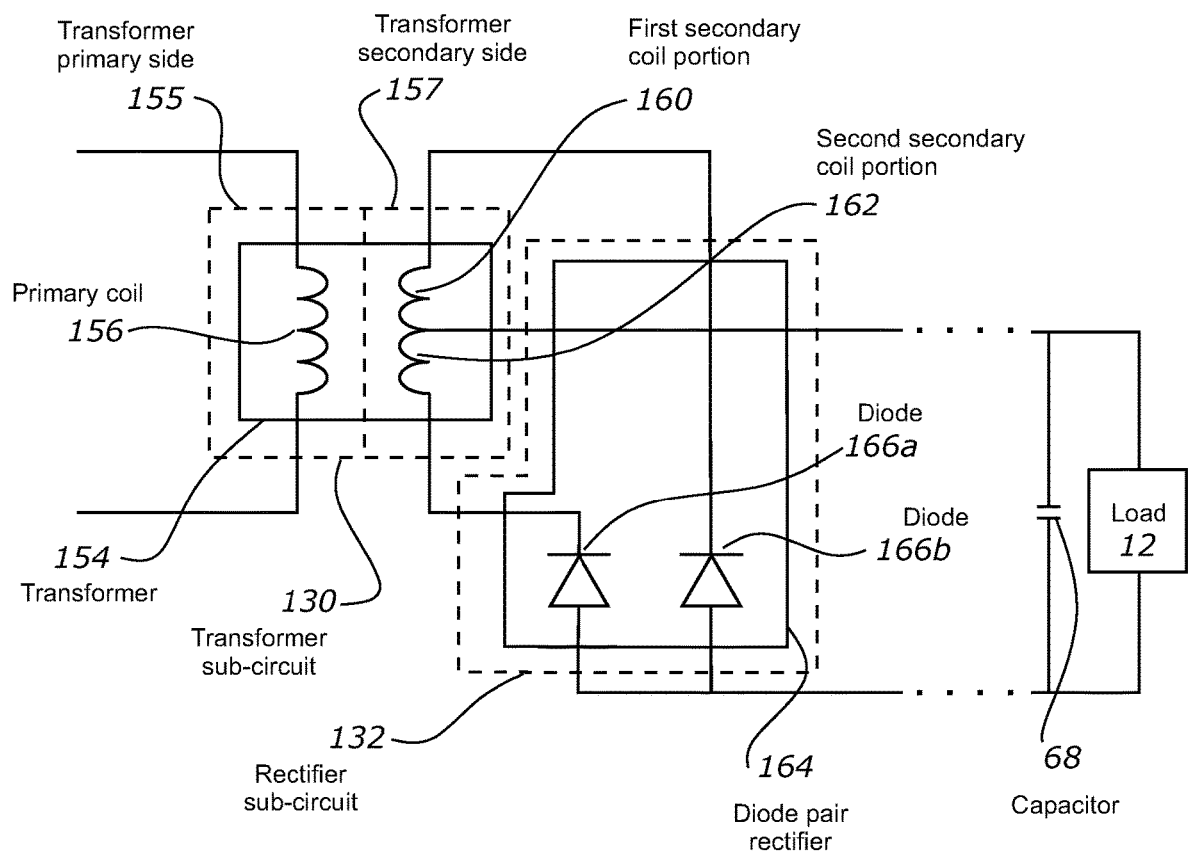
FIG. 16 shows one exemplary embodiment of a rectifier sub-circuit.

FIG. 16 shows one embodiment of a rectifier sub-circuit 132 comprising a single diode pair rectifier 164. Rectifier sub-circuit 132 provides full wave rectification for the load 12. The rectifier sub-circuit 132 is configured for use with the transformer sub-circuit 130. More specifically, the diode pair rectifier 164 is configured for use with the centre-tapped transformer 154. The diode pair rectifier 164 comprises diode 166a and diode 166b. The diode pair rectifier 164 is configured such that diode 166a is placed in series with the second secondary coil portion 162, and diode 166b is placed in series with the first secondary coil portion 160. Diodes 166 a,b are referenced to ground.

In rectifier sub-circuit 132 it is preferable that MOSFETs are used instead of diodes 166a-b are to enable synchronous rectification for higher efficiency (MOSFETs can be placed in the same location as where diodes 166a-b are placed in FIG. 16 to form a MOSFET pair rectifier). This is because lower voltage MOSFETs typically have significantly lower conduction losses than lower voltage diodes. Therefore, for applications with low load voltages, using the transformer sub-circuit 130 (which comprises a single centre-tapped transformer 154) with MOSFETs can significantly reduce the rectification or conduction losses.

When MOSFETs are used in this rectifier sub-circuit embodiment 132, having centre-tapped transformers 154 helps make it simple to implement synchronous rectification which provides an advantage over using a conventional transformer as a full bridge rectifier (which requires more components to assemble than using a MOSFET pair for a centre-tapped transformer) is needed with a conventional transformer.

As will be discussed in more detail later, using a centre-tapped transformer enables a full wave rectification which requires only 2 MOSFETs or 2 diodes, rather than a full bridge rectifier which requires 4 MOSFETs or 4 diodes. The benefit of using 2 MOSFET/diodes for full wave rectification over using 4 MOSFET/diodes for full wave rectification will be described in section 3.2.3.6

3.2.3.2 Second Rectifier Sub-Circuit Embodiment

Figure 17:
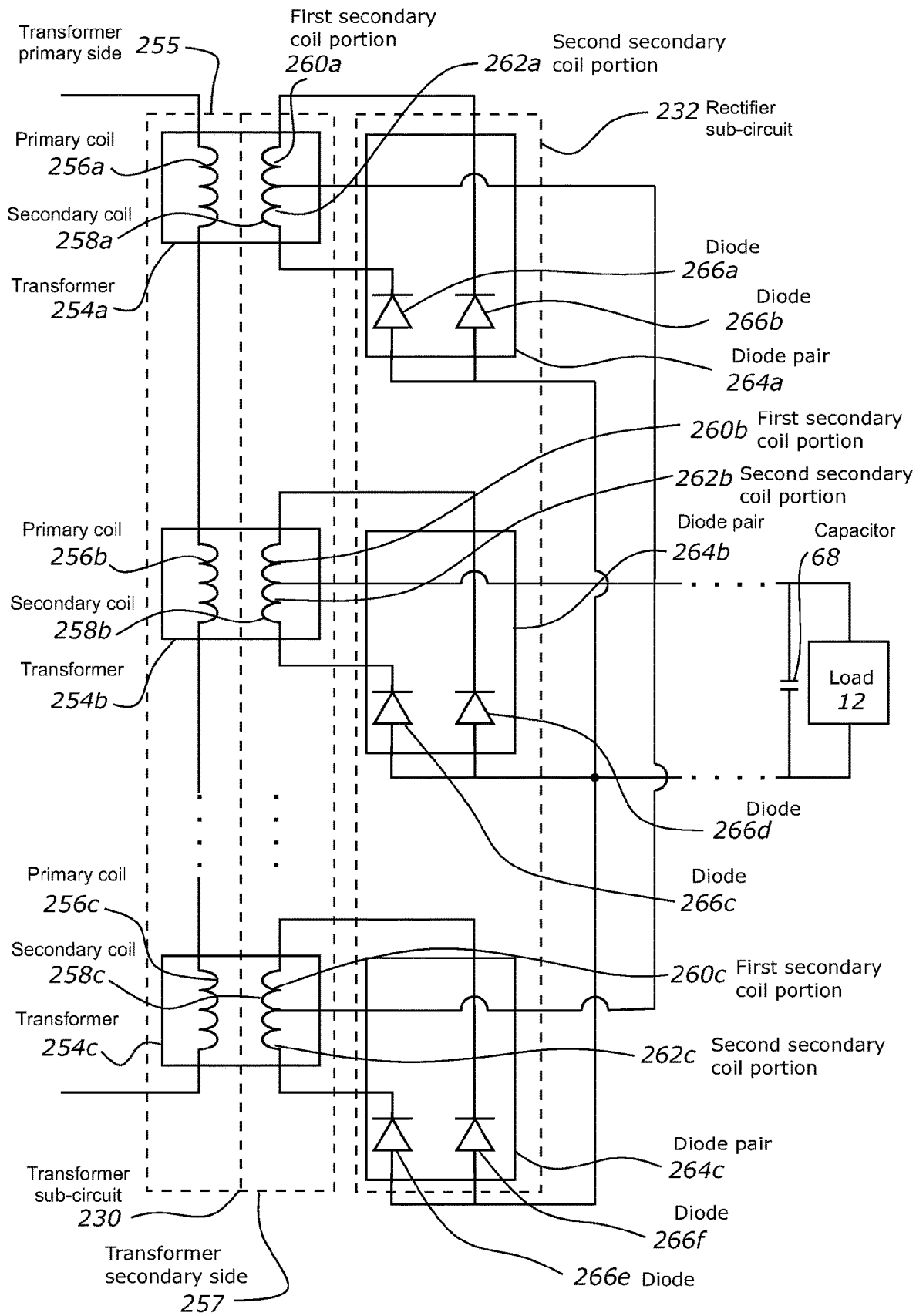
FIG. 17 shows another exemplary embodiment of a rectifier sub-circuit.

FIG. 17 shows another embodiment of a rectifier sub-circuit 232 comprising a plurality of diode pair rectifiers 264a-c. Rectifier sub-circuit 232 provides full wave rectification for the load 12. The rectifier sub-circuit 232 is configured for use with the transformer sub-circuit 230. Each diode pair rectifier 264a-c is configured for use with a respective centre-tapped transformer 254a-c. That is, diode pair rectifier 264a is configured for use with transformer 254a; diode pair rectifier 264b is configured for use with transformer 254b; and diode pair rectifier 264c is configured for use with transformer 254c. This means the number of diode pair rectifiers in the rectifier sub-circuit 232 should be equal to the number of centre-tapped transformers in the transformer sub-circuit 230. The diode pair rectifier 264a comprises diode 266a and diode 266b. The diode pair rectifier 264a is configured such that diode 266a is placed in series with the second secondary coil portion 262a, and diode 266b is placed in series with the first secondary coil portion 260a. The diode pair rectifier 264b comprises diode 266c and diode 266d. The diode pair rectifier 264b is configured such that diode 266c is placed in series with the second secondary coil portion 262b, and diode 266d is placed in series with the first secondary coil portion 260b. The diode pair rectifier 264c comprises diode 266e and diode 266f. The diode pair rectifier 264c is configured such that diode 266e is placed in series with the second secondary coil portion 262c, and diode 266f is placed in series with the first secondary coil portion 260c. Rectifier sub-circuit 232 provides full wave rectification for the load 12.

In rectifier sub-circuit 232 it is preferable that MOSFETs are used instead of diodes 266a-f to enable synchronous rectification for higher efficiency (MOSFETs can be placed in the same location as where diodes 266a-f are placed in FIG. 17 to form MOSFET pair rectifiers). This is because lower voltage MOSFETs typically have significantly lower conduction losses than lower voltage diodes. Therefore, for applications with low load voltages, using the transformer sub-circuit 230 (which comprises a multiple centre-tapped transformers 254a-c) with MOSFETs can significantly reduce the rectification or conduction losses. Further, cheaper MOSFETs with higher drain to source resistance may be used as the rectifier sub-circuit 232 configured for use with a transformer sub-circuit 230 that shares current across the first and second secondary coil portions 260a-c, 262a-c.

When MOSFETs are used in this rectifier sub-circuit embodiment 232, having centre-tapped transformers 254a-c helps make it simple to implement synchronous rectification which provides an advantage over using conventional transformers as a full bridge rectifier (which requires more components to assemble than using a MOSFET pair for each centre-tapped transformer) is needed with conventional transformers.

3.2.3.3 Third Rectifier Sub-Circuit Embodiment

Figure 18:
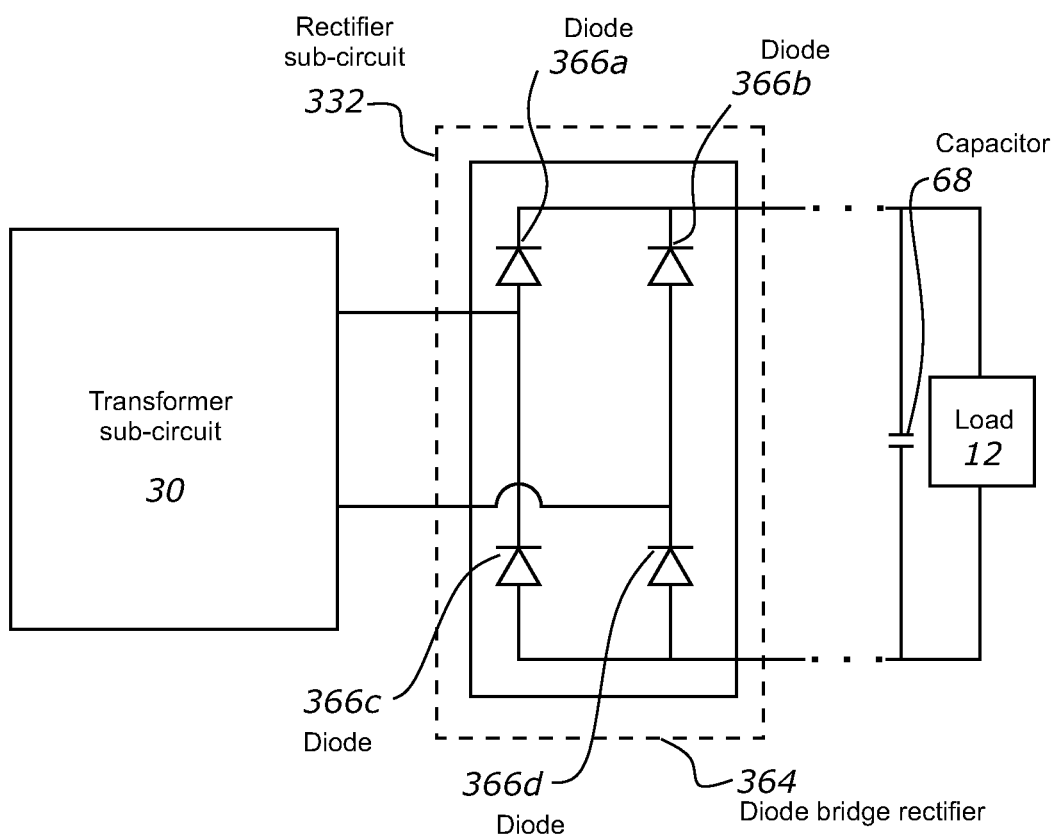
FIG. 18 shows another exemplary embodiment of a rectifier sub-circuit.

FIG. 18 shows another embodiment of a rectifier sub-circuit 332 comprising a single diode bridge rectifier 364. Rectifier sub-circuit 332 provides full wave rectification for the load 12. The rectifier 132 sub-circuit 132 is configured for use with the any embodiment of transformer sub-circuit 30, including (and not limited to) transformer sub-circuits 130, 230, 330, 430. More specifically, the diode pair rectifier 364 is configured for use with either standard transformers (like transformers 54a-c, 354a-c for example) and/or with centre-tapped transformers (like transformers 154, 254a-c for example). The diode bridge rectifier 364 comprises diodes 366a-d.

In rectifier sub-circuit 332 MOSFETs can be used instead of diodes 366a-d (MOSFETs can be placed in the same location as where diodes 366a-d are placed in FIG. 18 to form a MOSFET bridge rectifier). Using MOSFETs instead of diodes 366a-d is advantageous in situations where the desired voltage across load 12 is low enough (about 100 Vdc or less for example) to enable synchronous rectification for higher efficiency. However, if the desired voltage across load 12 is high (about 100 Vdc or more for example) then the conduction losses of MOSFETs become similar to diodes, as using MOSFETs offers no significant reduction in rectification conduction losses compared to diodes at a high voltage level (about 100 Vdc or more for example). In such a situation, using diodes are preferred (over using MOSFETS) for their lower cost and simpler design.

Using rectifier sub-circuit 332 in situations where the desired current through the load 12 is sufficiently low the single diode/MOSFET bridge rectifier in rectifier sub-circuit 332 is adequate. Usage of the rectifier sub-circuit 332 is therefore preferred when desired current through the load 12 is low (less than about 30 A for example).

3.2.3.4 Fourth Rectifier Sub-Circuit Embodiment

Figure 19:
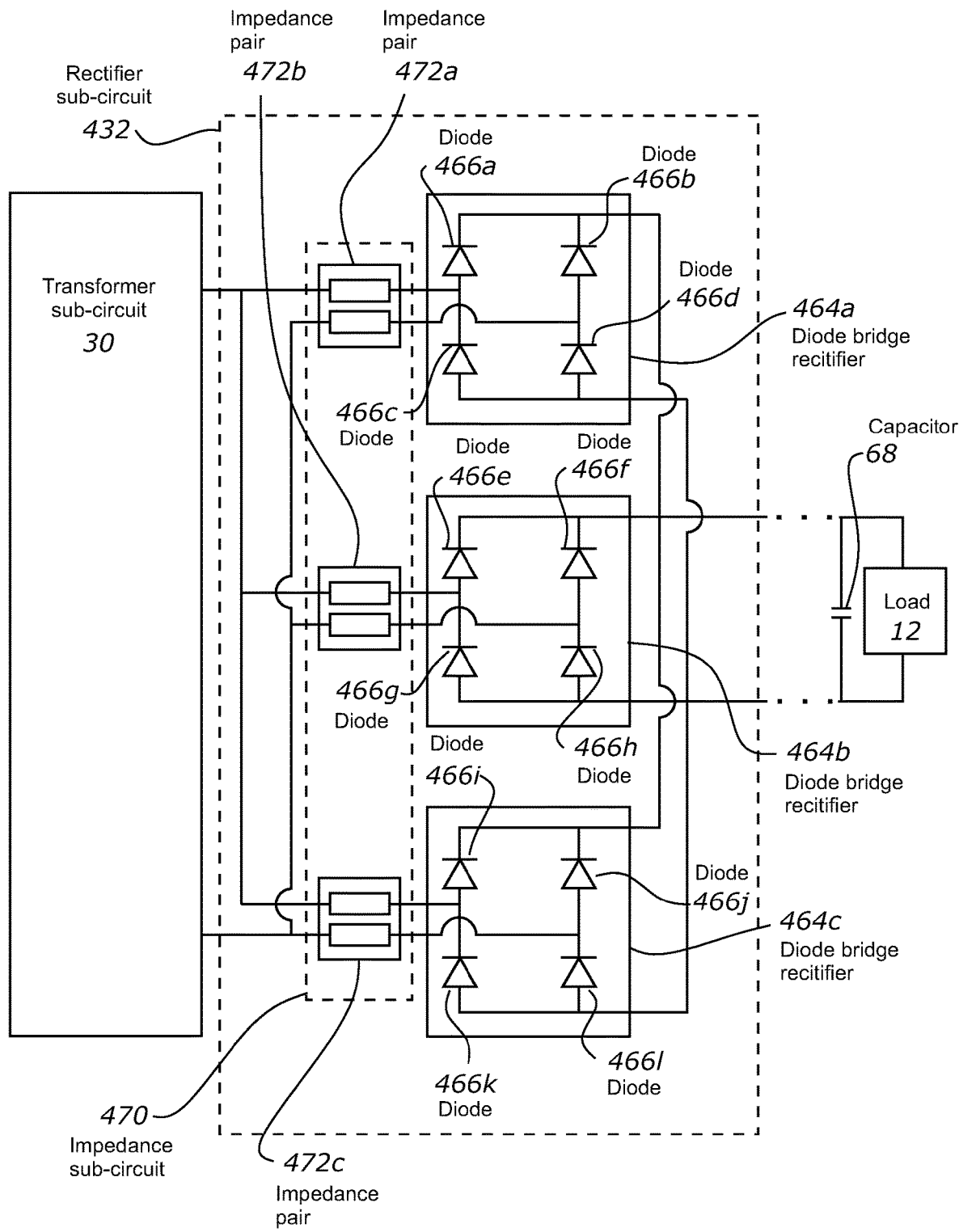
FIG. 19 shows one exemplary embodiment of a rectifier sub-circuit.

FIG. 19 shows another embodiment of a rectifier sub-circuit 432 comprising a plurality of diode bridge rectifier 464a-c. Rectifier sub-circuit 432 provides full wave rectification for the load 12. The rectifier sub-circuit 432 is configured for use with the any embodiment of transformer sub-circuit 30, including (and not limited to) transformer sub-circuits 130, 230, 330, 430. In this rectifier sub-circuit 432 embodiment, the diode bridge rectifiers 464a-c are connected in parallel with each other. The diode bridge rectifier 464a comprises diodes 466a-d. The diode bridge rectifier 464b comprises diodes 466e-h. The diode bridge rectifier 464c comprises diodes 466i-dl.

As the rectifier sub-circuit comprises multiple diode bridge rectifiers 464a-c connected in parallel with each other, it is desirable that the rectifier sub-circuit 432 also has an impedance sub-circuit 470 connected between diode bridge rectifiers 464a-c and the transformer sub-circuit 30 in order to control current distribution between diode bridge rectifiers 464a-c. In FIG. 19, the impedance sub-circuit 470 comprises a plurality of impedance pairs 472a-c for each respective diode bridge rectifier 464a-c. The current through each bridge rectifier 464a-c us approximately inversely proportional to the combined impedance of each respective impedance pair 472a-c. A higher combined impedance of impedance pair 472a-c leads to a smaller current through the respective bridge rectifier 464a-c, and vice versa. In practice, there can be some slight differences in the voltage-current characteristics between diodes of the same model. So potentially there can be some current imbalance between the plurality of diode bridge rectifiers 464a-c due to component tolerances. When impedance pairs 472a-c are used and made large enough to dominate the input impedance of the rectifier which is typically small due to a low forward diode voltage drop, the rectifier input current distribution can be controlled by impedance pairs 472a-c. The impedance pair should be a pair of components that each have an impedance that can optionally have a inductive of capacitive reactance. Examples could include (but not limited to) inductors and capacitors, or a combination of both. If the components have a capacitive reactance, the impedance pairs 472a-c (and the impedance sub-circuit 470 more generally) could also act as a tuning sub-circuit such that they can be considered to be part of tuned circuit 28. More specifically, impedance pairs 472a-c (and the impedance sub-circuit 470 more generally) could also act as a tuning sub-circuit such that they can be considered to be part of series tuned circuit 28.

In rectifier sub-circuit 432 MOSFETs can be used instead of diodes 466a-l (MOSFETs can be placed in the same location as where diodes 466a-l are placed in FIG. 19 to form a MOSFET bridge rectifiers). Using MOSFETs instead of diodes 466a-l is advantageous in situations where the desired voltage across load 12 is low enough (about 100 Vdc or less for example) to enable synchronous rectification for higher efficiency. However, if the desired voltage across load 12 is high (about 100 Vdc or more for example) then the conduction losses of MOSFETs become similar to diodes, as using MOSFETs offers no significant reduction in rectification conduction losses compared to diodes at a high voltage level of about 100 Vdc or more. In such a situation, using diodes are preferred (over using MOSFETS) for their lower cost and simpler design.

Rectifier sub-circuit 432 differs from rectifier sub-circuit 332 in that rectifier sub-circuit 432 has a plurality of diode/MOSFET bridge rectifiers connected in parallel, while rectifier sub-circuit 332 has a single diode/MOSFET bridge rectifier. Using rectifier sub-circuit 432 is desirable over rectifier sub-circuit 332 in situations where the desired current through the load 12 is sufficiently high that it is desirable to share the load current across multiple diode/MOSFET bridge rectifiers connected in parallel. Usage of the rectifier sub-circuit 432 is therefore preferred when desired current through the load 12 is greater than about 30 A.

3.2.3.5 Fifth Rectifier Sub-Circuit Embodiment

Figure 19A:
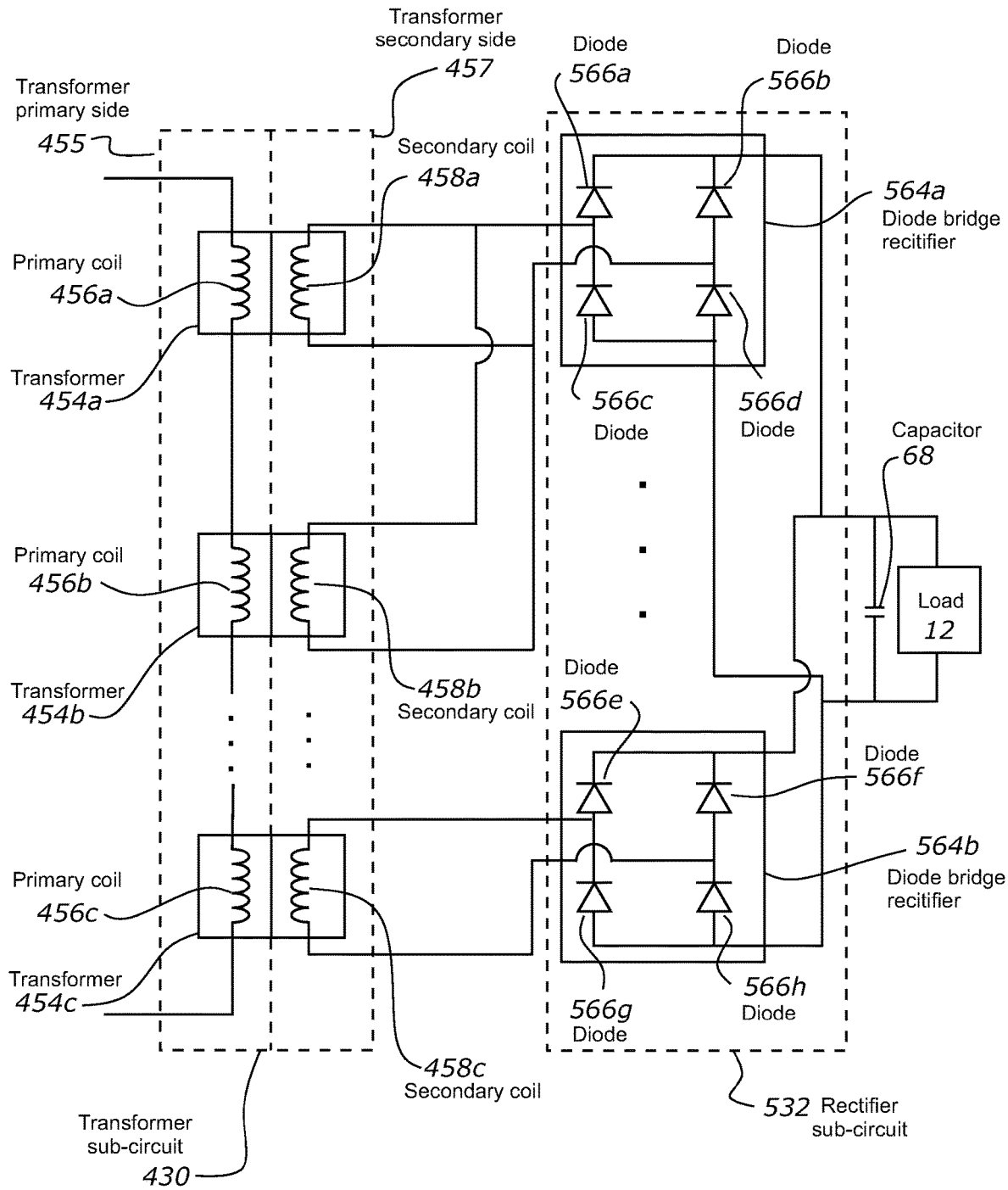
FIG. 19A shows one exemplary embodiment of a rectifier sub-circuit.

FIG. 19A shows another embodiment of a rectifier sub-circuit 532 comprising a plurality of diode bridge rectifiers 564a,b. Rectifier sub-circuit 532 provides full wave rectification for the load 12. The rectifier sub-circuit 532 is configured for use with embodiment of transformer sub-circuit 430 as shown in FIG. 15A. The diode bridge rectifier 564a comprises diodes 566a-d. The diode bridge rectifier 564b comprises diodes 566e-h. Each diode bridge rectifier 564a-c can be connected one or more transformers 554a-c. For example, bridge rectifier 564a connects to (the secondary coil 458a of) transformer 454a and (the secondary coil 458b of) transformer 454b, while bridge rectifier 454b connects to (the secondary coil 458c of) transformer 454c. The rectifier sub-circuit 532 differs from the rectifier sub-circuit 432 in that the bridge rectifiers 564a and 564b are not connected in parallel with each other but rather they are placed on separate branches to each other.

In rectifier sub-circuit 532 MOSFETs can be used instead of diodes 566a-l (MOSFETs can be placed in the same location as where diodes 566a-l are placed in FIG. 19A to form MOSFET bridge rectifiers). Using MOSFETs instead of diodes 566a-l is advantageous in situations where the desired voltage across load 12 is low enough (about 100 Vdc or less for example) to enable synchronous rectification for higher efficiency. However, if the desired voltage across load 12 is high (about 100 Vdc or more for example) then the conduction losses of MOSFETs become similar to diodes, as using MOSFETs offers no significant reduction in rectification conduction losses compared to diodes at a high voltage level (about 100 Vdc or more for example). In such a situation, using diodes are preferred (over using MOSFETS) for their lower cost and simpler design.

As mentioned already, rectifier sub-circuit 532 is configured for use with embodiment of transformer sub-circuit 430 (as shown in FIG. 15A) which allows for a higher transformer turns ratio to be achieved by combining multiple transformers 454a-c. Transformer sub-circuit 430 is particularly suitable for higher load current applications as it can distribute the higher load current amongst secondary coils 458a-c while effectively reducing transformer primary current and secondary coil current. Usage of the transformer sub-circuit 430 is therefore preferred when a high current through the load 12 is desired—for example a current greater than 30 A could be desired.

3.2.3.6 Benefit of Using a Centre-Tapped Transformer with the Rectifier Sub-Circuit When rectification is needed in the inductive power transfer receiver 36, using a centre-tapped transformers provide an advantage over conventional transformers low voltage applications (where r the desired voltage across the load 12 is about 100 VDC or less for example) because fewer MOSFET/diodes are needed for rectification:

- For low voltage low current applications (i.e. desired current through the load 12 is about 30 A or less), using a single centre-tapped transformer is preferred over using a single conventional transformer. This is because the centre-tapped transformer can be rectified by a MOSFET/diode pair. In contrast, if a conventional transformer is used, then a MOSFET/diode bridge rectifier comprising four MOSFETs/diodes would be needed instead. This means in a low current application, fewer components would be required in the rectifier sub-circuit if a centre-tapped transformer is used.
- For low voltage high current applications (i.e. desired current through the load 12 is about 30 A or greater), it is preferable using multiple transformers to sufficiently reduce current in the secondary/receiving coil 24. In this situation using multiple centre-tapped transformers is preferred over using multiple conventional transformers. This is because each centre-tapped transformer can be rectified by a MOSFET/diode pair. In contrast, if conventional transformer/s are used instead, then then a plurality of (MOSFET/diode) bridge rectifiers (each bridge rectifier comprising 4 MOSFETs/diodes) connected in parallel would be needed instead. This means in a high current application, fewer components would be required in the rectifier sub-circuit if centre-tapped transformer are used.

Each centre-tapped transformer can be used with 2 MOSFET/diodes for full wave rectification. In contrast conventional transformer/s need to be used with one or more full bridge rectifier, each bridge rectifier requiring 4 MOSFETs/diodes. There may be one or more benefits for using 2 MOSFET/diodes for full wave rectification over using 4 MOSFET/diodes for full wave rectification as follows:

- 4 MOSFETs/diodes will roughly have twice the loss as 2 MOSFETs/diodes respectively.
- Further, as mentioned previously, MOSFETs are preferable over diodes because MOSFETs can provide synchronous rectification, which can result in reduced losses. It is easier to achieve synchronous rectification using 2 MOSFETs than 4 MOSFETs.

Figure 20:
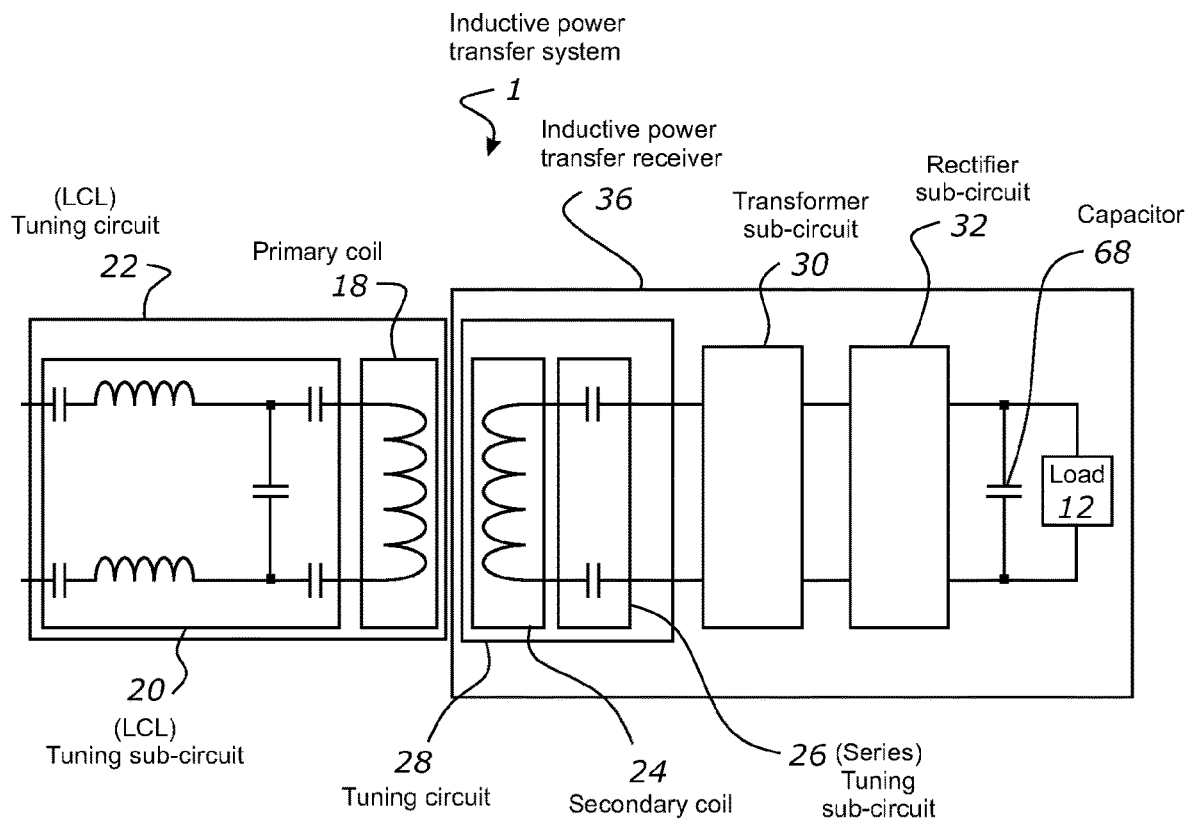
FIG. 20 shows an exemplary embodiment of an inductive power transfer receiver incorporated as part of an inductive power transfer system.

3.2.4 Inductive Power Transfer Receiver as Part of the Inductive Power Transfer System Discussion now turns to the how the inductive power transfer receiver 36 interacts with other parts of the inductive power transfer system 1 with reference to FIG. 20, which shows the inductive power transfer receiver 36 wirelessly receiving power from the primary coil 18.

It is preferred, but not essential that the primary coil 18 is LCL tuned such that there is an LCL tuned circuit comprising the primary coil 18, tuning sub-circuit 22, and optionally the inductive sub-circuit 16 to reduce switching losses in the inverter sub-circuit 14. This is because in the LCL circuit a capacitor is connected in parallel with the primary coil 18 to create a parallel resonant tank. The parallel resonant tank provides current to the primary coil 18, which means not as much current needs to be provided from the inverter 14. This reduces the amount of current the inverter needs to provide to the primary coil 18, such that switching losses in the inverter sub-circuit 14 is reduced. A more comprehensive explanation can be found later in this section. Although it is preferred that the primary coil 18 is LCL tuned, it is not essential to have the primary coil 18 LCL tuned for the purposes of realising an improved inductive power transfer receiver 36. It is conceivable that the primary coil 18 may instead be series tuned such that the tuning sub-circuit and the primary coil 18 form an LC series circuit.

Systems over a few hundred watts typically require a higher primary coil current. For example, the 1.2 kW system may require 25 A of primary coil current to deliver full power. This is due to a compact primary and secondary coil design requirement, which limits the mutual inductance. A practical system may have a mutual inductance of 9 uH at the lowest coupling position. According to the following fundamental equation that relates coil currents and mutual inductance to power level, $$P = w*Ipt*M*Ist,$$

where w is 2*pi*85000, Ipt is primary coil current and Ist is secondary coil current.

For a mutual inductance of 7 uH, Ipt*Ist needs to be 250 A^2. This can be realised by having a primary coil current of 23 A and a secondary coil current of 11 A. A lower secondary is preferred as the secondary is typically smaller than primary so cannot dissipate as much heat.

The input to such systems are from a single phase power factor correction unit that outputs about 400V dc. This makes the inverter max output voltage about 400V rms. So in theory if the power factor of inverter impedance is near perfect, the inverter only needs to source 3A rms to deliver 1.2 kW. It is clear from these numbers that a series tuned primary would have some problems meeting these requirements due to the fact that its inverter current is the same as primary coil current. Theoretically, a transformer with a turns ratio of 7:1 may be added to satisfy the requirements, but its primary needs to be designed for a voltage of about 400V, which makes this an expensive option. In addition, if a transformer was to be added, it would have at least the same (if not more) component counts as an LCL primary, so at this point, the design decision clearly favours an LCL primary. In contrast, if an LCL primary was used, it would be very easy to design it to output 23 A into the primary coil by setting the reactance of the primary coil to 17.4 Ohms (400V/23 A). The LCL network presents near unity power factor to the inverter so 3 A flows through the inverter when inverter output voltage is about 400V. Based on this reasoning, the LCL tuning of the primary coil is preferred.

3.2.5 Advantage of Having Transformer Sub-Circuit

Discussion now turns to how inclusion of the transformer sub-circuit 30 improves the performance of the inductive power transfer receiver 36 by improving power factor and stability of the inductive power transfer receiver 36.

3.2.5.1 Improvement of Stability

Figure 21A:
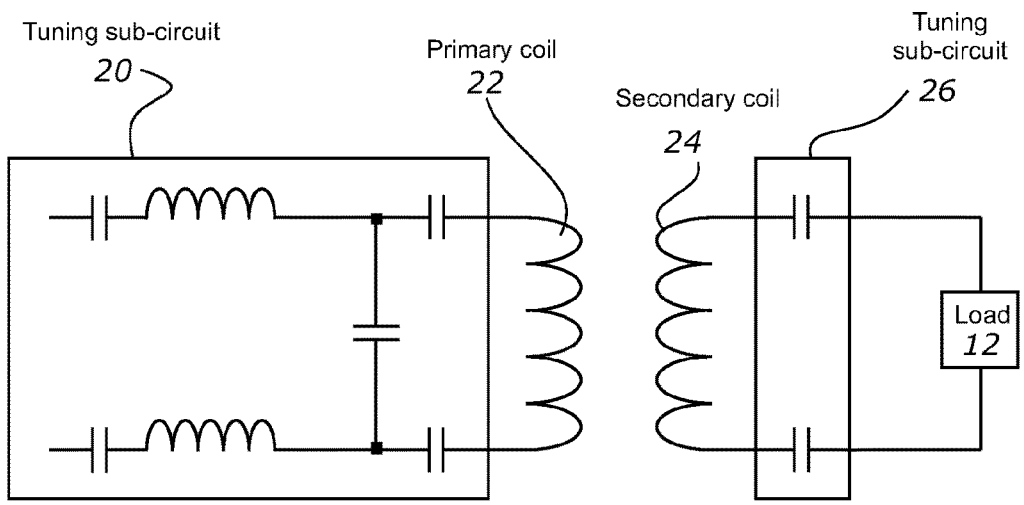
FIGS. 21A-B show an inductive power transfer receiver without a transformer sub-circuit incorporated as part of an inductive power transfer system.

The circuit analysis showing what causes the problem of high secondary coil inductance to load resistance ratio will be explained with reference to FIGS. 21A and 21B. FIG. 21A is a circuit showing an inductive power transfer receiver (as part of an inductive power transfer system) without a transformer sub-circuit 30. This circuit can be remodelled into the circuit shown in FIG. 21B.

In FIG. 21A, the inductive power transfer receiver and load are powered by a magnetic field generated by the current through the primary coil. The current through the primary coil and the mutual inductance of the primary and secondary coils, induces a voltage Voc in the secondary coil, which can be defined mathematically as:

$$Voc=\omega*Ipt*M,$$

where M is the mutual inductance, Ipt is the primary coil current, and ω is the angular frequency. For example, if the operating frequency of the inductive power transfer system 1 is 85 KHz, the angular frequency would be ω=2*π*85000.

Voltage Voc is a voltage induced by the primary coil current and mutual coupling between primary and secondary coils. It is in series with Lst as shown in FIG. 21B.

Figure 21B:
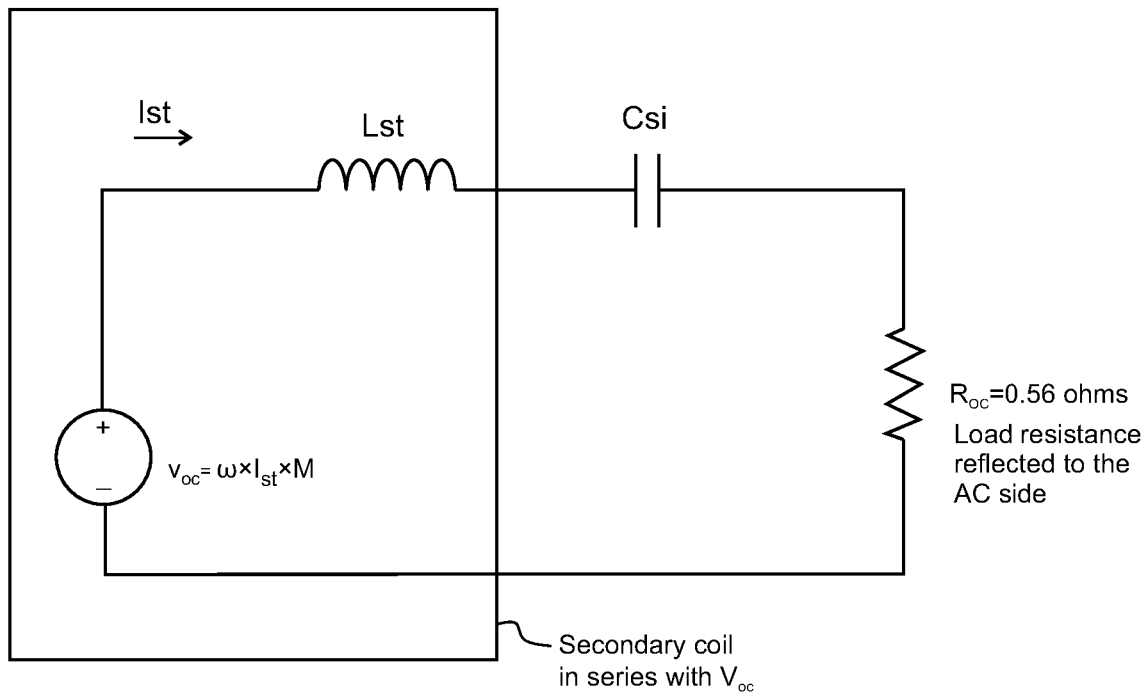

According to FIG. 21B, Voc sees an impedance Z_Voc, which is formed from the reactance of Lst, Csi at operating frequency and Rac. Rac is the AC equivalent resistance of the DC load and is calculated as Rdc/1.23 (1.23 an approximation of pi*pi/8), where Rdc is equal to 0.7 ohms (because load power level is 1.2 kW and load voltage is 29V (Rdc=V²/P=29*29/1200)), and the DC to AC impedance conversion ratio is a factor of 1.23. In the example discussed here, Rac is 0.56 ohms, which is a very low value.

Referring back to FIG. 21B, an impedance of Lst may range from 25 uH to 40 uH, or from 13 ohms to 21.3 ohms, if the operating frequency is 85 KHz. This will result in a very large operating Q factor, since in the case of an series tuned circuit that the secondary coil is a part of, the Q factor is defined as the ratio of the secondary coil inductance to the AC load resistance, which can be mathematically expressed as:

$$Q=\omega*Lst/Rac$$

Given that the AC load resistance Rac was earlier calculated to be 0.56 ohms, if we assume an Lst impedance of 18 ohms, the Q factor comes out to:

$$Q=18/0.56=32$$

A Q factor for an LC series circuit is normally less than 5, so a calculated Q factor of 32 is considered high. With a high Q factor, the circuit of FIG. 21B would be very sensitive to variations in the operating frequency, component values and control inputs, which causes the circuit of FIG. 21B to be unstable or very difficult to be controlled.

Detuning the secondary can reduce Q value, which improves stability, but it causes reactive power to increase and thus deteriorates the power factor. One may argue that these problems may be alleviated if Lst is designed to be much smaller. However, this will make mutual inductance M too small and significantly increase the product of Ipt and Ist for high power systems. This again may significantly increases the primary coil current, leading to high primary voltage and pad losses. A higher M is generally preferred in terms of lowering coil currents, but creates the problems mentioned here for a system with low AC loads.

Therefore, for high power applications that have low Rac values, it is preferable to add a transformer sub-circuit 30 to operate with a series tuned circuit 28 to improve circuit stability while maintaining good power factor provided by the series tuned circuit 28.

Figure 22A:
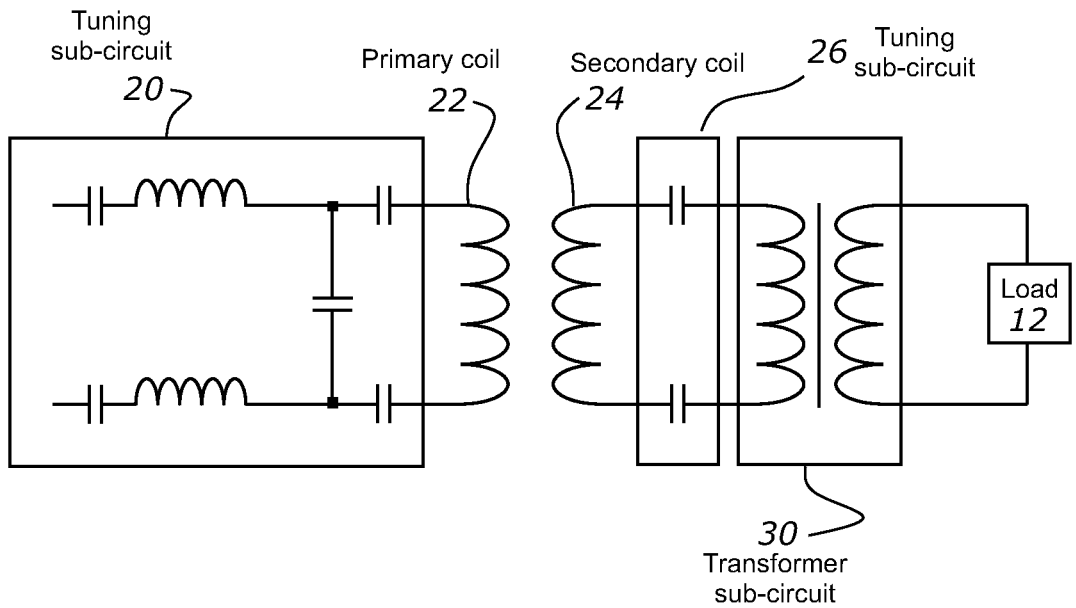
FIGS. 22A-B show an inductive power transfer receiver with a transformer sub-circuit incorporated as part of an inductive power transfer system.

The addition of a transformer sub-circuit 30 improves stability by decreasing the Q factor. FIG. 22A shows a modified version of the circuit of FIG. 21A. The difference between FIG. 21A and FIG. 22A is that the circuit in FIG. 22A has a transformer sub-circuit 30 added in. In this example, a single centre-tapped transformer is used in the transformer sub-circuit in which the ratio of primary coil turns to secondary coil turns is 4:1:1. This means that the voltage across the transformer primary Vtp is four times the voltage across the transformer secondary Vts.

$$Vtp=4*Vts$$

Assuming there is negligible power loss in the transformer, the current through the transformer secondary Its is four times the current through the transformer primary Itp.

$$4*Itp=Its$$

Given that the secondary coil is in series with the transformer primary, and given that the load is in series with the transformer secondary, this means that the current through the secondary coil is one quarter of the current through the load.

$$4*Is=Iload$$

Figure 22B:
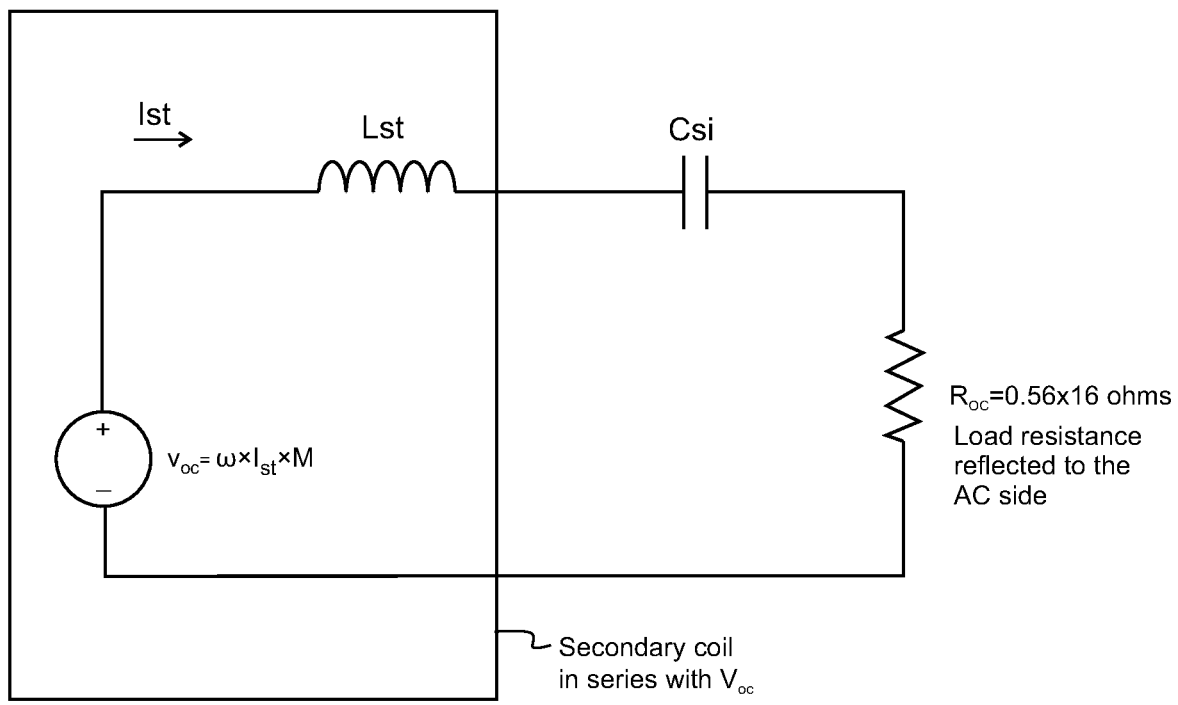

The circuit of FIG. 22A can be remodelled into the circuit shown in FIG. 22B. In the circuit of FIG. 22B, the current through the load is the same as the secondary coil current to show what is perceived from the secondary coil current end.

The power delivered to the load can be defined as:

$$P_{load}=I_{load}^2*R_{AC}$$

Given that 4*Is=Iload, Pload can be expressed as:

$$P_{load}=(4Is)^2*R_{AC}$$

$$P_{load}=16*(Is)^2*R_{AC}$$

$$P_{load}=(Is)^2*16*R_{AC}$$

The derivation above demonstrates that the inclusion of the transformer sub-circuit 30 comprising a single centre-tapped transformer provides a perceived load resistance that is 16 times the actual resistance. The factor of 16 is the square of the ratio of the transformer primary to secondary coil turn of 4:1:1.

Using the values previously calculated (i.e. ω*Lst=18, Rac=0.56), the new Q factor, when the transformer sub-circuit 30 is inserted, can be calculated as shown:

$$Q=\omega*Lst/Rac$$

$$Q=18/(16*0.56)$$

$$Q=2$$

The 16 factor amplification of the (perceived) load resistance means that the secondary coil impedance to AC load resistance ratio decreases by a factor of 16, resulting in Q factor decreasing by a factor of 16 such that the new Q factor is 2, which indicates an improvement in circuit stability. One benefit of the improved circuit stability is that the series tuned circuit 28 can be tuned in a way to make the reactive part of the load for Z_Voc (the combined reactance of Lst and Csi in FIG. 22B) to be much smaller than the real part (Rac in FIG. 22B), to achieve good power factor of Voc (in an ideal condition the series tuned circuit results in a combined reactance of Lst and Csi of 0, so that there is unity power factor). This will be explained further in the next section.

The improved stability provided by the transformer sub-circuit 30 does not come at the expense of the sacrificing power delivered to the load, because the impedance of the load does not actually increase. Further, the improved stability provided by the transformer sub-circuit 30 does not come at the expense of power factor either as the secondary coil is still tuned such that the reactance of the secondary coil is substantially negated by the net reactance of the capacitors in tuning sub-circuit 26.

The derivation above demonstrates that the inclusion of the transformer sub-circuit 30 comprising a single centre-tapped transformer provides a perceived load resistance that is 16 times the actual resistance. The factor of 16 is the square of the ratio of the transformer primary to secondary coil turn of 4:1:1. A similar effect would also be achieved if a single conventional transformer of 4:1 is used instead.

The example discussed above uses an example of a single centre-tapped transformer with a ratio of the transformer primary to secondary coil turn of 4:1:1. The addition of the single centre-tapped transformer results in a perceived load resistance being a load resistance being amplified by a factor of 16. However it should be noted a similar phenomenon takes place when other transformer sub-circuit arrangements are used instead. For example:

If multiple centre-tapped transformers are used (like transformer sub-circuit 230 for example), if each centre-tapped transformer has identical turns ratio of N:1:1, and there are M number of centre-tapped transformers, there would have an equivalent turns ratio of M*N:1 because all the primary coils 256a-c are connected in series and the secondary coils 258a-c are all in parallel. This means the perceived load resistance would be the load resistance amplified by a factor of (M*N)^2. For example, if two centre-tapped transformers are being used and each centre-tapped transformer has an identical turns ratio of 4:1:1, then the perceived load resistance is the load resistance amplified by a factor of 64.

In the case where multiple conventional transformers are used (like transformer sub-circuit 330 for example), if each transformer has turns ratio of N:1, then the turns ratio of the transformer primary side 355 to the transformer secondary side 357 also has a turns ratio of N:1 since because all the primary coils 256a-c are connected in series with each other and the secondary coils 258a-c are all in series with each other. This means the perceived load resistance would be the load resistance amplified by a factor of N^2. For example, if two conventional transformers are being used and each centre-tapped transformer has an identical turns ratio of 4:1, then the perceived load resistance is the load resistance amplified by a factor of 16.

3.2.5.2 Improvement of Power Factor

Discussion now turns to experimental results that show that inclusion of the transformer sub-circuit 30 improves power factor in the inductive power transfer receiver 36.

As mentioned above, adding a transformer sub-circuit 30 into the inductive power transfer receiver 36 reduces the Q factor. A reduced Q factor is indicative of reduced sensitivity of the inductive power transfer receiver 36 to variations in component values, operating frequency, and control inputs. This will now be demonstrated by way of example with reference to simulations of the circuit in FIG. 21B (which is a circuit remodelling of an inductive power transfer receiver without a transformer sub-circuit) and the circuit of FIG. 22B (which is a circuit remodelling of an inductive power transfer receiver without a transformer sub-circuit).

In FIG. 21B, Voc sees an impedance Z_Voc, which is formed from the reactance of Lst, Csi at operating frequency and Rac. Rac is the AC equivalent resistance of the DC load and is calculated as Rdc/1.23 (1.23 an approximation of pi*pi/8), where Rdc is equal to 0.7 ohms (because load power level is 1.2 kW and load voltage is 29V (Rdc=$V^2$/P=29*29/1200)), and the DC to AC impedance conversion ratio is a factor of 1.23. In the example discussed here, Rac is 0.56 ohms, which is a very low value.

A useful way to define power flowing through the secondary is in terms of Voc and its current:

$$P=Voc*Ist*pf$$

where Ist is the secondary coil current and pf stands for the power factor of Voc.

Rewriting Voc in terms of Ipt leads to:

$$P=(Voc)*Ist*pf=(w*Ipt*M)*Ist*pf=w*M*pf*(Ipt*Ist)$$

A power factor of 1 is desirable as it results in a desired product of Ipt and Ist for a given operating frequency and mutual inductance. Given the secondary coil current is directly set by the maximum load current for a series tuned secondary coil, a unity power factor means the primary coil current can be reduced, which is beneficial in terms of lowering primary pad losses.

For a series tuned secondary coil the power factor of Voc approaches 1 if the reactive part is much smaller than the Rac value of 0.56 Ohms. This requires the impedance of Csi to be closely matched to that of Lst.

In the circuit shown in FIG. 21B, Lst is set to 18 ohms or 33 uH. To provide for a desirable power factor the reactance of Csi is set to 17.9 Ohms so that the total reactive impedance is 0.1. However, the component tolerance of capacitors and coil inductances are typically 5% or worse, which would mean the reactance of Csi can change from 17 Ohms to 18.8 Ohms (or change by 1.8 Ohms). If we assume Lst stays unchanged, the change in Csi due to tolerance will make the total reactive impedance (Lst and Csi) vary between −0.8 Ohm and 1 Ohm. This is undesirable because the absolute value of the reactive impedance is relatively larger than the Rac value of 0.56, which is indicative of an undesirable power factor since a desired power factor requires that the reactive impedance (of Lst of Csi) be smaller relative to the Rac value of 0.56 Ohms.

We can therefore observe that in ideal conditions (where the reactance of Csi remains at 17.9 Ohms) a desirable power factor can be achieved. However if the reactance of Csi increases to 18.8 Ohms or decreases to 17 Ohms then the power factor is compromised. This indicates the circuit behaviour of the inductive power transfer receiver will change depending on how the reactance of Csi deviates from the desired value of 17.9 Ohms.

Adding a transformer sub-circuit will help solve this problem. Referring to the circuit shown in FIG. 22B, if we add a centre-tapped transformer with a turns ratio of 4:1:1 or a conventional transformer with 4:1 turns ratio to the series tuned secondary, the AC load resistance can be perceived by the secondary coil to be 16 times larger with a perceived Rac value of 9 Ohms.

The perceived amplification of Rac allows the reactive part of Z_Voc (which is the combined reactance of Lst and Csi) to be increased slightly from 0.1 Ohms to 3 Ohms without sacrificing power factor. Assuming the reactance of Lst remains at 18 Ohms, a reduced reactance of Csi of 15 Ohms can be selected so that the combined reactance of Lst and Csi becomes 15−5=3 Ohms. A +/−5% capacitor tolerance causes the total reactance of Lst and Csi to vary from 2.25 to 3.75 Ohms (as 18−15*1.05=2.25 Ohms, and 18−15*0.95=3.75 Ohms). This means that in spite of the +/−5% variation in the reactance of Csi, the combined reactance of Lst of Csi will always be relatively lower than the perceived Rac value of 9 Ohms, which means a desirable power factor will always be achieved even when the reactance of capacitor Csi varies within the +/−5% variation. This indicates reliable circuit behaviour in the inductive power transfer receiver.

From simulating the circuit behaviours of the circuit of FIG. 21B (which is a circuit remodelling of the inductive power transfer receiver without a transformer sub-circuit) and the circuit of FIG. 22B (which is a circuit remodelling of the inductive power transfer receiver with a transformer sub-circuit), it is possible to observe that the inclusion of a transformer sub-circuit means a desirable power factor can be maintained in spite of the reactance of Csi varying within a +/−5% variation.

3.3 Specific Embodiments

Discussion now turns to various specific embodiments of inductive power transfer receivers 36 as part of an inductive power transfer system 1 with reference to FIGS. 23-28.

3.3.1 First Specific Embodiment

Figure 23:
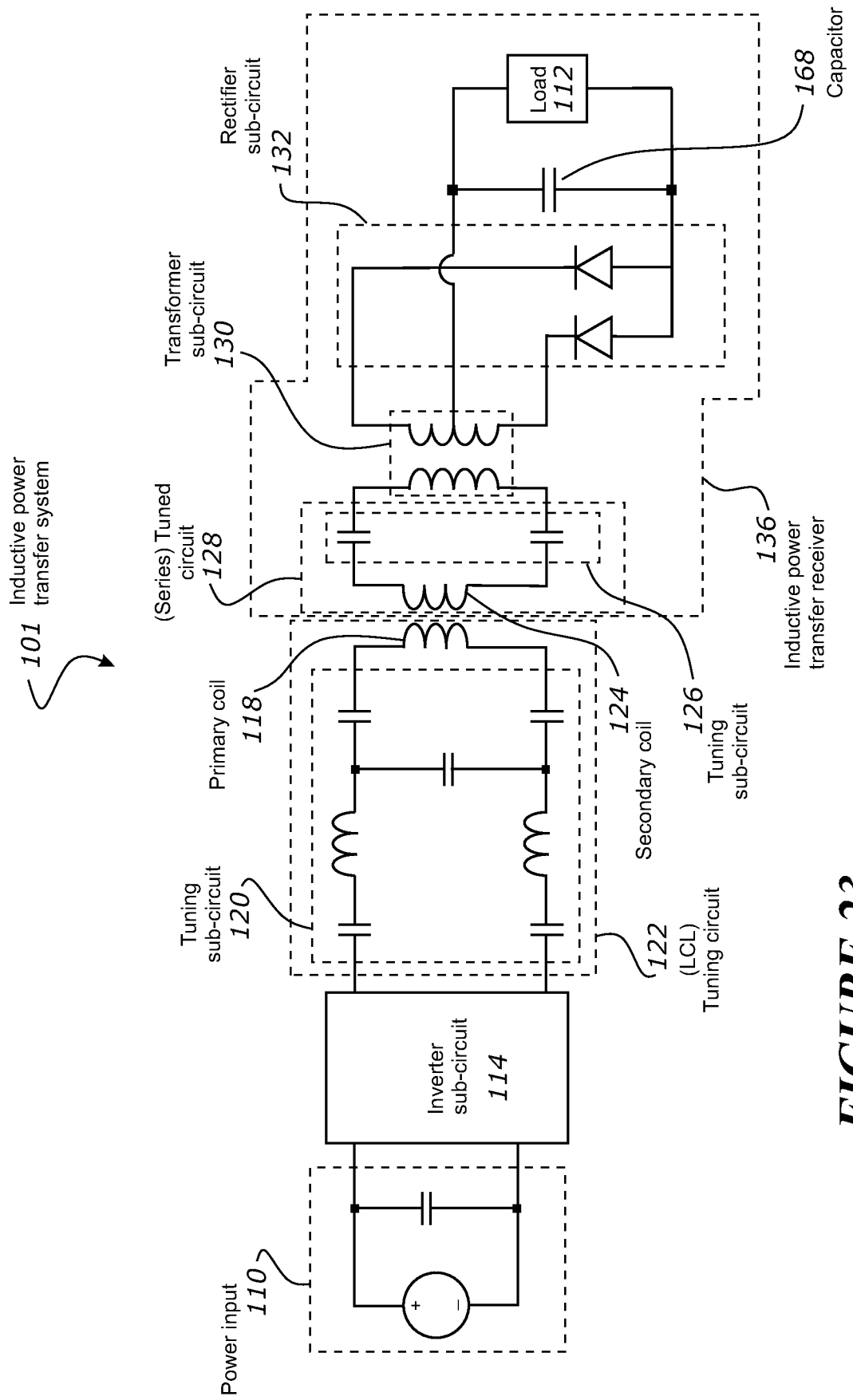
FIG. 23 shows an inductive power transfer receiver embodiment as part of an inductive power transfer system.

FIG. 23 shows a first inductive power transfer receiver 136 as part of an inductive power transfer system 101. The inductive power transfer receiver 136 comprises a (series) tuned circuit 128 formed from the secondary coil 124, and tuning sub-circuit 126, and the transformer sub-circuit 130 (FIG. 13). The inductive power transfer receiver 136 may optionally include rectifier sub-circuit 132 (FIG. 16 for example), capacitor 168 and/or load 112. This inductive power transfer receiver 136 can be used when the desired voltage across the load 12 is low (about 100 Vdc or less for example), and desired current through the load 12 is low (less than about 50 A for example).

FIG. 23 more broadly shows an inductive power transfer system 101. In addition to the inductive power transfer receiver 136, the inductive power transfer system 101 also comprises a power input 110, an inverter sub-circuit 114, a tuning sub-circuit 120, and primary coil 124. The tuning sub-circuit 120 comprises a combination of capacitors and inductors such that the tuning sub-circuit 120 together with the primary coil 118 forms an LCL tuned circuit 122.

3.3.2 Second Specific Embodiment

Figure 24:
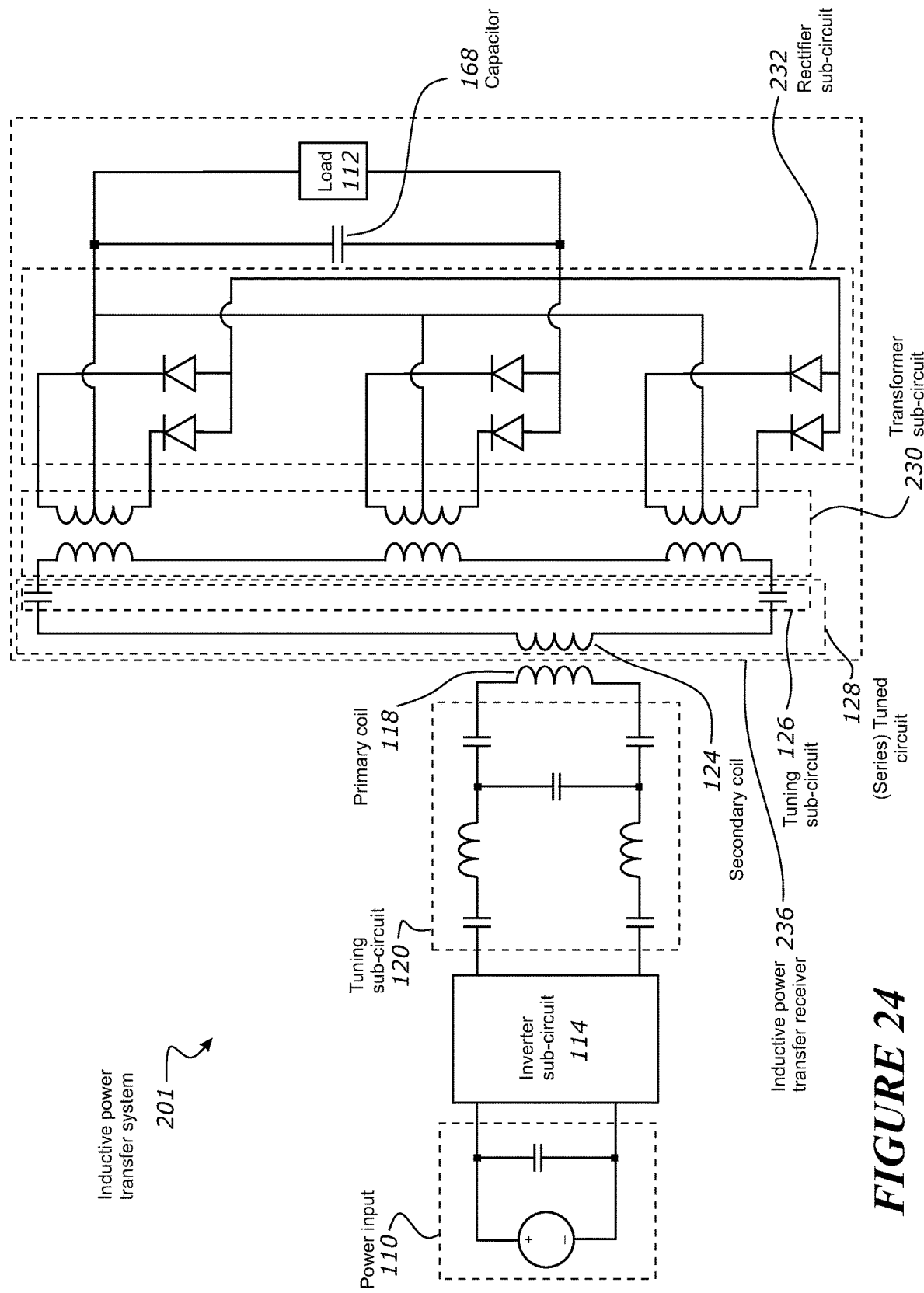
FIG. 24 shows another inductive power transfer receiver embodiment as part of an inductive power transfer system.

FIG. 24 shows a second inductive power transfer receiver 236 as part of an inductive power transfer system 201. The inductive power transfer receiver 236 comprises a (series) tuned circuit 128 formed from the secondary coil 124, and tuning sub-circuit 126, and the transformer sub-circuit 230 (FIG. 14). The inductive power transfer receiver 236 may optionally include rectifier sub-circuit 232 (FIG. 17 for example), capacitor 168 and/or load 112. This inductive power transfer receiver 236 can be used when the desired voltage across the load 12 is low (about 100 Vdc or less for example), and desired current through the load 12 is high (more than about 50 A for example).

FIG. 24 more broadly shows an inductive power transfer system 201. In addition to the inductive power transfer receiver 236, the inductive power transfer system 201 also comprises a power input 110, an inverter sub-circuit 114, a tuning sub-circuit 120, and primary coil 124. The tuning sub-circuit 120 comprises a combination of capacitors and inductors such that the tuning sub-circuit 120 together with the primary coil 118 forms an LCL tuned circuit 122.

3.3.3 Third Specific Embodiment

Figure 25:
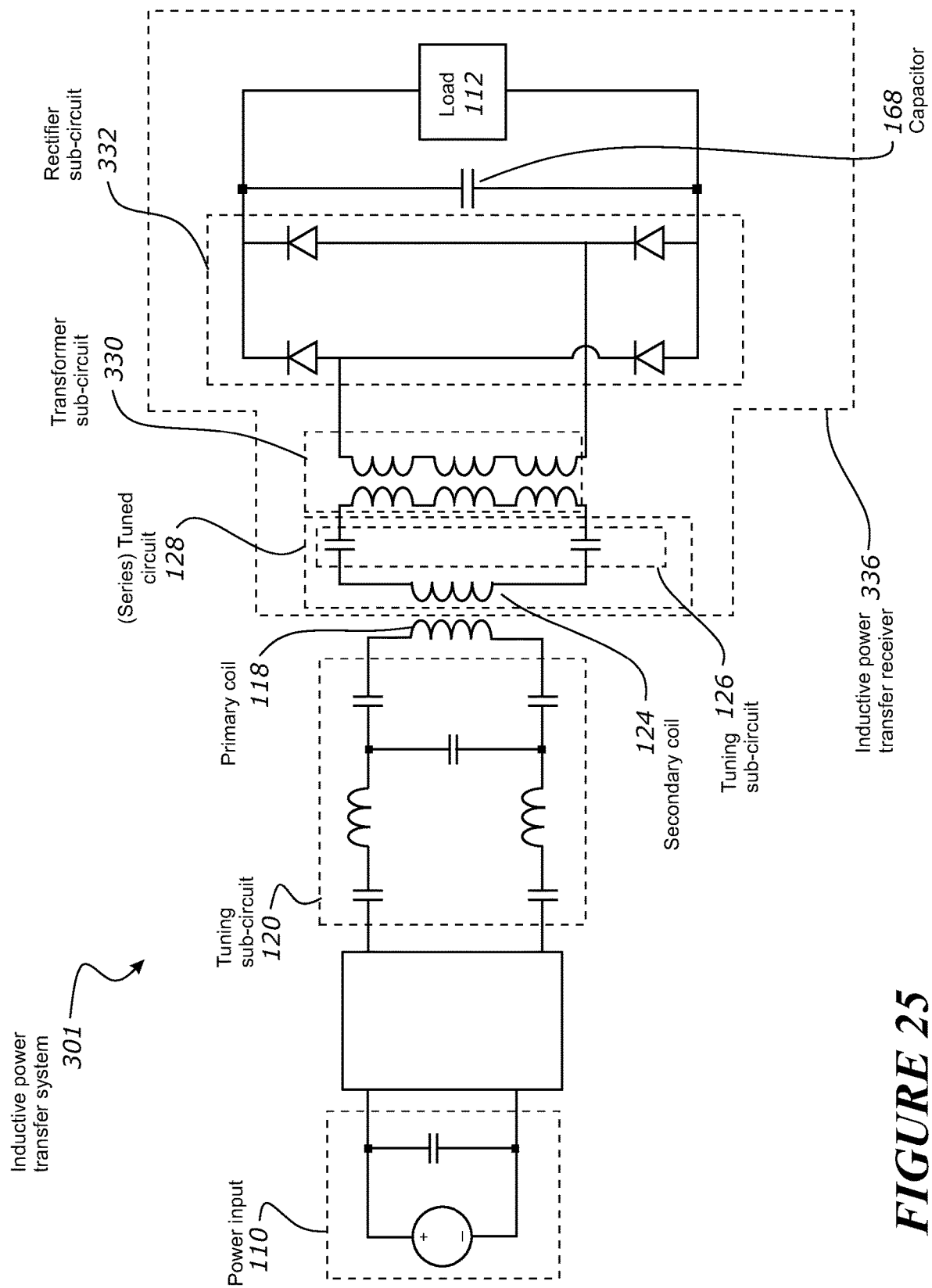
FIG. 25 shows another inductive power transfer receiver embodiment as part of an inductive power transfer system.

FIG. 25 shows a third inductive power transfer receiver 336 as part of an inductive power transfer system 301. The inductive power transfer receiver 336 comprises a (series) tuned circuit 28 formed from the secondary coil 124, and tuning sub-circuit 126, and the transformer sub-circuit 330 (FIG. 15). The inductive power transfer receiver 236 may optionally include rectifier sub-circuit 332 (FIG. 18 for example), capacitor 168 and/or load 112. This inductive power transfer receiver 336 can be used when the desired voltage across the load 12 is high (about 100 Vdc or more for example), and desired current through the load 12 is low (less than about 30 A for example).

FIG. 25 more broadly shows an inductive power transfer system 301. In addition to the inductive power transfer receiver 336, the inductive power transfer system 301 also comprises a power input 110, an inverter sub-circuit 114, a tuning sub-circuit 120, and primary coil 124. The tuning sub-circuit 120 comprises a combination of capacitors and inductors such that the tuning sub-circuit 120 together with the primary coil 118 forms an LCL tuned circuit 122.

3.3.4 Fourth Specific Embodiment

Figure 26:
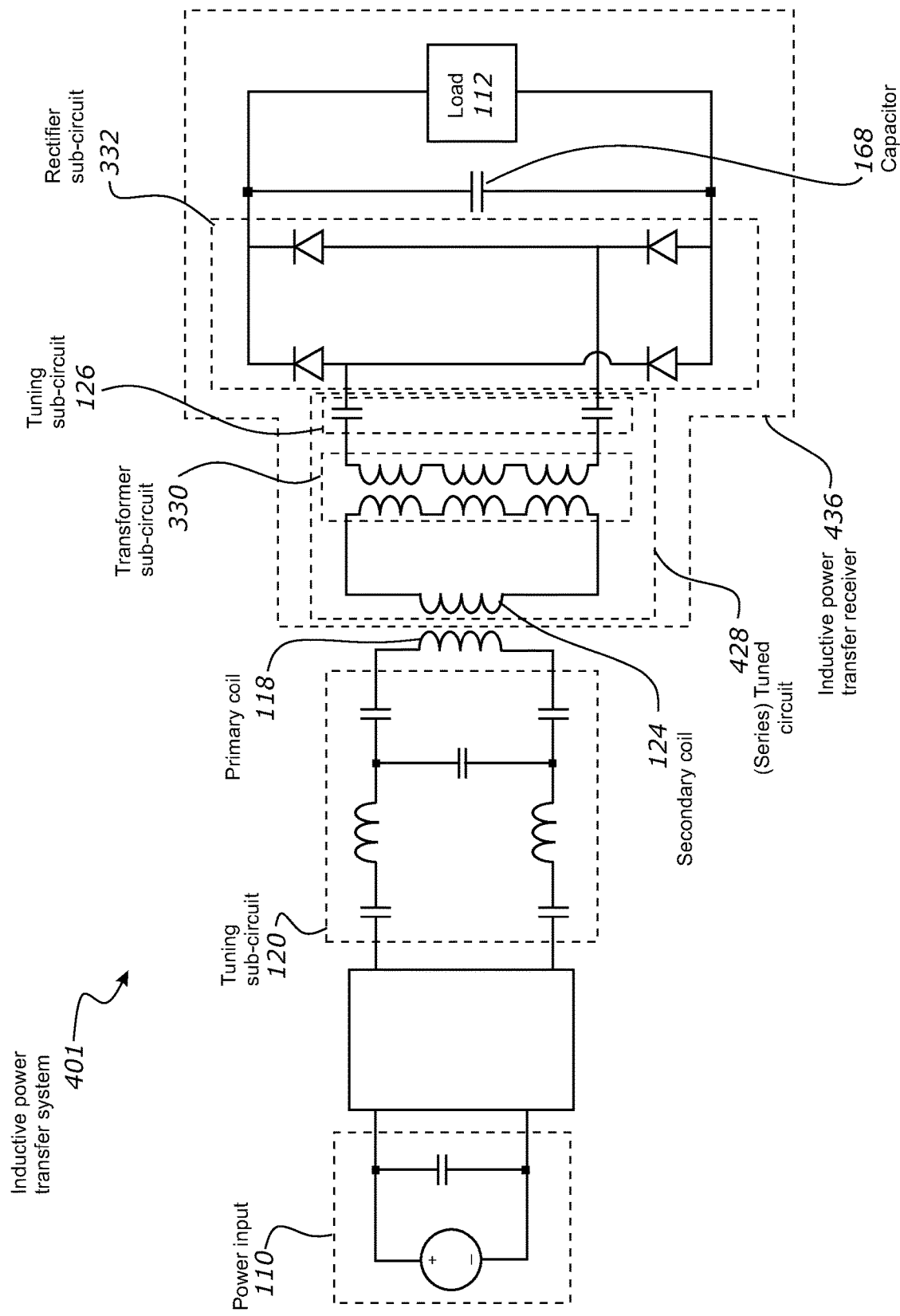
FIG. 26 shows another inductive power transfer receiver embodiment as part of an inductive power transfer system.

FIG. 26 shows a fourth inductive power transfer receiver 436 as part of an inductive power transfer system 401. The inductive power transfer receiver 436 is similar to the inductive power transfer receiver 336 described above, with the only difference being that the relative positions of the transformer sub-circuit 330 (FIG. 15) and tuning sub-circuit 426 have reversed. That is, the tuning sub-circuit 26 connects to the transformer secondary side 357. In this situation, the transformer sub-circuit 330 can be considered to be within the tuned circuit 428. Further, it is possible to remodel tuned circuit 428 such that the capacitors in the tuning sub-circuit 426 can be remodelled to be in series with the secondary coil 124. This means that the tuned circuit 428 can be considered to be a series tuned circuit. This inductive power transfer receiver 436 when the desired voltage across the load 12 is high (about 100 Vdc or more for example), and desired current through the load 12 is low (less than about 30 A for example).

Moving the tuning sub-circuit 426 across from the transformer secondary side 357 to the transformer primary side 355 leads to lower voltage across capacitor in the tuning sub-circuit 26. For example, if transformer sub-circuit 330 has a turns ratio of 2:1 and reactance of the capacitors in the tuning sub-circuit 126 (placed on transformer primary 355) is A, the voltage across the capacitors in the tuning sub-circuit 126 is A*I, where I is the transformer primary current. If we shift the capacitors (that make up tuning sub-circuit 126) to the secondary side of transformer 357, its reactance needs to be A/4 (reflected through turns ratio), and transformer secondary current is 2*I. This results in a capacitor voltage of A*I/2.

FIG. 26 more broadly shows an inductive power transfer system 401. In addition to the inductive power transfer receiver 436, the inductive power transfer system 101 also comprises a power input 410, an inverter sub-circuit 114, a tuning sub-circuit 120, and primary coil 124. The tuning sub-circuit 120 comprises a combination of capacitors and inductors such that the tuning sub-circuit 120 together with the primary coil 118 forms an LCL tuned circuit 122.

3.3.5 Fifth Specific Embodiment

Figure 27:
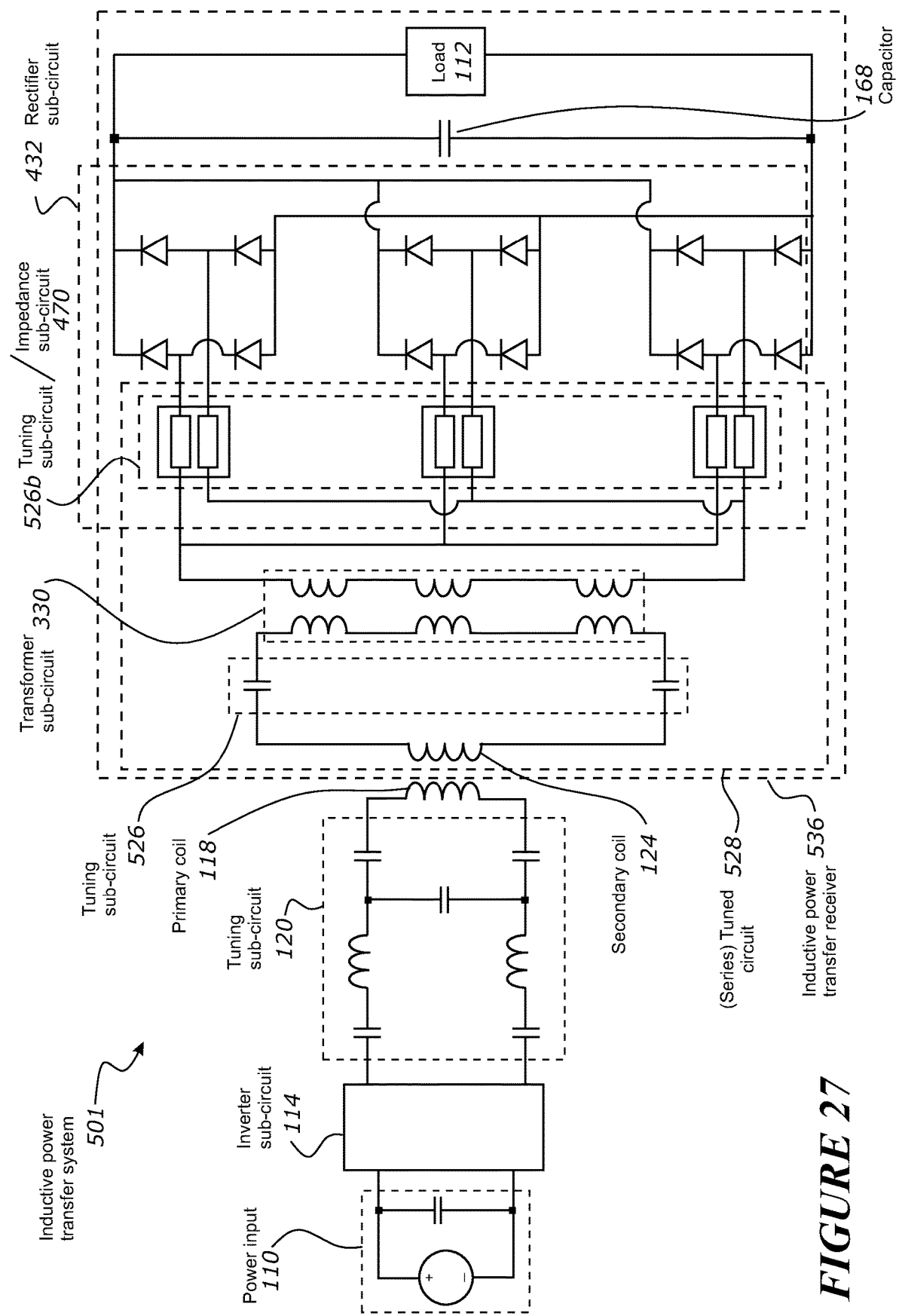
FIG. 27 shows another inductive power transfer receiver embodiment as part of an inductive power transfer system.

FIG. 27 shows a fifth inductive power transfer receiver 536 as part of an inductive power transfer system 501. The inductive power transfer receiver 536 comprises a (series) tuned circuit 528 formed from the secondary coil 124, and tuning sub-circuits 526a, and the transformer sub-circuit 330 (FIG. 15). The inductive power transfer receiver 536 may optionally include rectifier sub-circuit 432 (FIG. 19 for example), capacitor 168 and/or load 112. This inductive power transfer receiver 536 can be used when the desired voltage across the load 12 is high (about 100 Vdc or more for example), and desired current through the load 12 is high (more than about 30 A for example).

The rectifier sub-circuit 432 comprises impedance sub-circuit 470. As discussed previously, the impedance sub-circuit 470 can also function as a tuning sub-circuit 526b if the components if the components that make up the impedance sub-circuit 470 are capacitive. In such a situation, the transformer sub-circuit 330 can be considered to be within the tuned circuit 528. Further, it is possible to remodel tuned circuit 528 such that the capacitors in the tuning sub-circuit 526 can be remodelled to be in series with the secondary coil 124. This means that the tuned circuit 428 can be considered to be a series tuned circuit, irrespective of whether tuned circuit 428 just comprises tuning sub-circuit 526a or both tuning sub-circuits 526a-b.

FIG. 27 more broadly shows an inductive power transfer system 501. In addition to the inductive power transfer receiver 536, the inductive power transfer system 501 also comprises a power input 510, an inverter sub-circuit 114, a tuning sub-circuit 120, and primary coil 124. The tuning sub-circuit 120 comprises a combination of capacitors and inductors such that the tuning sub-circuit 120 together with the primary coil 118 forms an LCL tuned circuit 122.

3.3.6 Sixth Specific Embodiment

Figure 28:
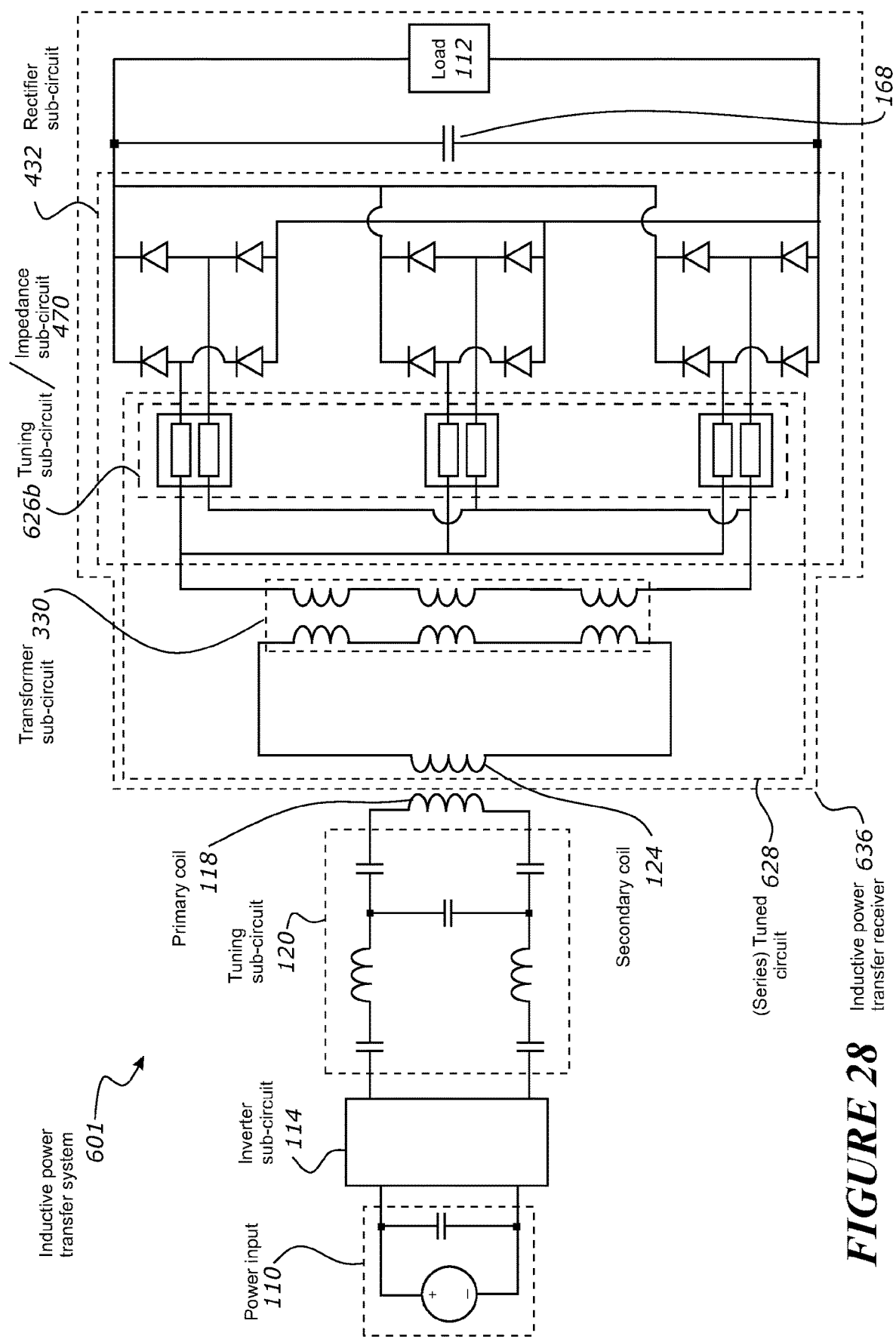
FIG. 28 shows another inductive power transfer receiver embodiment as part of an inductive power transfer system.

FIG. 28 shows a sixth inductive power transfer receiver 636 as part of an inductive power transfer system 601. The inductive power transfer receiver 636 is similar to the inductive power transfer receiver 536 described above, with the only difference being that the impedance sub-circuit 470 is capacitive so that it acts as the tuning sub-circuit 626 also. That is, the capacitors that make up tuning sub-circuit 126 can be moved from the transformer primary side 355 to the transformer secondary side 357 be represented as impedance components of impedance sub-circuit 470. For example, if impedance pairs 472a-c are assumed to be equal in value and all have a net capacitive reactance, each impedance pair could be a capacitor with a capacitance of Csi'/N, where Csi' is the equivalent capacitance of capacitors that make up tuning sub-circuit 126 reflected transformer primary side 355 to the transformer secondary side 357, and N is the number of bridge rectifiers.

The transformer sub-circuit 330 can be considered to be within the tuned circuit 628. Further, it is possible to remodel tuned circuit 628 such that the capacitive components in impedance sub-circuit 470 can be remodelled as a capacitor placed in series with the secondary coil 124. This means that the tuned circuit 628 can be considered to be a series tuned circuit. This inductive power transfer receiver 636 can be used when the desired voltage across the load 12 is high (about 100 Vdc or more for example), and desired current through the load 12 is high (more than about 30 A for example).

FIG. 28 more broadly shows an inductive power transfer system 601. In addition to the inductive power transfer receiver 636, the inductive power transfer system 101 also comprises a power input 110, an inverter sub-circuit 114, a tuning sub-circuit 120, and primary coil 124. The tuning sub-circuit 120 comprises a combination of capacitors and inductors such that the tuning sub-circuit 120 together with the primary coil 118 forms an LCL tuned circuit 122.

3.5 Inductive Power Transfer Receiver with an LCL/LC Parallel Tuned Secondary Coil A series tuned secondary coil is preferred over an LCL tuned secondary coil as well as LC tuned secondary coil. A key difference between these two secondary tuning topologies is how their output currents react to changes in primary coil current. A series tuning circuit under certain conditions is more sensitive to primary coil current.

That said, while it is preferred that the inductive power transfer receiver 36 has a secondary coil 24 that is series tuned, it is not essential to tune the secondary coil 24 in this way. As an alternative, the inductive power transfer 36 may instead have a secondary coil 24 that is LCL tuned. That is, the inductive power transfer 36 may have a secondary coil 24 that is tuned by a tuning sub-circuit comprising at least one capacitor and at least one inductor to form an LCL tuned circuit. As another alternative, the inductive power transfer inductive power transfer 36 may instead have a secondary coil that is LC parallel tuned. That is, the inductive power transfer 36 may have a secondary coil 24 that is tuned by a tuning sub-circuit comprising at least one to form a LC parallel tuned circuit.

Because LCL and LC parallel tuning are both fundamentally parallel tuned topology, their operating principles are similar.

For LC parallel tuned secondary coil, the benefits of adding a transformer sub-circuit are the similar as those for LCL tuned secondary coil, and the working principle of how the transformer sub-circuit bring the benefits (as discussed throughout the specification) is also the similar as the way in LCL tuned secondary coil.

Therefore, this section 3.5 will only provide detailed explanations for why adding a transformer sub-circuit to an inductive power transfer receiver is advantageous in relation to an LCL tuned secondary coil, although it should be noted that the explanation provided in this section also applies when the secondary coil is LC parallel tuned instead of LCL tuned. That is, adding a transformer sub-circuit to an inductive power transfer receiver improves an inductive power transfer receiver with an LC parallel tuned secondary coil in a same way as if the inductive power transfer receiver instead had an LCL tuned secondary coil.

Similar to an inductive power transfer receiver 36 with a series tuned secondary coil 24, the addition of a transformer sub-circuit 30 also improves the performance of an inductive power transfer receiver 36 with an LCL tuned secondary coil 24. The addition of a transformer sub-circuit 30 to an inductive power transfer receiver 36 with an LCL tuned secondary coil provides the same benefits as described above in relation to adding a transformer sub-circuit 30 to an inductive power transfer receiver 36 with a series tuned secondary coil 24:

In principle, the transformer solves the same issues for both LC series tuned and LCL tuned secondary with high output currents.

Without the transformer(s), series and LCL tuned secondary both experience high sensitivity issue when required to output high currents. The high sensitivity causes the circuits to become unstable and hard to control. More specifically, the high sensitivity has two phenomena: 1) small value changes (<5%) of tuning capacitor, inductor or secondary coil that are typically due to component tolerances, temperature and coupling etc. will cause a very large change in the output currents. 2) Small Voc (secondary coil open circuit voltage induced by the primary coil current. It can be thought of as the power source to drive the whole secondary circuits, so the primary circuits controls Voc to control the output power) changes also cause large output current changes, which makes the control harder.

Because LCL and LC series circuits work in different ways to boost the current, so the fundamental reasons for instability are slightly different.

Besides the stability issue, LC series tuning with high output currents and low output voltages can also easily experience poor power factor for Voc, leading to high primary coil current. In contrast, LCL does not share this problem as its structure intrinsically leads to a good power factor for Voc.

Adding a transformer to the series tuned secondary is the only way to reduce secondary coil current. In contrast, an LCL secondary does not need a transformer to lower its coil current, but adding a transformer reduces secondary coil current similar to a series tuned secondary.

Description of an inductive power transfer receiver 36 having an LCL tuned secondary coil will now be described with reference to FIGS. 2D-2E, and FIGS. 31-35.

3.5.1 LCL tuned secondary coil without a transformer sub-circuit

Discussion turns to why it is problematic to have an inductive power transfer receiver with an LCL tuned secondary coil without a transformer sub-circuit 30. In this section, the term transformer may be interchangeable with transformer sub-circuit.

Figure 2D:
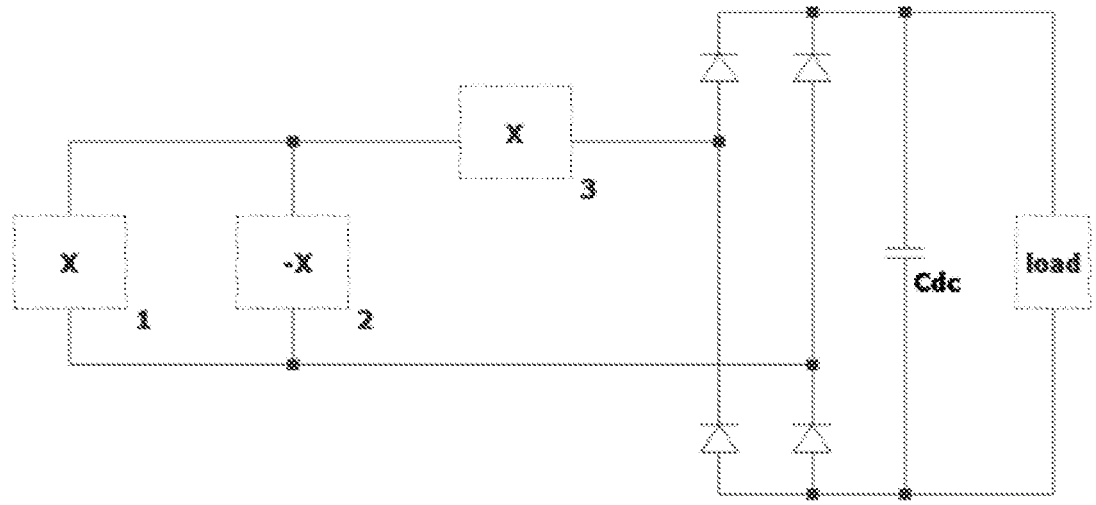
Figure 2E:
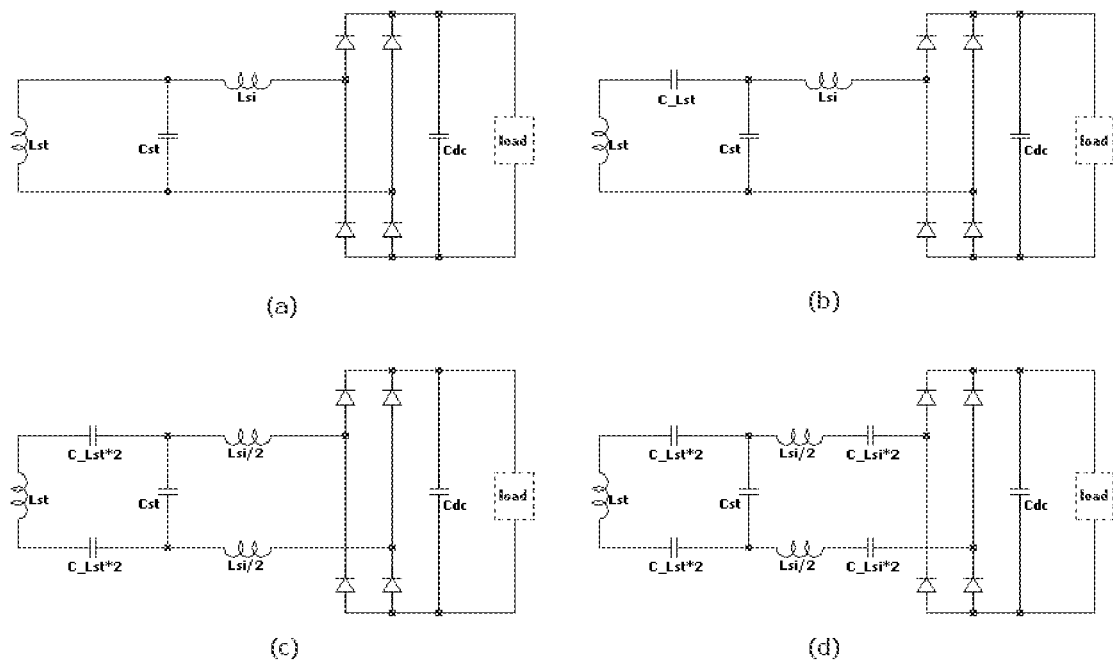
Figure 2F:
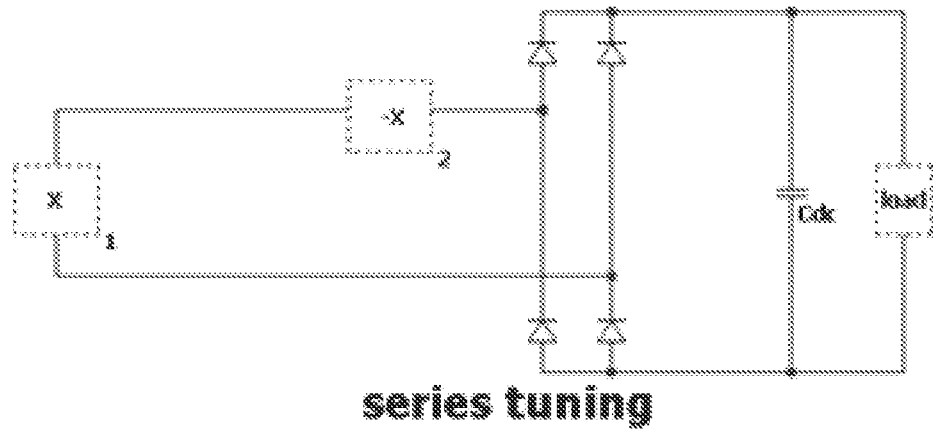
FIG. 2F shows different types of tuning.
Figure 2F:
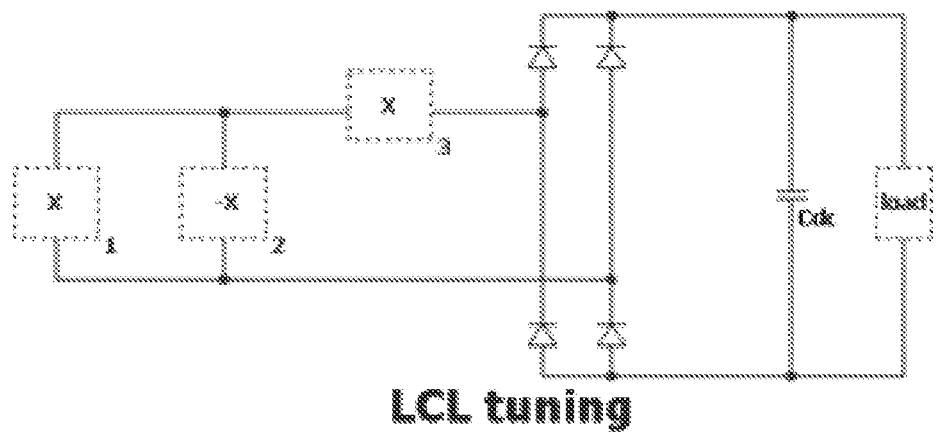
Figure 2F:
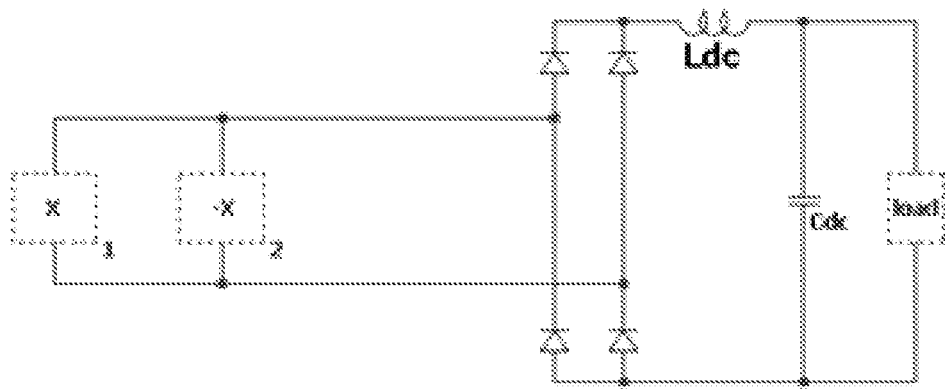

An LCL tuned secondary is shown in FIG. 2D. Its features are:
1. Block 1 is an inductive element with an overall impedance of X. it always contains the secondary coil and may include one or more series capacitors (FIG. 2E ((b) (c) (d)) to boost output current, which will be explained in a later section.
2. Block 2 is a capacitive element with an overall impedance of −X. It is typically realized using only capacitors.
3. Block 3 is an inductive element with an overall impedance of X. It always contains an inductor (Lsi) and may include one or more series capacitors (FIG. 2E ((c) (d))). Block 3 is typically distributed evenly between two inputs of rectifier as shown in FIG. 2 E ((c) (d)).

An LCL tuned secondary is driven from a voltage (Voc) induced by the primary coil current.

$$V_{oc}=j\omega I_{pt} \qquad \text{Equation 1,}$$

where $\omega=2*pi*f$ (f is the operating frequency), M is the mutual inductance between primary and secondary coils and Ipt is the primary coil current.

M is related to the coupling factor k between primary and secondary coils, primary and secondary self-inductances as:

$$M=k\sqrt{L_{pt}L_{st}} \qquad \text{Equation 2}$$

The LCL is perfectly tuned when the absolute impedance of blocks 1, 2 and 3 are all equal to X. Under this condition, Voc sees a substantially real load and operates at a unity power factor, which leads to an optimal Ist for a given Voc. If impedance of blocks 1, 2 and 3 deviate from X, an LCL is said to be detuned, which may lead to a poor power factor and more reactive currents in the system.

Figure 29:
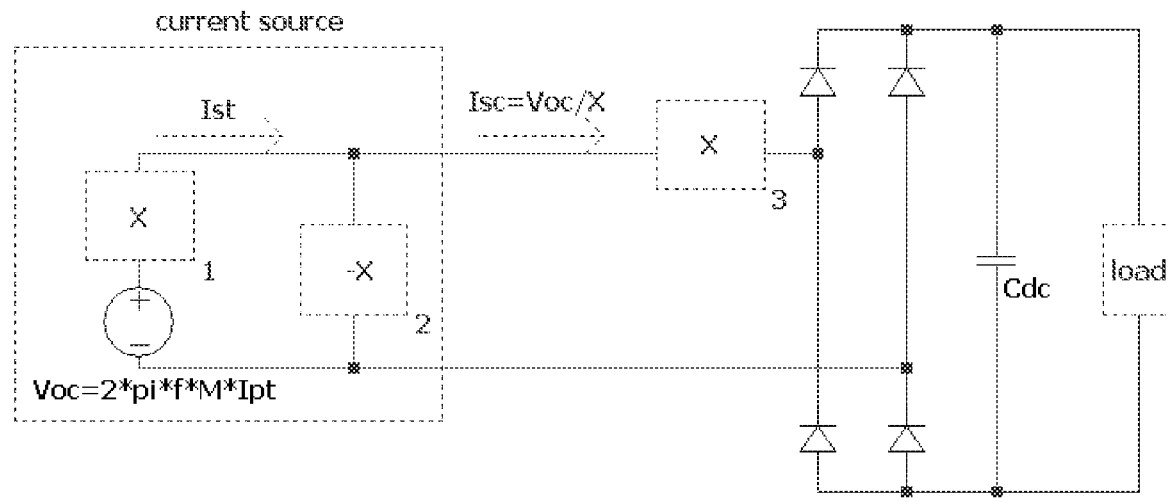
FIG. 29 shows a remodelled circuit of an inductive power transfer receiver without a transformer sub-circuit.

For a well-tuned LCL network, components (Voc, blocks 1 and 2) in a dashed box in FIG. 29 behave as a current source. The magnitude of this current (Isc) is defined as:

$$I_{sc}=\frac{V_{oc}}{X} \qquad \text{Equation 3}$$

Isc is also known as the short-circuit current. The current source characteristic can be explained using Norton equivalent circuit theorem, which transforms the series connection of Voc and a series connected X (block 1) into a parallel connection of Isc and X (block 1). Then we are left with a parallel connection of −X and X (blocks 1 and 2) that has an infinite impedance or open circuit. Under this condition, Isc is forced to flow through block 3 into the rectifier and load. Therefore, Isc sets the output load DC current and output power level regardless of the load voltage.

The relationship between Isc and the DC load current IDC for an LCL tuned secondary is:

$$I_{DC}=\frac{I_{sc}}{\pi/\sqrt{8}} \qquad \text{Equation 4}$$

For a well-tuned parallel LC secondary, the short-circuit current also Isc also is forced to flow into the rectifier and into the DC load. The only difference is the ratio between Isc and IDC is slightly different.

For applications that require high output currents, higher Isc are required. This can be achieved by either increasing Voc or decreasing X according to Equation 3.

According to Equation 1 and assuming frequency is fixed, Voc can be increased by one of three methods, which are 1) increasing M, 2) increasing Ipt and 3) decreasing X.

According to Equation 2, a higher M will typically require both primary and secondary coil inductances to be higher, which may increase the X of the secondary and decrease the short circuit current and load current. Therefore, increasing output current by increasing M (first method) is not very effective. In addition, physical sizes of both primary and secondary coils are often constrained, so Lpt and Lst cannot be made too large.

Similarly, Ipt cannot be increased too high neither due to thermal constraints of the primary pad. This makes the second method not very attractive.

The third method, decreasing X, is achieved by adding series tuning capacitor C_Lst (a negative impedance) to block 1 to partially cancel out the positive impedance of Lst. This is known as increasing the current Q (Qi) on the secondary. Qi is defined as:

$$Q_i = \frac{X_{Lst}}{X_{Lst} + X_{C\_Lst}} \quad \text{Equation 5}$$

because $X_{C\_Lst}$ is negative, so Qi is 1 (minimum value) when C_Lst is not present.

Although Qi can be used to increase Isc and output power level, its value cannot be set too high (typically over 4) because such designs may become too sensitive against component tolerances, leading to larger variations on the power level and poorer Voc power factors due to component tolerances and variations (Component values may change with operating temperature). This will be explained using the 1.2 kW system as an example.

Recall the 1.2 kW system is required to output 1.2 kW of power into a 29V battery, which requires a DC output current of 41.4 A or a short-circuit current of 46 A. A typical magnetic design may have a primary coil inductance of 88 uH and a secondary coil inductance of 64 uH. When operating at the worst coupling position (k=0.154), the primary coil current is limited to 19 A for thermal reasons. This means Voc=117V and Isc=3.4 A without any current boost or Qi=1. Under this condition, the output DC current is only 3 A and the output power level is only 87 W.

If we use Qi to boost power to 1.2 kW, Isc needs to be boosted from 3.4 A to 46 A. This means the X of block 1 needs to be reduced to Voc/Isc_required=117/46=2.54 by adding an impedance of −31.6 ohm in series with Lst (reactance of Lst is 34.2 ohms).

Such a design has a very high Qi, which according to Equation 5 can be calculated as:

$$Q_i = \frac{X_{Lst}}{X_{Lst} + X_{C\_Lst}} = \frac{34.2}{34.2 + (-31.6)} = 13.15$$

Such a high Qi design makes the inductive power transfer receiver very sensitive to component tolerances, and destabilises the inductive power transfer receiver. For example, capacitors typically has a tolerance of +/−5%. This means the reactance of C_Lst can potentially vary from 30 to 33.18. As a result, assuming Voc remains constant at 117V, the short-circuit current can now change from 117/(64 uH*w−33.18)=117 A to 117/(64 uH*w−30)=28 A or by a factor of 4.2 times. Such a large change in the short-circuit current also means the output power level will change by the same factor, which is too large to compensate using system control inputs, such as primary inverter phase shift or primary input DC voltage variation. Therefore, from the observed lack of stability, this design is not practical. Similar effects can be observed if we consider a +/−5% tolerance for inductor Lst.

It should be noted that for this analysis, we simplified it by assuming the impedance of block 2 changes with X of the first block so the current source characteristics is always maintained. In reality, all components have certain tolerances and their combined effects may make Isc change by an even larger amount due to further detuning effects.

In addition to the change in power levels, component tolerance for high Qi designs can also significantly detune the secondary, leading to poor power factor for Voc. In addition, it also affects the secondary impedance reflected to the primary, which detunes the primary and leads to poor power factor for the inverter.

Therefore, the secondary Qi should not be designed too high. Typically, Qi is kept less than 4.

It should be mentioned that the problems discussed above in relation to an inductive power transfer receiver with an LCL tuned secondary coil without a transformer sub-circuit are the same problems facing an inductive power transfer receiver with an LC parallel tuned secondary coil without a transformer sub-circuit.

3.5.2 LCL Tuned Secondary Coil with a Transformer Sub-Circuit

Figure 30:
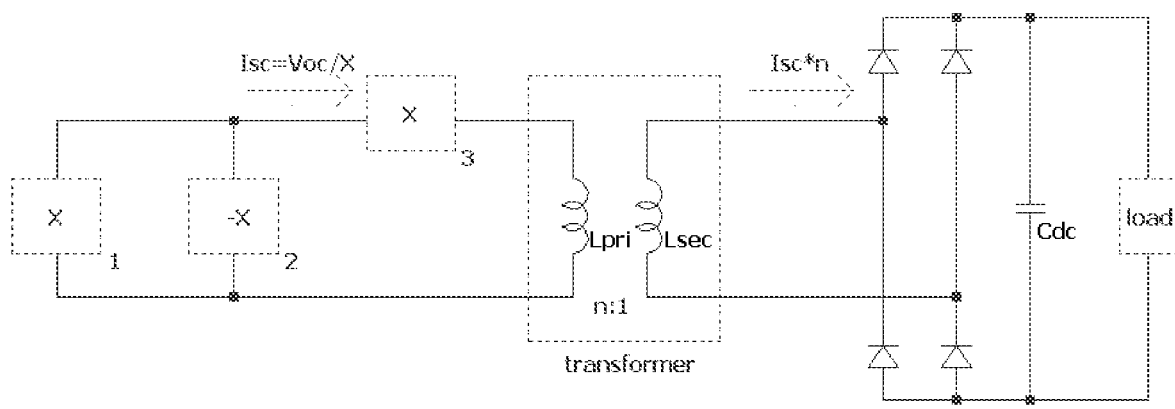
FIG. 30 shows an inductive power transfer receiver with a transformer sub-circuit.

The problems discussed in section 3.5.1 can be solved by adding a transformer sub-circuit 30 to the LCL tuned secondary, as shown in FIG. 30. In this section, the term transformer may be interchangeable with transformer sub-circuit.

We can resolve the above issues associated with a high Qi by adding a transformer to the LCL tuned secondary, as shown in FIG. 30. The transformer should have more primary turns to step up its primary current. We define the turns ratio to be n:1, where n is larger than 1.

The transformer primary current is the short-circuit current Isc defined by Equation 3. But its secondary current is now n times larger than Isc due to the turns ratio of n:1. Because the output DC current is set by this larger transformer secondary current, adding a transformer has effectively amplified Isc; in other words, the transformer helps to lower Qi.

We can now express the output DC current as:

$$I_{DC} = \frac{n \times I_{sc}}{\pi/\sqrt{8}}$$

For example, if we select the turns ratio to be 4:1 for the 1.2 kW example, Qi will only need to be 13.15/4=3.3. This means reactance of C_Lst only needs to be −24 ohms (instead of −31.6 ohms for the design without transformer). In this case, a +/−5% tolerance will only cause output current to change from 41.1 A to 52 A or a factor of 1.26 times, which is much easier to compensate using system control inputs.

In addition, for the lower Qi design with a 4:1 transformer, a +/−5% change in C_Lst means reactance of C_Lst changes from −22.8 to −25.2 Ohms or by 2.4 ohms. In contrast, for the high Qi design without the transformer, a +/−5% change in C_Lst means reactance of C_Lst changes from −30 to −33.2 Ohms or by 3.2 ohms. The larger change in reactance of C_Lst means Voc power factor also changes more for the high Qi design; the high Qi design will have poorer power factor due to component tolerances or variations.

The discussion above demonstrate the effectiveness of using transformer to help reduce variations in power levels and power factor due to component tolerances by directly reducing Qi, therefore making the system less sensitive. The addition of a transformer sub-circuit therefore improves stability of the inductive power transfer receiver.

The transformer also helps to increase the control resolution of Isc.

Because $\Delta Isc=(\Delta Voc/\omega*Lst)*Qi$, we can see when Qi becomes big, a very small variation of Voc can cause a very big change on Isc, which makes it hard to achieve a good controllable resolution for Isc. Let's use the same parameters used in the above examples. Without the transformer, Qi=13.4, 1V change of Voc can cause about 400 mA change on Isc, whereas with the transformer (n=4:1), Qi=3.35, 1V change of Voc only causes about 100 mA change on Isc, so a better Isc control resolution can be achieved with a transformer.

The transformer could also be deliberately designed to have a large leakage inductance, to function as the inductance of block 3. This may reduce cost, volume and weight of an LCL secondary.

Adding a transformer to an LCL tuned secondary also helps to lower the secondary coil current by allowing a higher Voc and higher Lst while reducing system sensitivity towards component variations so variations in power level and Voc power factor are not too large to compensate by decreasing Qi. This concept will be explained as following.

For an LCL tuned secondary, the only way to reduce its coil current is to increase Voc while maintaining a good Voc power factor. According to Equation 1, Voc can be increased by increasing primary coil current Ipt, M and frequency.

In order to compare different secondary designs without the influence of primary, we will fix the primary coil current, primary coil inductance and k, and only allow secondary coil inductance to change. This means Voc can only be changed by varying secondary coil inductance Lst, which then changes M.

We will present designs A and B in Table 1 to demonstrate how adding a transformer to an LCL tuned secondary can lower secondary coil current while not increasing the sensitivity. The primary parameters for designs A and B are still based on the 1.2 kW example.

TABLE 1 designs A and B for 1.2 kW

|  | Ipt | k | Lpt | Lst | M | Voc | Ist | Isc | Qi |
|---|---|---|---|---|---|---|---|---|---|
| design A | 19 A | 0.154 | 88 uH | 32 uH | 8.17 uH | 83 V | 14.5 A | 4.8 A | 9.6 |
| design B | 19 A | 0.154 | 88 uH | 128 uH | 16.3 uH | 165 V | 7.3 A | 2.4 A | 19.2 |

Design B is configured to reduce the secondary coil current by a factor of two. This is achieved by increasing M by a factor of two, which requires Lst to be four times larger.

As a result, Isc of design B is half of that of design A, which means design B requires twice the Qi in order to reach 1.2 kW.

From this comparison, we can see that a higher secondary Qi is needed to reduce secondary coil current. Because transformer can always help to lower Qi, we can argue that adding a transformer to an LCL tuned secondary helps to simultaneously reduce secondary coil current and improve sensitivity in terms of power and power factor variations due to component tolerances.

It should be mentioned that the solution that the transformer sub-circuit provides in relation to an inductive power transfer receiver with an LCL tuned secondary coil is the same as the solution that the transformer sub-circuit would provide in relation to an inductive power transfer receiver with an LC parallel tuned secondary coil.

3.5.3 Specific Embodiments

Discussion now turns to various specific embodiments of inductive power transfer receivers 36 comprising an LCL tuned secondary coil with reference to FIGS. 31-35.

Different implementations are also possible for an LCL tuned secondary depending on the load voltage and current.

3.5.3.1 Seventh Specific Embodiment

Figure 31:
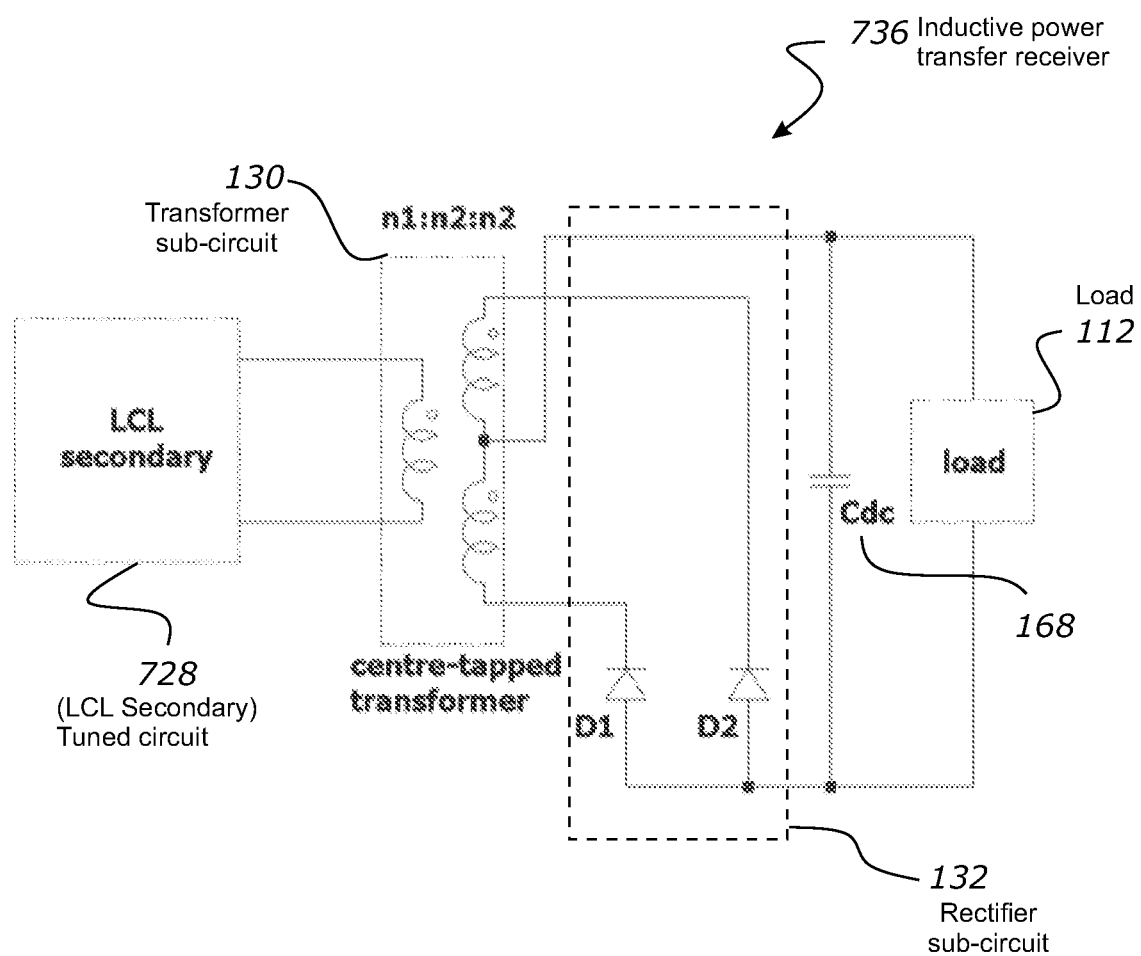
FIG. 31 shows another inductive power transfer receiver embodiment as part of an inductive power transfer system.

FIG. 31 shows a seventh inductive power transfer receiver 736. The seventh inductive power transfer receiver 736 is similar to the first power transfer receiver embodiment 136 as described above, except in the inductive power transfer receiver 736, the secondary coil is LCL tuned instead of series tuned.

The inductive power transfer receiver 736 may be suitable if load voltages is less than 100V and load current less than 30 A for example. Synchronous rectification can be achieved by replacing D1 and D2 with MOSFETs or other types of switches to lower rectification losses.

3.5.3.2 Eighth Specific Embodiment

Figure 32:
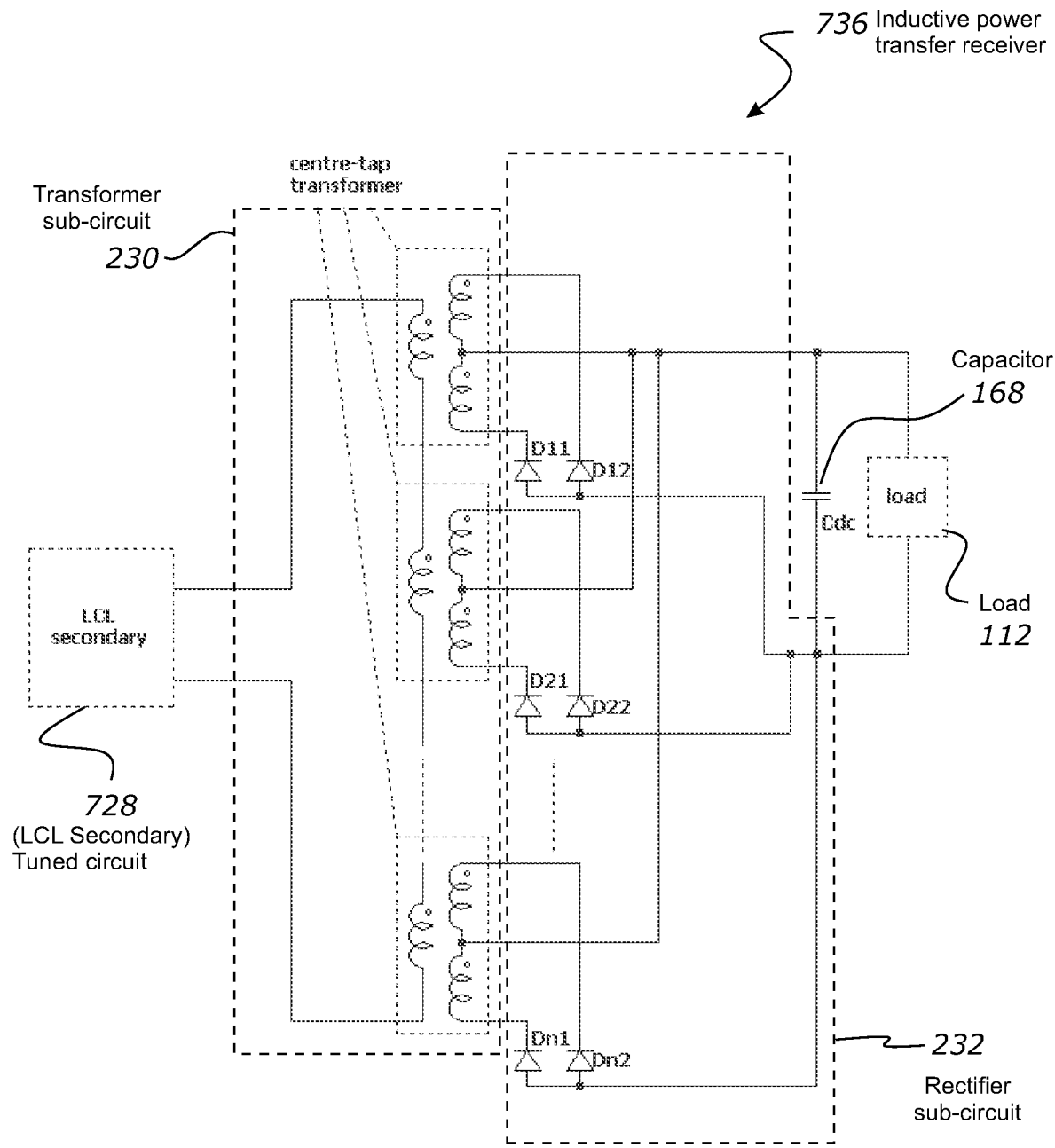
FIG. 32 shows another inductive power transfer receiver embodiment as part of an inductive power transfer system.

FIG. 32 shows an eighth inductive power transfer receiver 836. The eighth inductive power transfer receiver 836 is similar to the second power transfer receiver embodiment 236 as described above, except in the inductive power transfer receiver 836, the secondary coil is LCL tuned instead of series tuned.

The inductive power transfer receiver 836 may be suitable if for example the load voltage under 100V and load current larger than 30 A to share the large load current between parallel rectifiers. This configuration also allows a higher transformer ratio to be achieved.

3.5.3.3 Ninth Specific Embodiment

Figure 33:
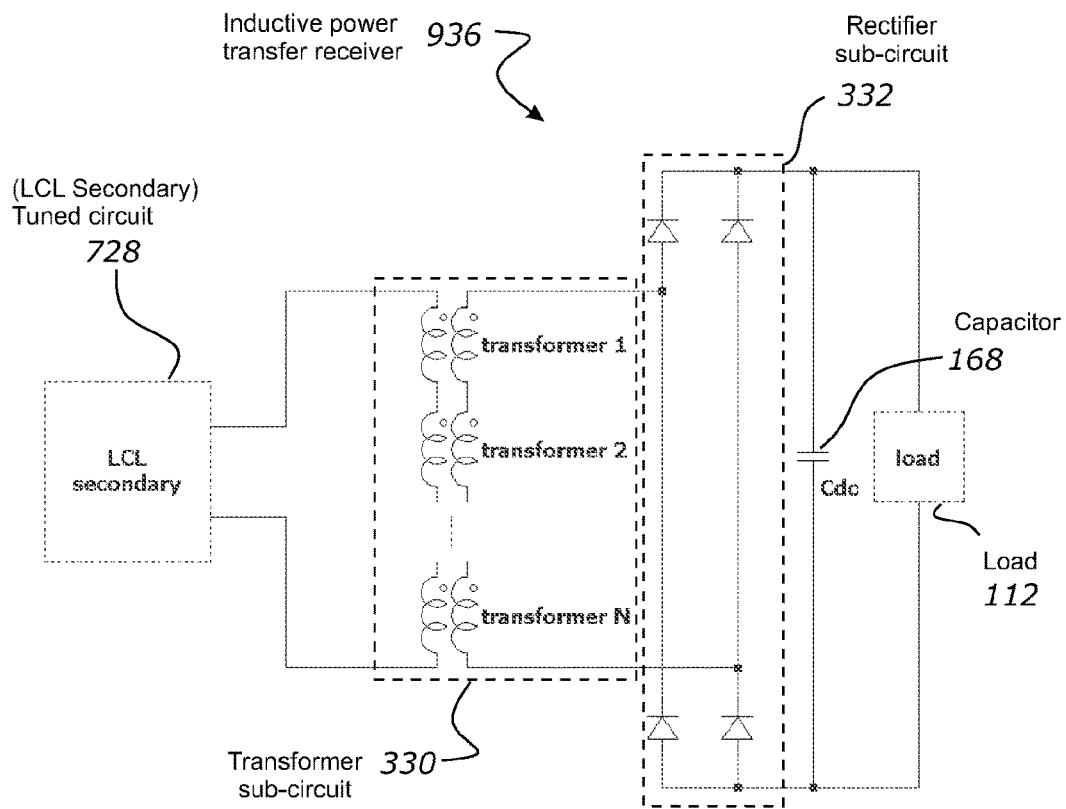
FIG. 33 shows another inductive power transfer receiver embodiment as part of an inductive power transfer system.

FIG. 33 shows a ninth inductive power transfer receiver 936. The ninth inductive power transfer receiver 936 is similar to the third power transfer receiver embodiment 336 as described above, except in the inductive power transfer receiver 936, the secondary coil is LCL tuned instead of series tuned.

The inductive power transfer receiver 936 may be suitable if for example the load voltage is higher than 100V and load current less than 30 A. Multiple smaller transformers maybe connected in series.

3.5.3.4 Tenth Specific Embodiment

Figure 34:
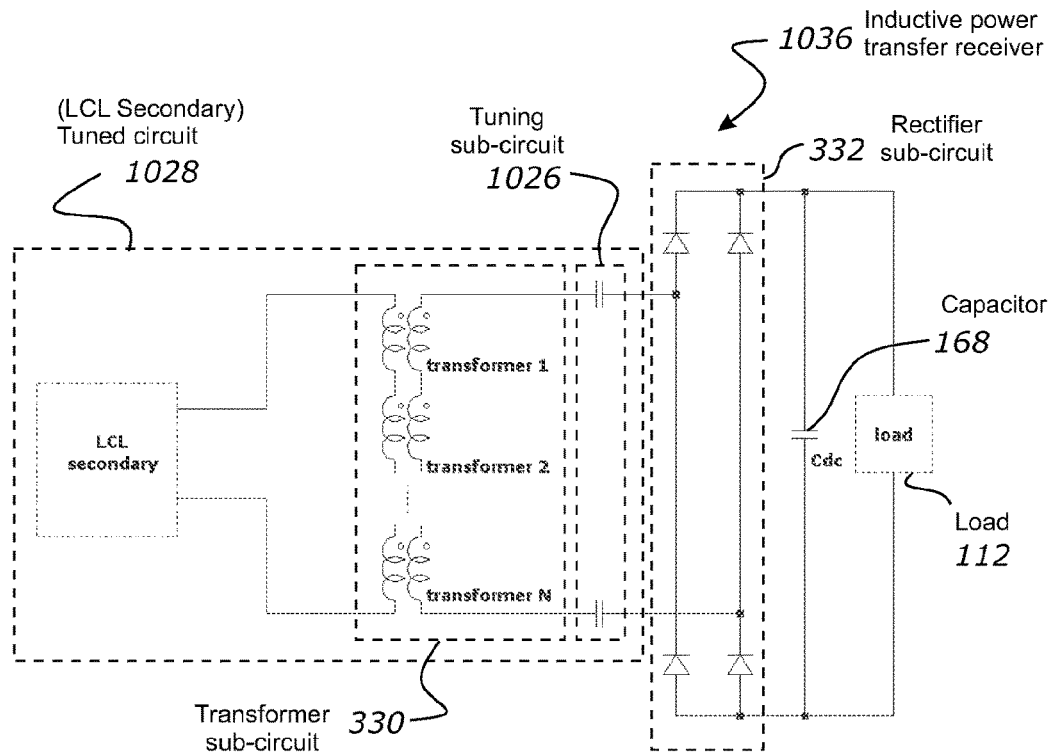
FIG. 34 shows another inductive power transfer receiver embodiment as part of an inductive power transfer system.

FIG. 34 shows a tenth inductive power transfer receiver 1036. The tenth inductive power transfer receiver 1036 is similar to the fourth power transfer receiver embodiment 436 as described above, except in the inductive power transfer receiver 1036, the secondary coil is LCL tuned instead of series tuned (such that if series capacitors are used in block 3, they may be moved to the secondary side of the transformer sub-circuit as shown in FIG. 34).

3.5.3.5 Eleventh Specific Embodiment

Figure 35:
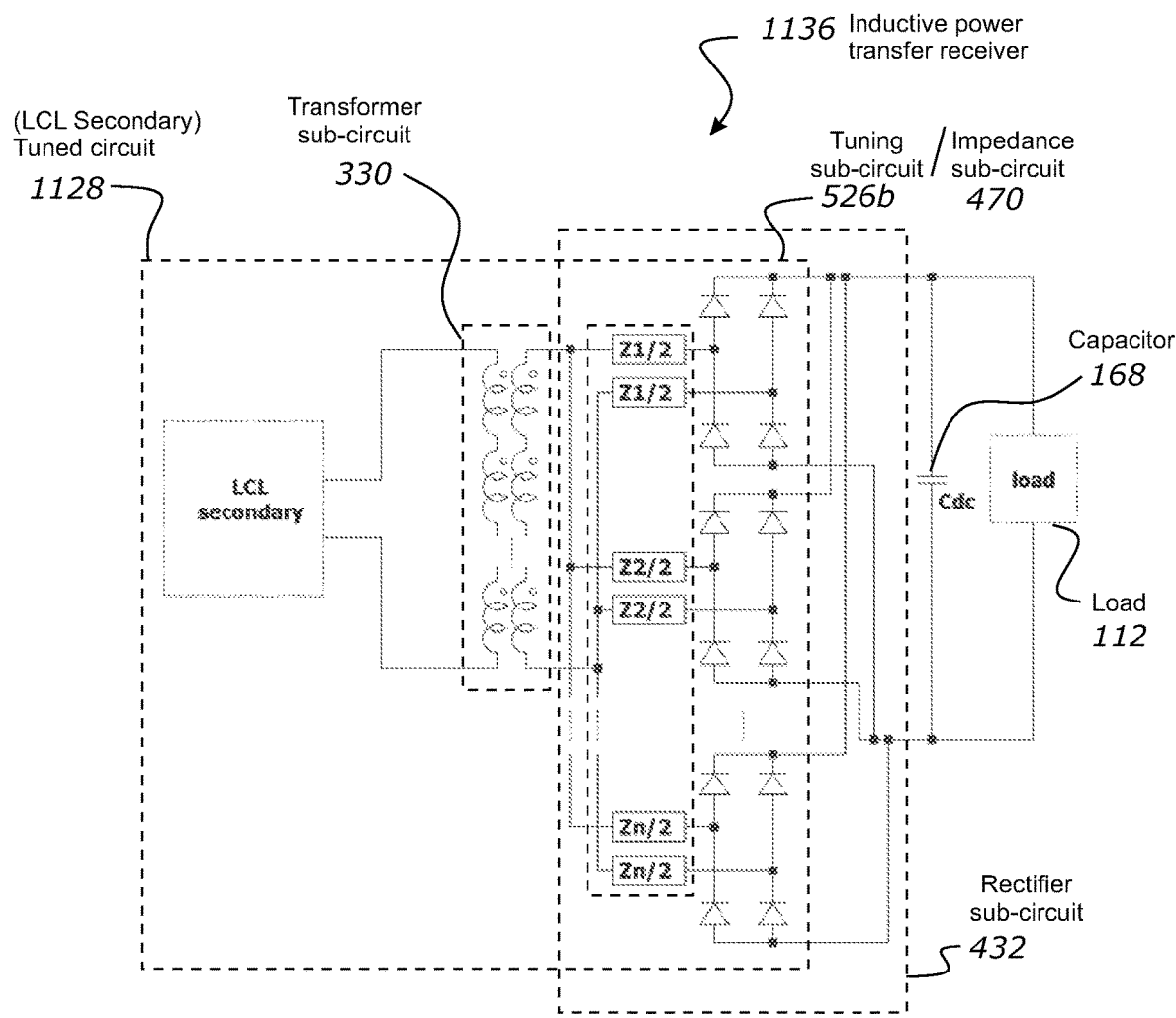
FIG. 35 shows another inductive power transfer receiver embodiment as part of an inductive power transfer system.

FIG. 35 shows an eleventh inductive power transfer receiver 1136. The eleventh inductive power transfer receiver 1036 may be similar to the fifth and/or sixth power transfer receiver embodiments 536 and/or 636 as described above, except in the inductive power transfer receiver 1136, the secondary coil is LCL tuned instead of series tuned The inductive power transfer receiver 1136 may be suitable if for example the load voltages is higher than 100V and load current larger than 30 A, where parallel rectifiers may be used as shown in FIG. 35. A rectifier impedance Zn may be added at the input of each rectifier to control current distribution between rectifiers. Components in block 3 of the LCL network may also be shifted into Zn blocks.

3.5.3.6 Additional Embodiments

Any inductive power transfer receiver embodiment (such as inductive power transfer receiver embodiments 736, 836, 936, 1036, 1136 for example) may be modified such that the secondary coil is LC parallel tuned instead of LCL tuned.

This concludes discussion of the inductive power transfer receiver 36.

4. AC Switching

Embodiments that implement AC switching are now described. AC switching might be used for the following:
 An AC switch may be added to the secondary/receiver of an inductive power transfer system to improve power factor, regulate power and/or implement protection.
 Changing impedance of a sub-circuit to improve power factor and/or regulate power.
 Connect or disconnect a sub-circuit for protection purposes.

However, as indicated next, implementing AC switching can be problematic. Present embodiments herein provide the capability to implement AC switching on the transmitter and/or receiver side, while avoiding the draw backs of AC switching.

4.1 AC Switching Background

Figure 36:
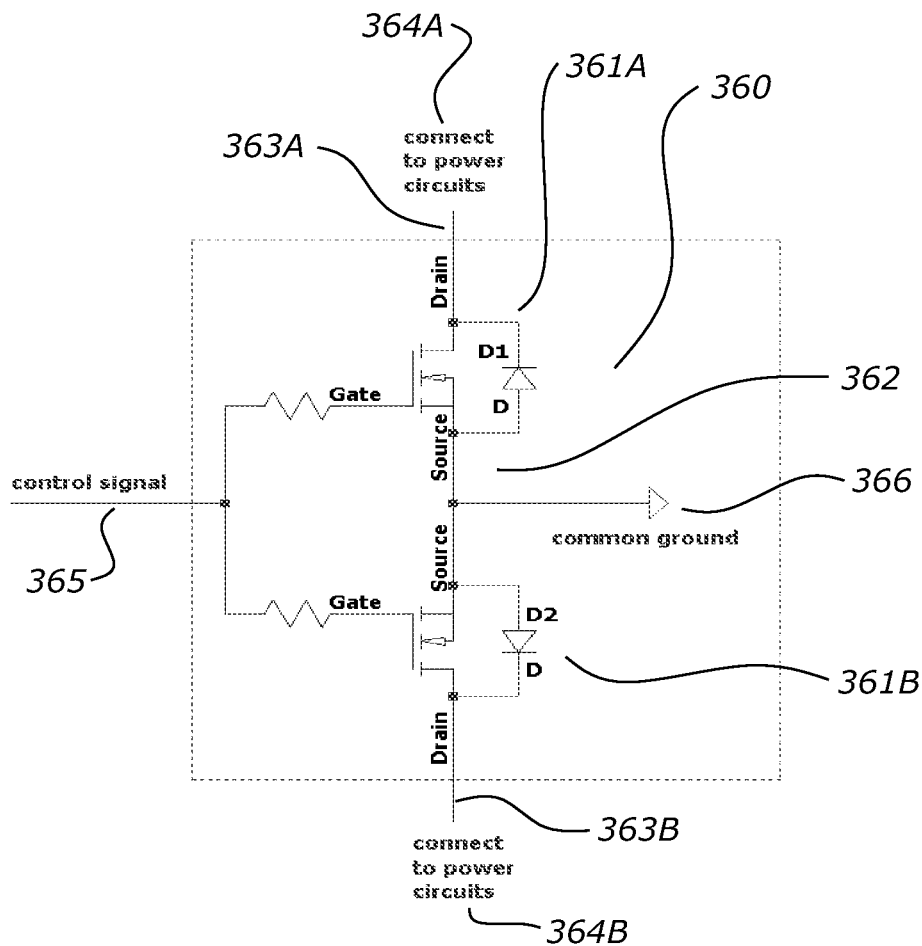
FIG. 36 shows a N channel MOSFET AC switch.

Referring to FIG. 36, an AC switch 360 allows bidirectional current flow when it is turned on. When turned off, current cannot flow through it from either direction. One typical AC switch circuit 360 is shown in FIG. 36, where two N-channel MOSFETs 361A, 361B share a common source 362 and the drain terminals 363A, 363B connect to external circuits 364A, 364B. When a control signal 365 is above the switch reference (which in this case is a common ground 366, but in other cases could be a positive/negative voltage reference) (by a turn-on threshold value), both MOSFETs 361A, 361B (jointly referred to as 361) start to conduct current. Because MOSFETs 361 allow bidirectional current flow, the AC switch 360 allows current to flow in both directions between the two drain terminals 363A, 363B. Something must be done with the common ground.

Figure 37A:
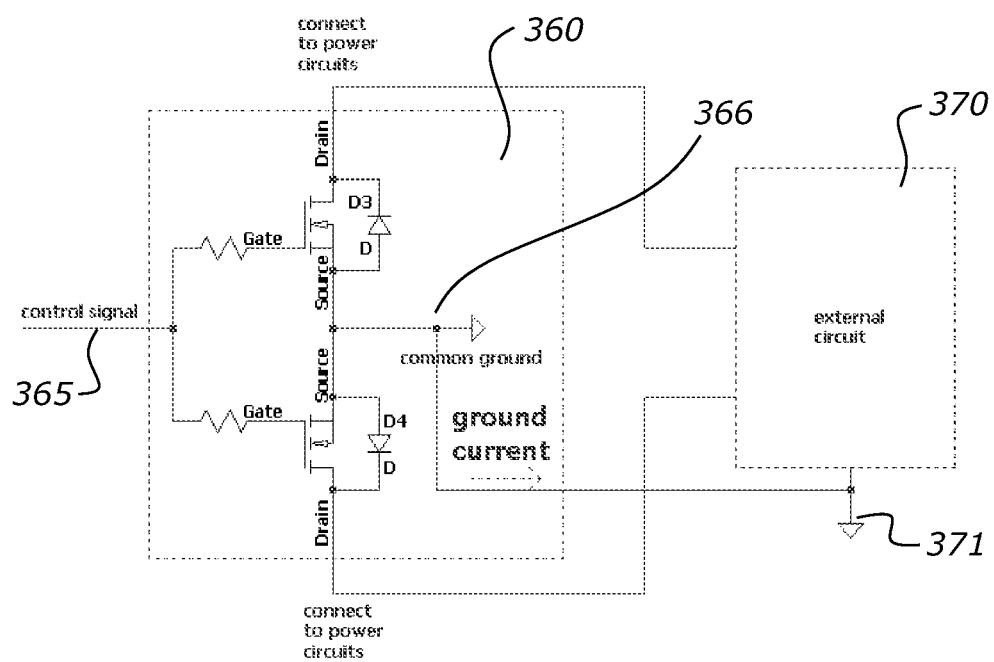
FIGS. 37a, 37b show connection of an AC switch to a DC circuit.
Figure 37B:
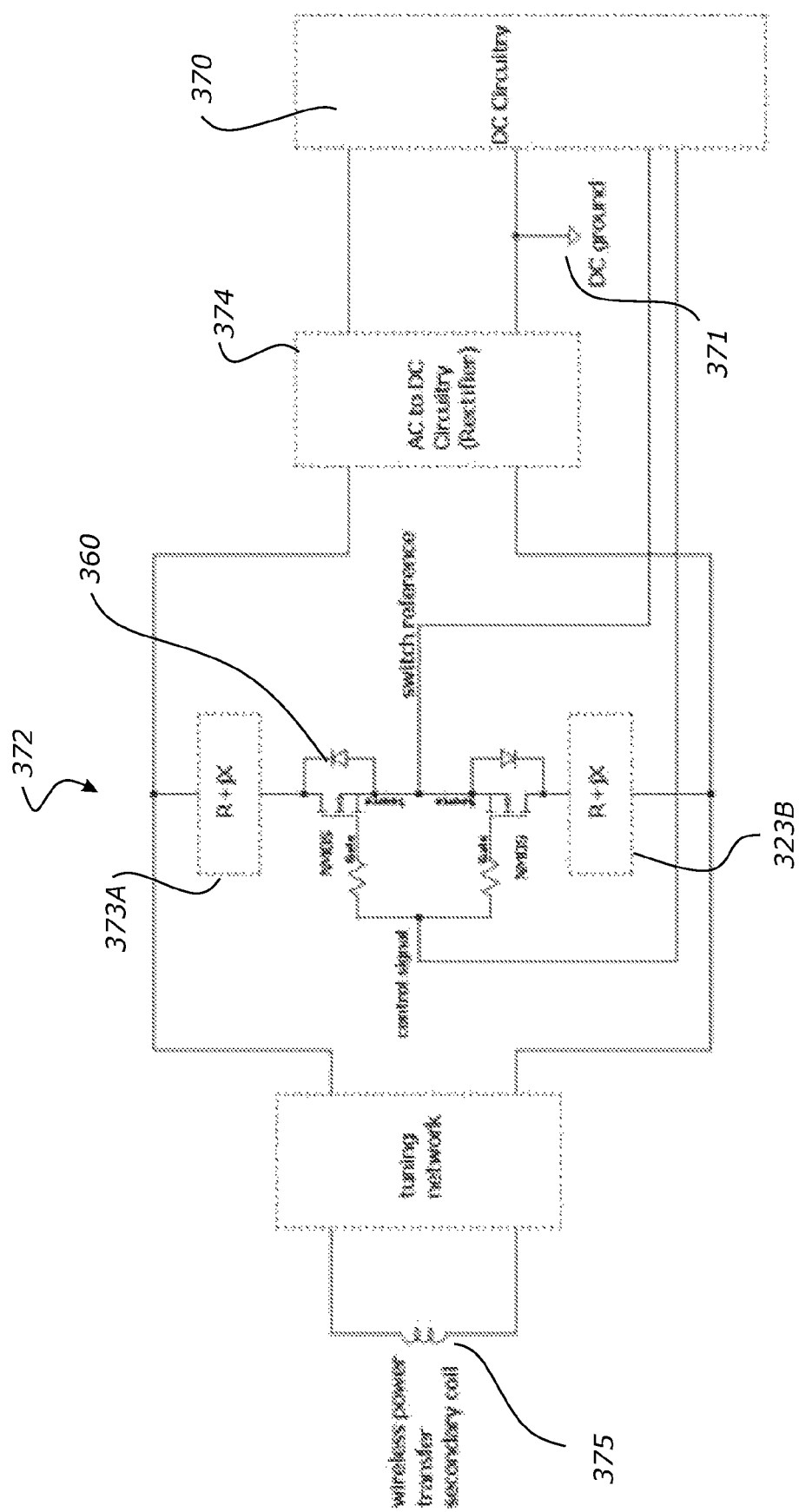

In one option, the switch reference 366 could be connected to the ground 371 of an external circuit 370—see FIG. 37A, 37B. The control signal 365 is also reference to the same ground 371 of the external circuit. However, for certain types of circuits, when this is done, it is possible for a switch reference current (a ground current 380 in this example because the switch reference is a common ground, but in other cases the witch reference current might not be a ground current if the switch reference is a positive/negative voltage reference) to flow between the AC switch reference (in this example an AC switch ground 366 but in other examples could be AC switch reference positive/negative voltage) and external circuit ground 370 (see FIGS. 38A, 38B and simulation description below). Because the switch reference (e.g. ground) current 380 must flow in a complete loop, it returns back to the AC switch 360 through either drain terminal 364A, 364B of the AC switch. Such switch reference (e.g. ground) currents 380 are undesirable and unintended. They are typically not very obvious to the circuit designers and may be not be taken into account during the circuit design. The AC switch reference (e.g. ground) current can affect system signal integrity by adding a voltage noise in the ground plane. If the switch reference current flows in both AC circuit (360) and the external circuit (370), it then affects the desired performances of both AC circuit (360) and the external circuit (370). In addition, switch reference current may also create electromagnetic interference (EMI) to the external circuits and the AC switch 360 by radiating out. Further, because the switch reference current 380 must flow through the AC switch MOSFETs 361, it adds to the normal operating current of the AC switch 360, causing extra losses and heat in the AC switches 360 and potentially destruction of the switch.

Figure 38A:
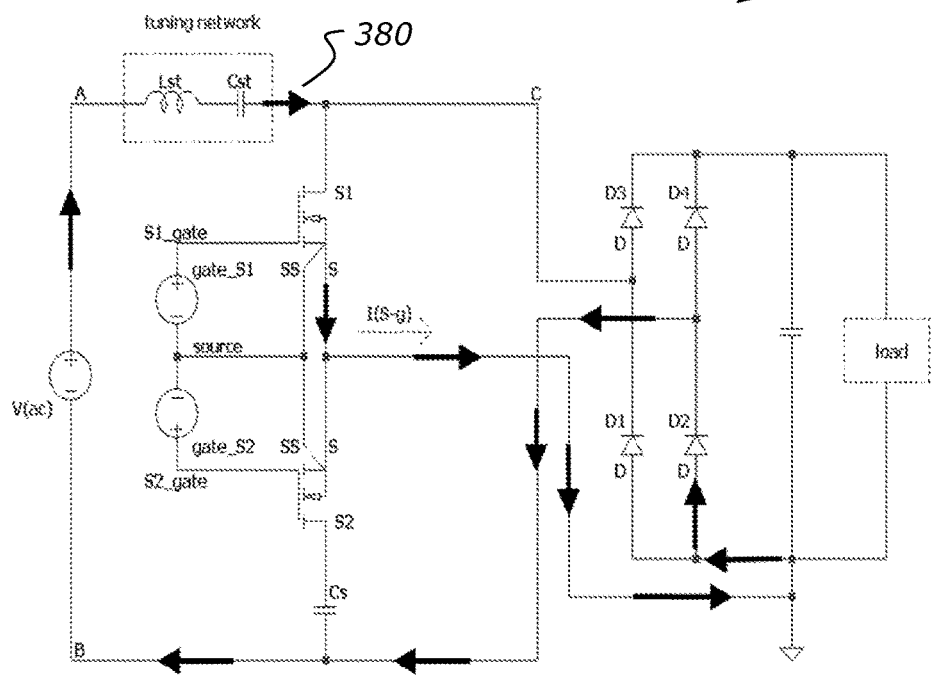
FIGS. 38a, 38b, 39 show reference (ground) current in the circuits of FIGS. 37a, 37b.
Figure 38B:
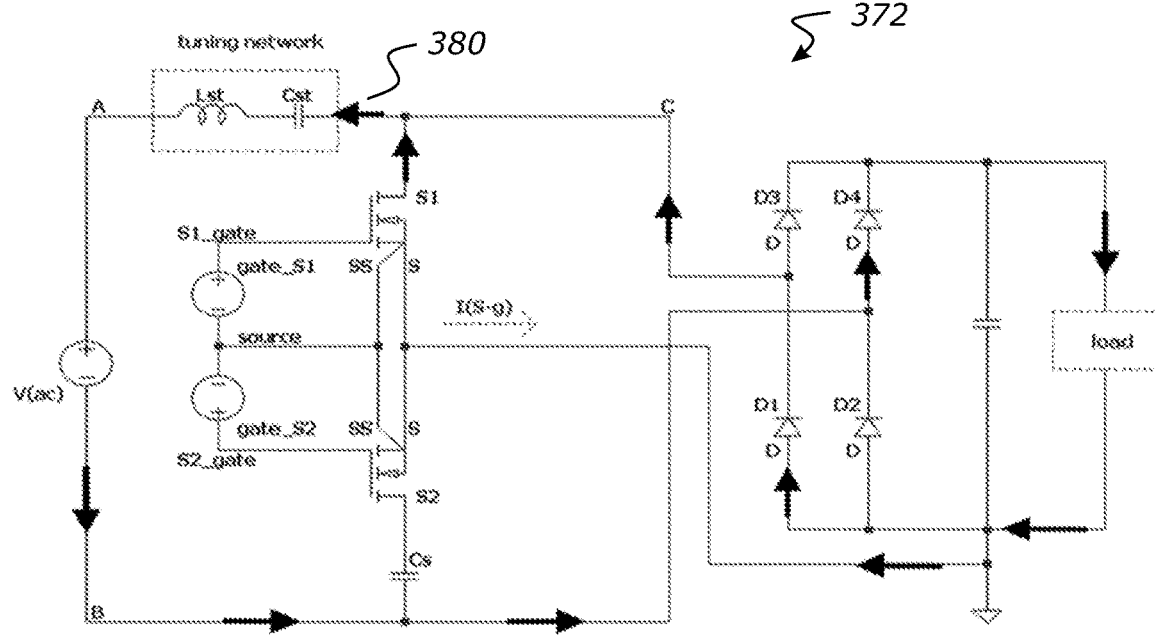

The problem is demonstrated in an example as shown FIG. 37B. An AC switch may be added to the secondary/receiver 372 of an inductive power transfer system to regulate power and/or implement protection. as shown, an AC switch 360 and two identical series impedance (R+jX) 373A, 373B are connected in parallel to the inputs of a rectifier 374, and the resonant tank 375 is simplified and represented as a voltage source. Here the common ground 366 of the AC switch 360 is directly connected to the ground of the external circuit (in this case, DC circuitry) 371. The DC circuitry also generates the control signal 365 (reference to the ground 371 of the DC circuitry 370) for the AC switch 360. Referring to FIGS. 38A, 38B, whenever the AC switch 360 is turned on, a transient switch reference (e.g. ground) current 380 flows between the grounds of AV switch 366 and the DC circuitry 371. Such current returns 380 from the DC circuitry 370 to the AC switch reference (e.g. ground) 366 through the rectifier 374, secondary coil and AC switch 360, causing the problems mentioned above. In addition, the two identical series impedances are required to minimise ground loop current.

Figure 39:
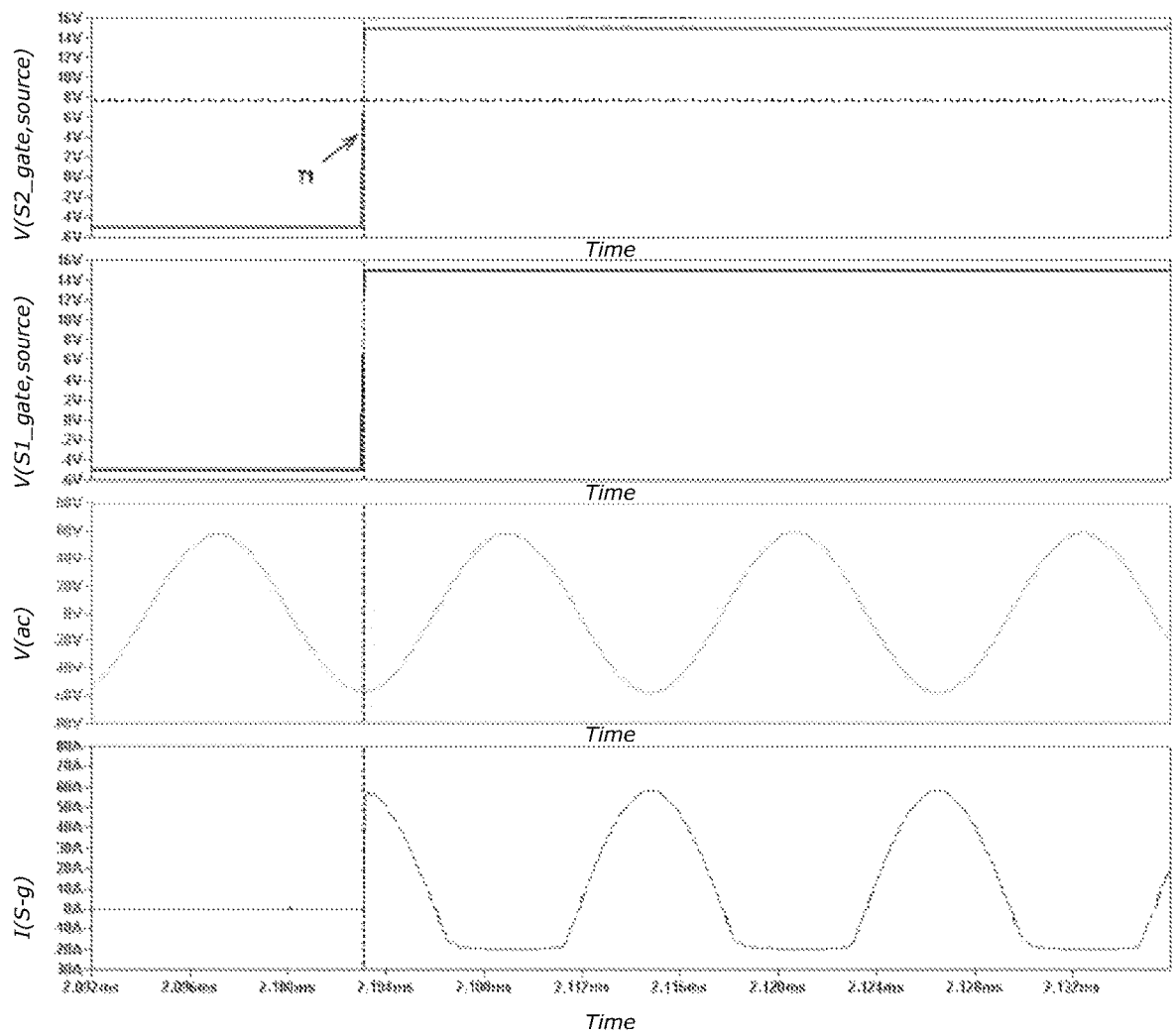

FIG. 39 below shows a simulation model of a series tuned secondary (receiver) circuit 372 (see FIGS. 38A, 38B) as per the prior art and only one impedance in series with the AC switch to illustrate the switch reference current for this circuit when the AC switch is turned on. This simulation demonstrates the problem with the prior art.

Referring to FIG. 38A, when V(ac) is positive, the arrows highlight switch reference current loop 380 when V(ac) is positive. The current flows in a loop starting at point A and in the direction of S1—ground—D2—B and back to A.

FIG. 38B shows the switch reference current loop for when V(ac) is negative. Here the secondary coil current flows in the ground loop starting from point B and flow through D4 to load. At this point, part of the load current flows into the ground loop—S1—tuning network and back to point A. The rest of the current flows through D1—C—tuning network and back to point A. The current distribution between D1 and ground loop is determined by the voltage drop of S1 and D1.

FIG. 39 shows simulation waveforms for the scenarios described in FIGS. 38A, 38B with the AC switch 360 turned on at t=T1. AC switch control signals 365 (V(S1_gate, source), V(S2_gate,source)), voltage V(ac) and switch reference current I(s_g) flowing from the common source (ground) of the AC switch to the DC ground are shown. At t=T1, V(S1_gate,source) and V(S2_gate,source) changes from −5V to 15V to turn on both MOSFETs.

As can be seen, current 380 can flow in the ground loop after AC switch 360 is turned on. This is undesirable.

4.2 AC Switching Receiver Side

The present embodiments described overcome the problem of the ground loop current.

The switch reference current 380 can be eliminated by breaking the loop it flows in. In one option, this can be done by leaving the AC switch reference (e.g. common ground) 366 floating and providing an isolated DC-DC converter—but this adds cost and complexity to the system.

Figure 40:
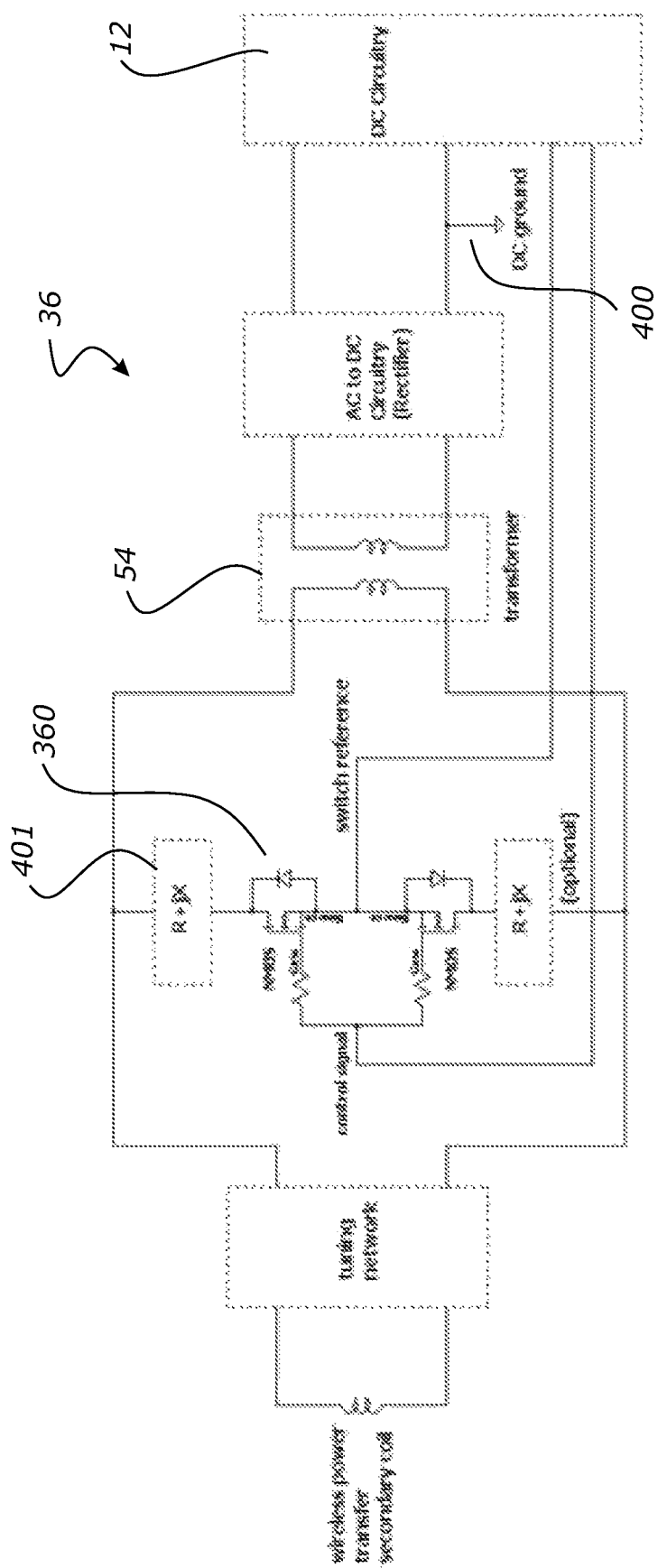
FIGS. 40, 41 show an AC switch circuit with isolating transformer according to the present embodiments.

Instead, and referring to FIG. 40A, the present inventors have determined that the transformer on the wireless power transfer receiver 36 as described above can be used also to provide isolation and a solution to the problem. For example, as described above and with reference to e.g. FIG. 12, a transformer(s) (e.g. 54a, 54b, 54c but from this point on, one "transformer 54" will be referred to for simplicity of explanation, but there might be more than one transformer 54) is provided in a receiver circuit to reduce current in the receiving coil 24, improve stability and/or improve the power factor. That same transformer 54 can also be used to provide isolation for the AC switch reference 366 of an AC switch 360, with no additional componentry required. For secondary (receiver) circuits 36 that already include a transformer 54, the AC switch reference 366 may be directly connected to DC circuitry (load 12) ground 400 without the need of an isolated DC-DC converter.

One such circuit is shown in FIG. 40A. The impedance block 401 that contains (R+jX) may be a resistor, a capacitor, an inductor or a combination of two or three of these components. It is preferred to have just one such block in series with the AC switch 360. However, the circuit can also function with two impedance blocks, each connecting to one end of the AC switch 360. Because the transformer 54 primary winding (e.g. e.g. 56a, 56b, 56c but from this point on referred to as primary winding 56) and secondary winding (e.g. e.g. 58a, 58b, 58c but from this point on referred to as primary winding 58) are electrically isolated, the switch reference current loop 380 is broken; no current flows between the switch reference 366 of the AC switch 360 and DC ground 400 of AC switch DC circuitry 12. Another advantage is only one impedance 401 is required in series with the AC switch 360 (although two impedance blocks are also possible). The AC switch connects or disconnects the impedance block 401 to change the characteristics of the AC circuit to adjust the output power or provide somewhat protection.

Figure 41:
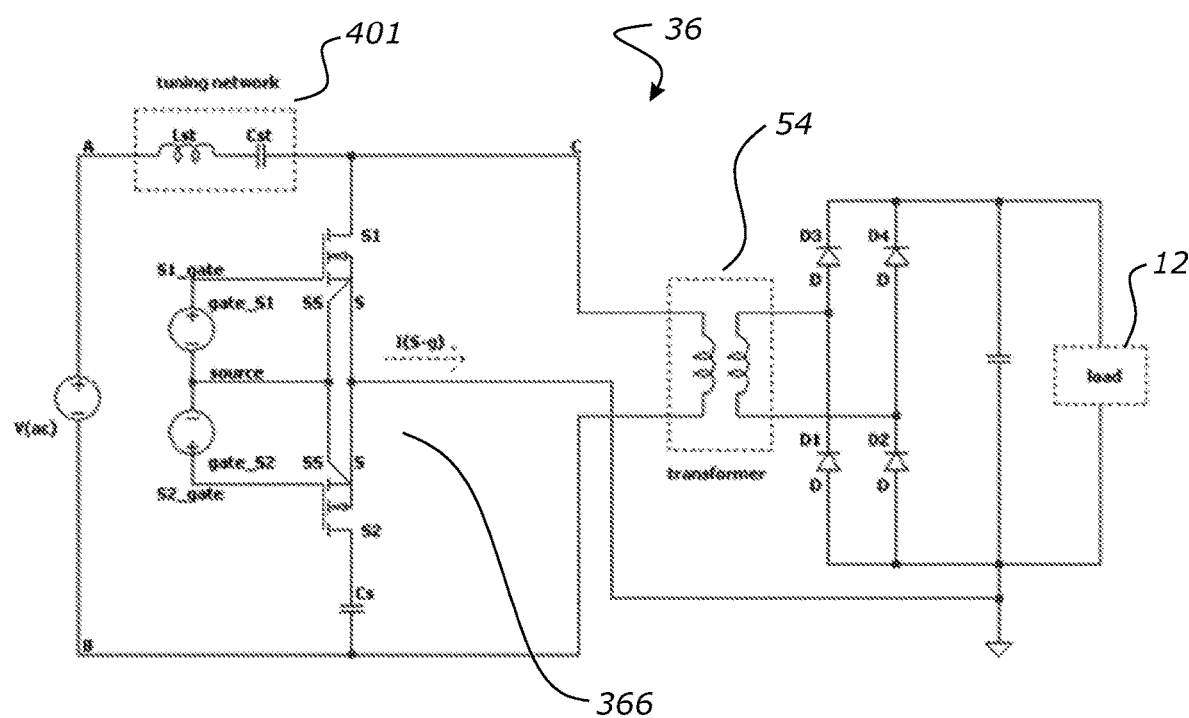
Figure 42:
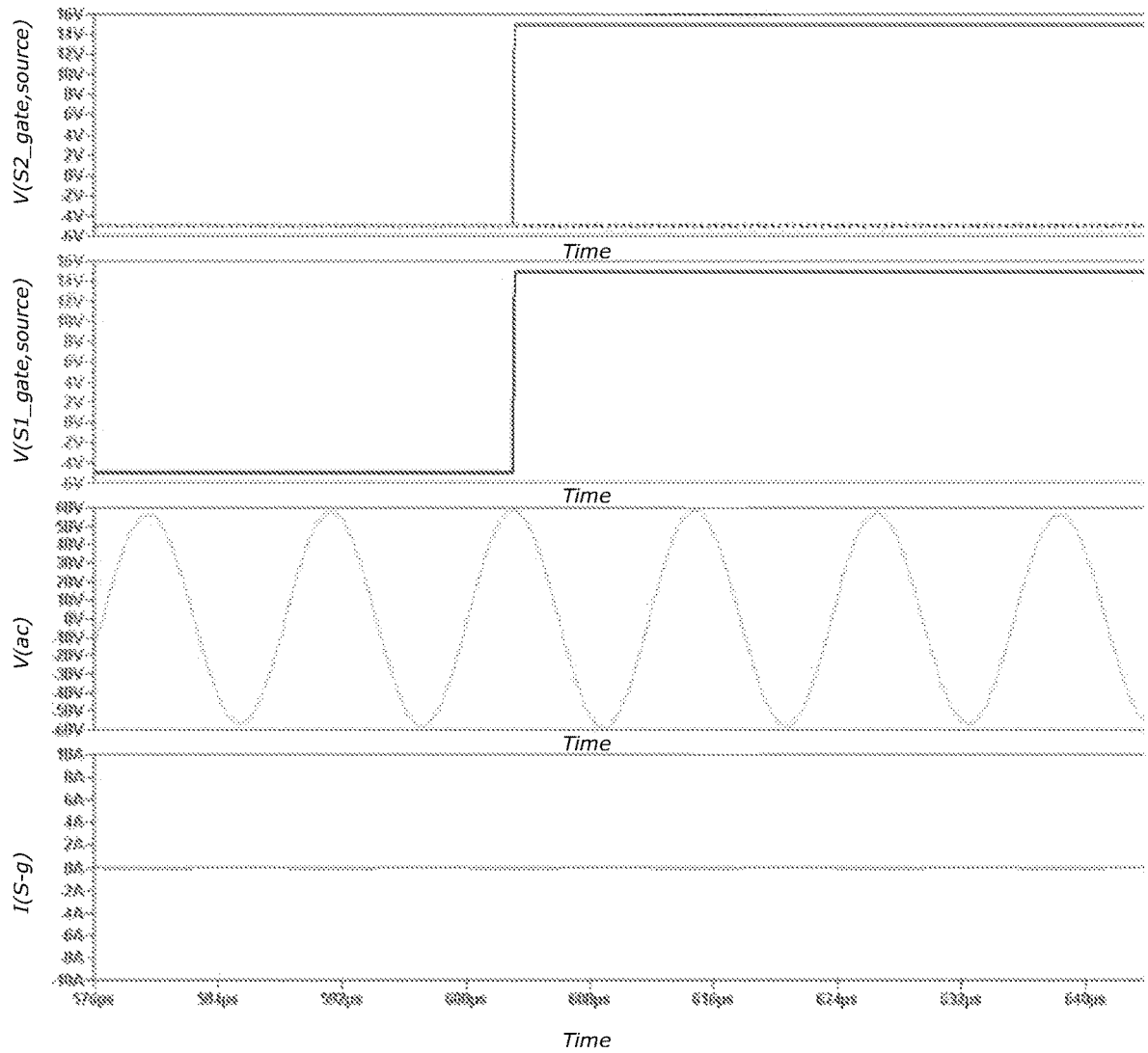
FIG. 42 shows the absence of reference current in the AC switch embodiment of FIGS. 40, 41.

An example of the circuit in FIG. 40A is simulated in FIG. 41. FIG. 42 shows simulation waveforms of FIG. 41 when the AC switch 360 is turned on. As can be seen, the transformer 54 breaks the switch reference current loop 380 and there is no current flowing from the common source 362 of the AC switch 360 to the DC ground 366, 400 I(s_g). The ground loop problem of the prior art is non-existent.

4.3 AC Switching Transmitter Side

Figure 43A:
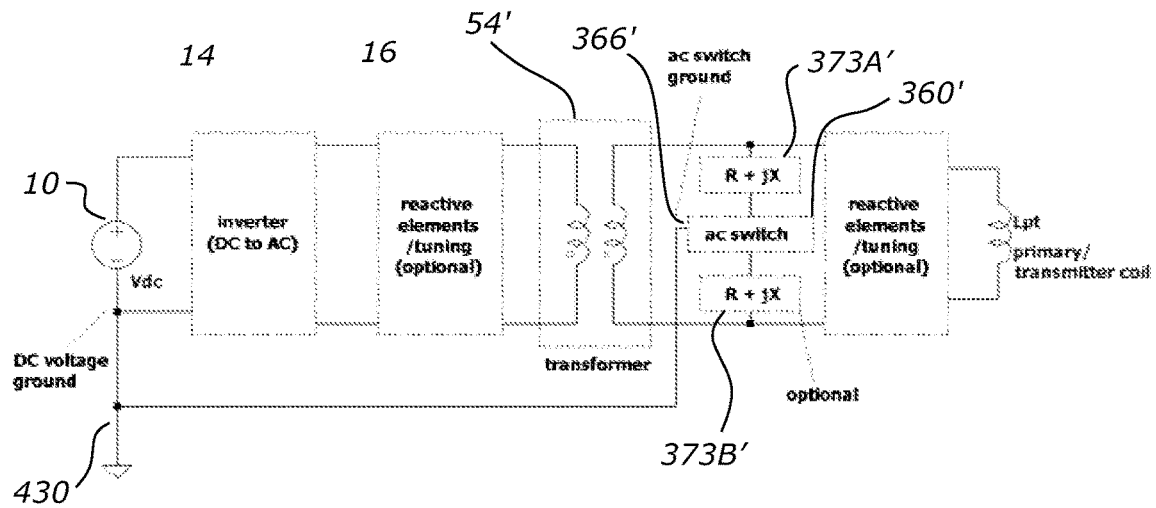
FIGS. 43a, 43b show a AC switch and transformer for isolating on a transmitter side.
Figure 43B:
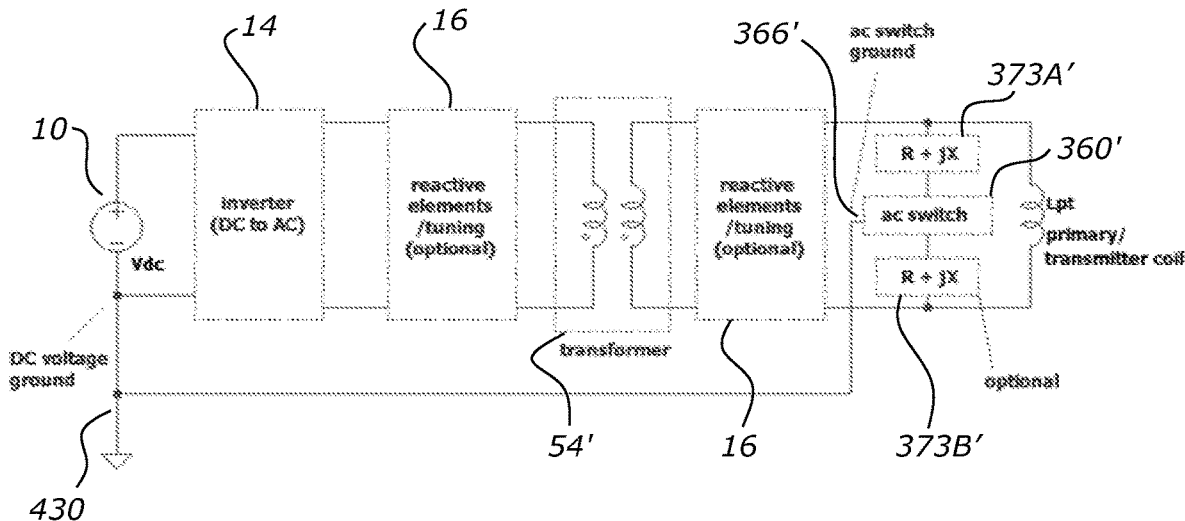

It can be desirable to have AC switching 360' on the transmitter side. Such concepts can also be applied to primary circuits of inductive power transfer systems. To overcome the above mentioned drawbacks, the same solution described for AC switching 360 on the receiver side 36 can also be implemented on the transmitter side 35 (alternatively to or as well as the receiver side). If the primary/transmitter circuit 35 already contains a transformer 54', the AC switch and series impedance blocks may be added directly, as shown in FIG. 43A, 43B (two alternatives are shown with the tuning circuit 16 moved). Here the ground 366', 430 of the AC switch 360 and DC voltage 10 sources are tied together. No current flows between these two grounds due to transformer isolation.

4.4 Advantages for AC Switching

The principle of the embodiments is to make sure the voltage across the Gate 365 and the Source 362 is bigger than the Vth (turn-on threshold voltage) to turn on a N channel MOSFET. If the Sources of a MOSFET are floating, the Sources of a MOSFET are not constant then it is very hard to maintain Vgs>Vth. The present embodiment address that provides an isolated voltage for the Vgs (the isolation means the AC switch Control signal 365 and Vgs), where the generated isolated voltage's negative is connected to the Source of the MOSFET and Positive is connected to the Gate of the MOSFET to maintain a constant Vgs. But it provides that without the usual cost and complexity incurred when generating and isolated voltage. Using the transformer already there, the Sources are connected to a DC reference (at the secondary side), and the Control signal (a DC voltage, such as 15V) also referenced to the same DC reference. Also, The DC Control signal and DC reference are very easily to generated and controlled from a DC circuitry These same advantages hold for the other switch types, as described below.

4.5 Other AC Switches

The AC switching embodiments described are described with reference to an N channel MOSFET. That is by way of example only. Referring to FIGS. 44a to 44e, other types of AC switches could be used as well, in the same topology as shown above.

Figure 44:
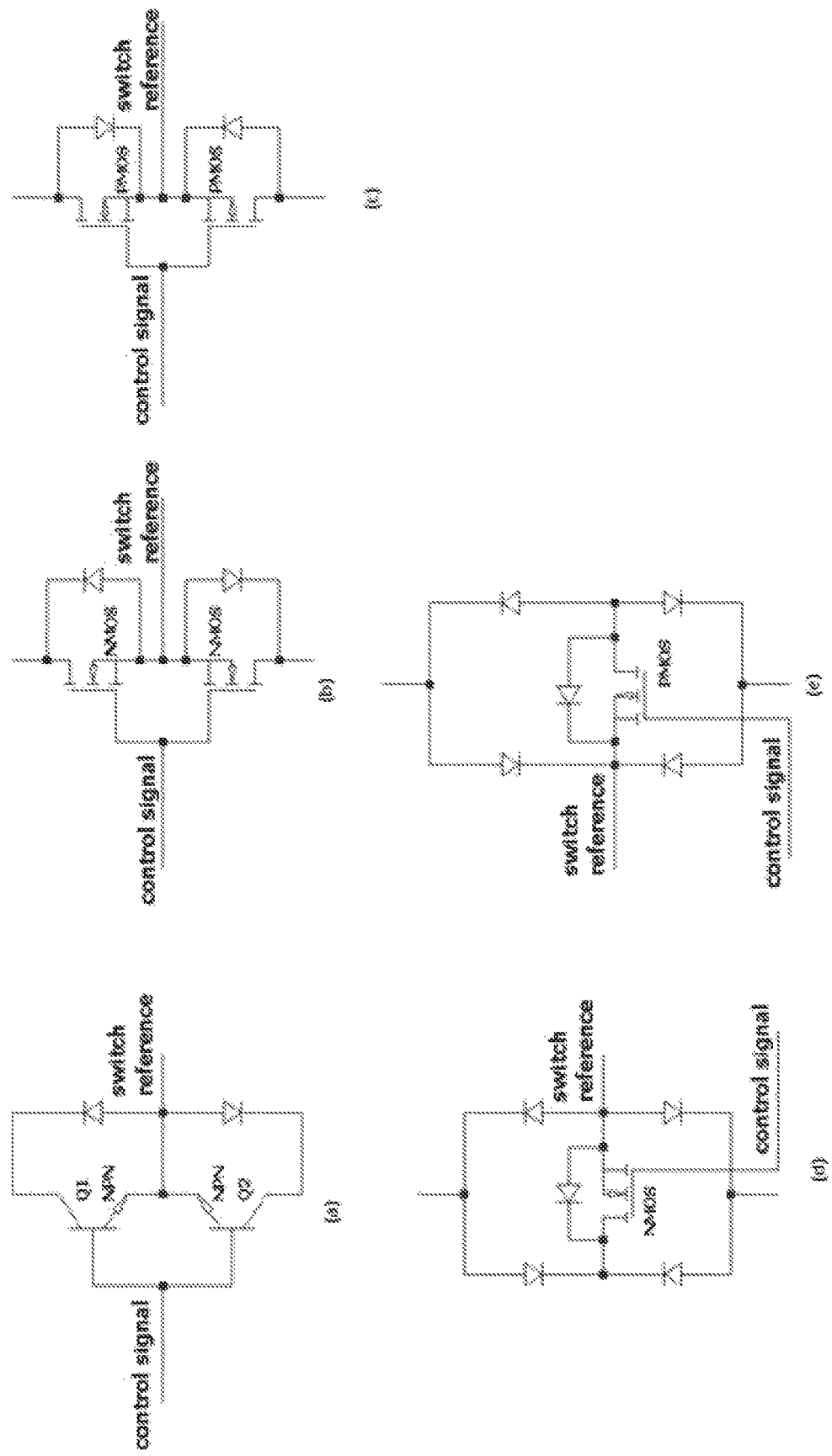
FIGS. 44a to 44e show alternative AC switches that could be used in the embodiments described

AC switches allow bidirectional current flow when turned on and blocks bidirectional voltage when turned off. FIGS. 44a to 44e illustrate some typical implementations. FIGS. 44a, 44b and 44c show switches that are based on a similar structure, where:

FIG. 44a uses two NPN bipolar junction transistors (BJT) with two emitters connected together.
  FIG. 44b uses two N-channel MOSFETs with two sources connected together.
  FIG. 44c uses two P-channel MOSFETs.

An IGBT is another type of switching devices that can be used in place of the BJTs or MOSFETs following the same structure as in FIG. 44a, 44b or 44c.

When MOSFETs are used for in AC switches as in FIGS. 44b and 44c, the diodes can be replaced with the body diodes of the MOSFETs. For N-channel MOSFETs used in FIG. 44b, the switch reference can be DC Ground, for P-channel MOSFETs used in FIG. 44c, the switch reference can be DC voltage (i.e. 10-20V) which is referenced to a DC ground.

FIGS. 44d and 44e show a different structure of the AC switch by using four diodes to rectify the AC voltage and current and only one switching device to turn on or off the AC switch. The switching device in FIG. 44d is a N-channel MOSFET, the switch reference can be DC Ground. The switching device in FIG. 44e is a P-channel MOSFET, the switch reference can be DC voltage (i.e. 10-20V) which is referenced to a DC ground.

Figure 45:
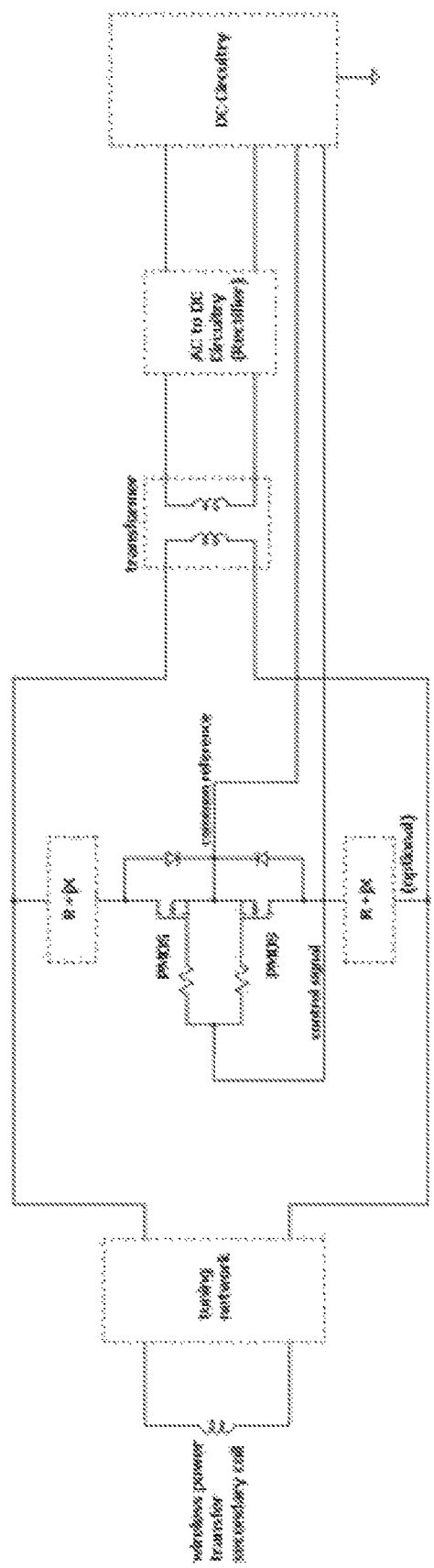
FIG. 45 shows an alternative AC switch circuit with isolating transformer.

By way of example, an AC switch implementation with p-channel MOSFETs is shown in FIG. 45

The embodiments show have a switch reference which is a common ground. This is by way of example only. In variations, any switch reference can be used—such as a common positive or negative voltage reference.

The invention claimed is:

1. An inductive power transfer receiver for receiving power to provide to a load, the inductive power transfer receiver comprising:
   a receiving coil,
   a tuned circuit comprising the receiving coil, and
   a transformer sub-circuit connected to the tuned circuit, the transformer sub-circuit comprising a transformer primary side and a transformer secondary side,
   wherein in use, when the inductive power transfer receiver provides received power to the load:
      the transformer sub-circuit connects the receiving coil to the load, and
      the transformer sub-circuit achieves one or more of:
         reducing current in the receiving coil,
         improving power factor, and
         improving stability in the tuned circuit;
   wherein the transformer sub-circuit comprises one transformer, comprising a transformer primary coil and a secondary coil; and
   wherein the transformer sub-circuit comprises at least one additional transformer, each of the at least one additional transformer comprising a transformer primary coil and a transformer secondary coil.

2. An inductive power transfer receiver according to claim 1 wherein the transformer sub-circuit reduces current in the receiving coil by increasing voltage across the transformer primary side above voltage on transformer secondary side.

3. An inductive power transfer receiver according to claim 1 wherein the transformer sub-circuit improves stability and power factor in the tuned circuit by, when a load is connected to the inductive power transfer receiver, presenting an effective real impedance load to the receiving coil that is higher than an actual real impedance of the load.

4. An inductive power transfer receiver according to claim 1 wherein the plurality of transformers has a turns ratio of the plurality of transformer primary coils to the plurality of transformer secondary coils, wherein the turns ratio:
   affects the voltage across and therefore current through the secondary coils, and
   provides an effective real impedance load which is multiple of the actual real impedance of the load, the multiple being the turns ratio squared.

5. An inductive power transfer receiver according to claim 1 wherein the plurality of transformers are connected such that the transformer secondary coils are connected in series with each other.

6. An inductive power transfer receiver according to claim 1 wherein the plurality of transformers are connected such that the transformer secondary coils are connected on separate branches from each other.

7. An inductive power transfer receiver according to claim 1 wherein the plurality of transformers are connected such that the transformer primary coils are connected in series with each other.

8. An inductive power transfer receiver according to claim 1 wherein the plurality of transformers are centre-tapped.

9. An inductive power transfer receiver according to claim 8 wherein the transformer secondary coils of the centre-tapped transformers each comprise a first secondary coil portion, and a second secondary coil portion.

10. An inductive power transfer receiver according to claim 9 wherein the plurality of centre-tapped transformers have a turns ratio of the plurality of transformer primary coils to the plurality of the first or second secondary coil portions, wherein the turns ratio:
    affects the voltage across and therefore current through the secondary coils, and
    provides an effective real impedance load which is multiple of the actual real impedance of the load, the multiple being the turns ratio squared.

11. An inductive power transfer receiver according to claim 9 wherein the plurality of centre-tapped transformers are connected such that the first and second secondary coil portions of that make up the plurality of transformer secondary coils of the plurality of centre-tapped transformers are connected in parallel with each other.

12. An inductive power transfer receiver according to claim 9 wherein the plurality of centre-tapped transformers are connected such that the primary coils are connected in series with each other.

13. An inductive power transfer receiver according to claim 1 wherein in use the transformer sub-circuit improves stability in the tuned circuit to achieve one or more of: lower pads losses, improved power factor, and reduced sensitivity.

14. An inductive power transfer system comprising an inductive power transfer receiver according to claim 1.

15. An inductive power transfer system according to claim 14 further comprising an inductive power transfer transmitter comprising a transmitting coil.

* * * * *